(12) United States Patent
Xue et al.

(10) Patent No.: US 11,671,235 B2
(45) Date of Patent: Jun. 6, 2023

(54) APPARATUSES AND METHODS FOR JOINT INTERFERENCE CANCELATION

(71) Applicant: Apple Inc., Cupertino, CA (US)

(72) Inventors: Feng Xue, Redwood City, CA (US); Yang-Seok Choi, Portland, OR (US); Daniel Schwartz, Scottsdale, AZ (US); Shu-Ping Yeh, Campbell, CA (US); Namyoon Lee, San Jose, CA (US); Venkatesan Nallampatti Ekambaram, Hillsboro, OR (US); Ching-En Lee, Hillsboro, OR (US); Chia-Hsiang Chen, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 537 days.

(21) Appl. No.: 16/327,386

(22) PCT Filed: Sep. 29, 2016

(86) PCT No.: PCT/US2016/054286
§ 371 (c)(1),
(2) Date: Feb. 22, 2019

(87) PCT Pub. No.: WO2018/017143
PCT Pub. Date: Jan. 25, 2018

(65) Prior Publication Data
US 2019/0229884 A1 Jul. 25, 2019

(51) Int. Cl.
*H04L 5/14* (2006.01)
*H04B 1/44* (2006.01)
(Continued)

(52) U.S. Cl.
CPC ............. *H04L 5/1461* (2013.01); *H04B 1/44* (2013.01); *H04B 1/48* (2013.01); *H04B 1/525* (2013.01); *H04B 7/0413* (2013.01); *H04B 15/00* (2013.01)

(58) Field of Classification Search
CPC . H04B 15/00; H04B 1/44; H04B 1/48; H04B 1/525; H04B 7/0413; H04L 5/1461
(Continued)

(56) References Cited

U.S. PATENT DOCUMENTS 4,558,462 A 12/1985 Horiba
6,172,565 B1 1/2001 Chen
(Continued)

OTHER PUBLICATIONS

Notice of Allowance based on U.S. Appl. No. 14/861,421 (8 pages) dated Dec. 6, 2017.
(Continued)

*Primary Examiner* — Omar J Ghowrwal
(74) *Attorney, Agent, or Firm* — Kowert, Hood, Munyon, Rankin & Goetzel, P.C.

(57) ABSTRACT

A communication circuit arrangement includes a first kernel dimension filter circuit configured to apply a first kernel dimension filter to a first input signal to estimate a first kernel dimension interference signal from a first amplifier, a second kernel dimension filter circuit configured to apply a second kernel dimension filter to a second input signal to estimate a second kernel dimension interference signal from a second amplifier, a joint delay tap dimension filter configured to apply a joint delay tap dimension filter to a combination of the first kernel dimension interference signal and the second kernel dimension interference signal to obtain an estimated joint interference signal, and a cancelation circuit configured to remove the estimated joint interference signal from a received signal to obtain a clean signal.

25 Claims, 21 Drawing Sheets

(51) Int. Cl.
*H04B 1/48* (2006.01)
*H04B 1/525* (2015.01)
*H04B 7/0413* (2017.01)
*H04B 15/00* (2006.01)

(58) Field of Classification Search
USPC .......................................................... 370/278
See application file for complete search history.

(56) References Cited

U.S. PATENT DOCUMENTS

| | | | |
|---|---|---|---|
| 6,380,969 | B1 | 4/2002 | Limberg |
| 6,519,304 | B1 | 2/2003 | Limberg |
| 6,952,460 | B1 | 10/2005 | Van Wechel |
| 7,733,996 | B2 | 6/2010 | Wu |
| 7,953,579 | B2 | 5/2011 | Hollis |
| 9,252,831 | B2 | 2/2016 | Rimini |
| 2003/0031242 | A1 | 2/2003 | Awad |
| 2006/0277236 | A1 | 12/2006 | Pisek |
| 2007/0184782 | A1 | 8/2007 | Sahota |
| 2010/0315428 | A1 | 12/2010 | Curry |
| 2011/0090973 | A1 | 4/2011 | Mishra |
| 2011/0143700 | A1 | 6/2011 | Lagunas Hernandez |
| 2011/0149714 | A1 | 6/2011 | Rimini |
| 2012/0140860 | A1 | 6/2012 | Rimini |
| 2013/0044791 | A1* | 2/2013 | Rimini ................... H04B 1/30 375/219 |
| 2013/0110897 | A1* | 5/2013 | Nam .................. H03H 17/0294 708/300 |
| 2013/0301487 | A1 | 11/2013 | Khandani |
| 2014/0037225 | A1 | 2/2014 | Hogasten |
| 2014/0122067 | A1 | 5/2014 | Kroeker |
| 2014/0169431 | A1 | 6/2014 | Arambepola |
| 2014/0240512 | A1 | 8/2014 | Hogasten |
| 2015/0318976 | A1 | 11/2015 | Eltawil |
| 2016/0071009 | A1 | 3/2016 | Abrishamkar |
| 2016/0072592 | A1 | 3/2016 | Tu |
| 2016/0072649 | A1 | 3/2016 | Tu |
| 2018/0096457 | A1* | 4/2018 | Savvides ................. G06F 16/50 |
| 2020/0126263 | A1* | 4/2020 | Dinh ...................... G06N 3/063 |

OTHER PUBLICATIONS

European Search Report based on application No. 17177267.6 dated Nov. 9, 2017 (7 pages) (Reference Purpose Only).
International Search Report based on Application No. PCT/US2016/054286 (4 Pages) dated Jun. 19, 2017 (Reference Purpose Only).
Extended European Search Report, EP Application No. 16184520.1, dated Jan. 23, 2017, 10 pages.
Liu et al.: "FPGA implementation of RLS adaptive filler using dichotomous coordinate descent iterations", IEEE International Conference, Jun. 14, 2009, 5 pages.
Arablouei et al.: Recursive Total Least-Squares Algorithm based on Inverse Power Method and Dichotomous coordinate-descent Iterations, IEEE Transactions on Signal Processing, Apr. 15, 2015, pp. 1941-1949, vol. 63, No. 8.
Liu: "DCD Algorithm: Architectures, FPGA Implementations and Applications", Communications Research Group, Department of Electronics, University of York, Nov. 2008, 159 pages.
"Adaptive filter", Wikipedia, printed Sep. 22, 2015, 8 pages.
Douglas: "Introduction to Adaptive Filters", CRC Press LLC, 1999, 20 pages.
"Adaptive Interference Canceling", printed Sep. 22, 2015, 3 pages.
"Overview of Adaptive Filters and Applications", MATLAB & Simulink, printed Sep. 22, 2015, 4 pages.
Non-final Office Action received for U.S. Appl. No. 14/861,421, dated Jun. 2, 2017, 36 pages.
Zakharov et al., "Low-Complexity RLS Algorithms Using Dichotomous Coordinate Descent Iterations", IEEE Transactions On Signal Processing, vol. 56, No. 7, 2008, pp. 3150-3161.
Bharadia et al., "Full Duplex MIMO Radios", 2014, 13 pages.
Bharadia et al., "Full Duplex Radios", 2013, 12 pages.
Bai et al., "Convergence of the Iterative Hammerstein System Identification Algorithm", IEEE Transactions On Automatic Control, vol. 49, No. 11, 2004, pp. 1929-1940.

* cited by examiner

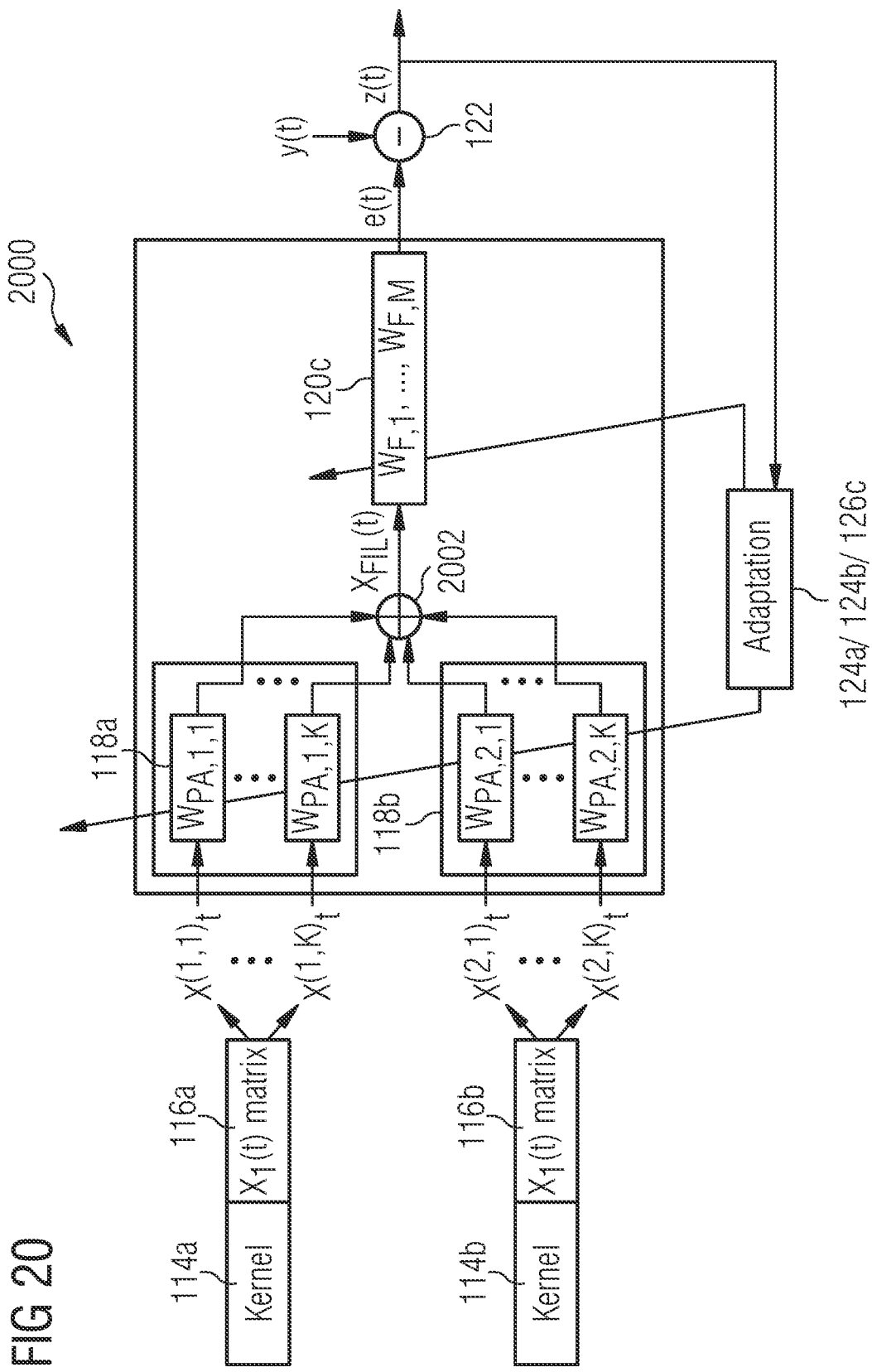

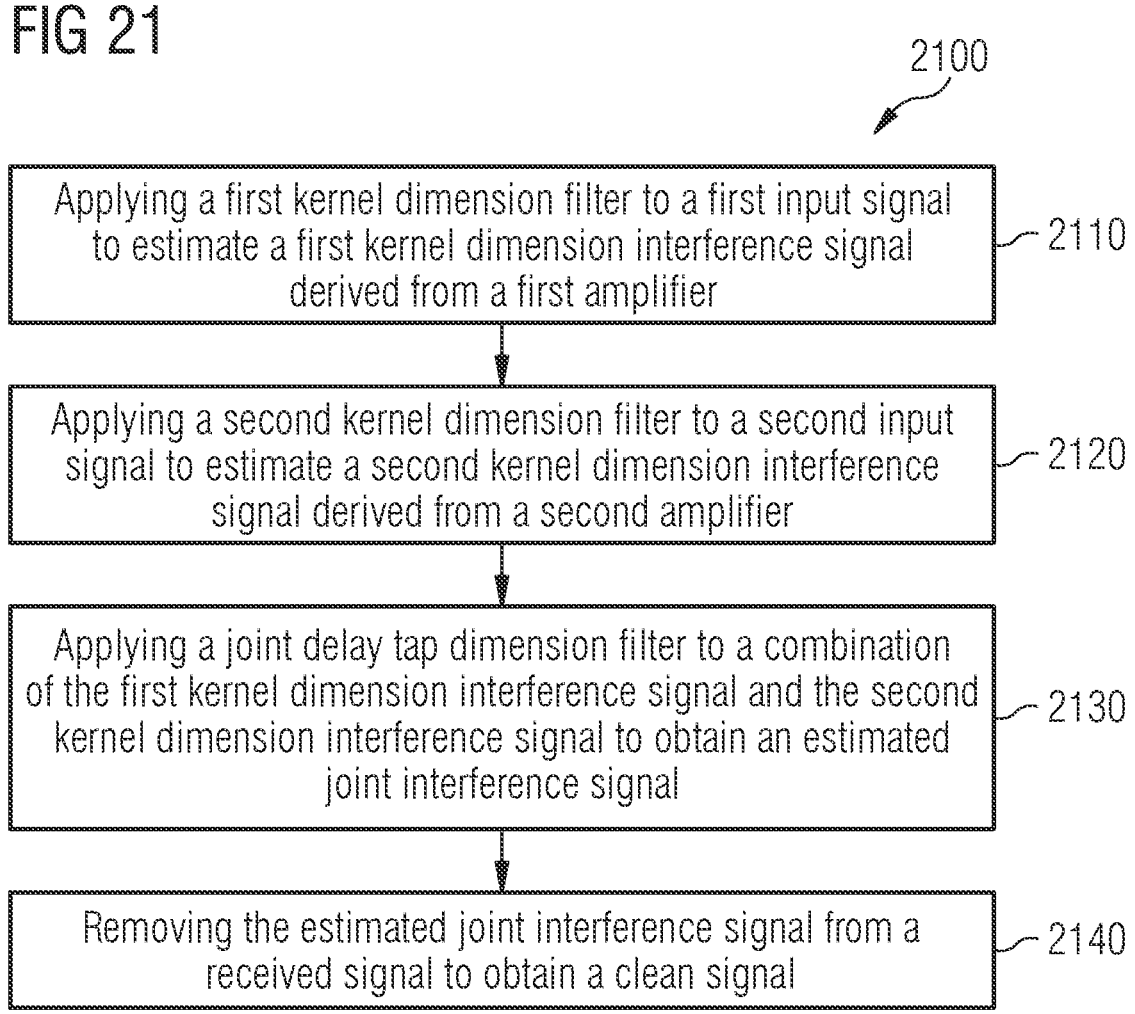

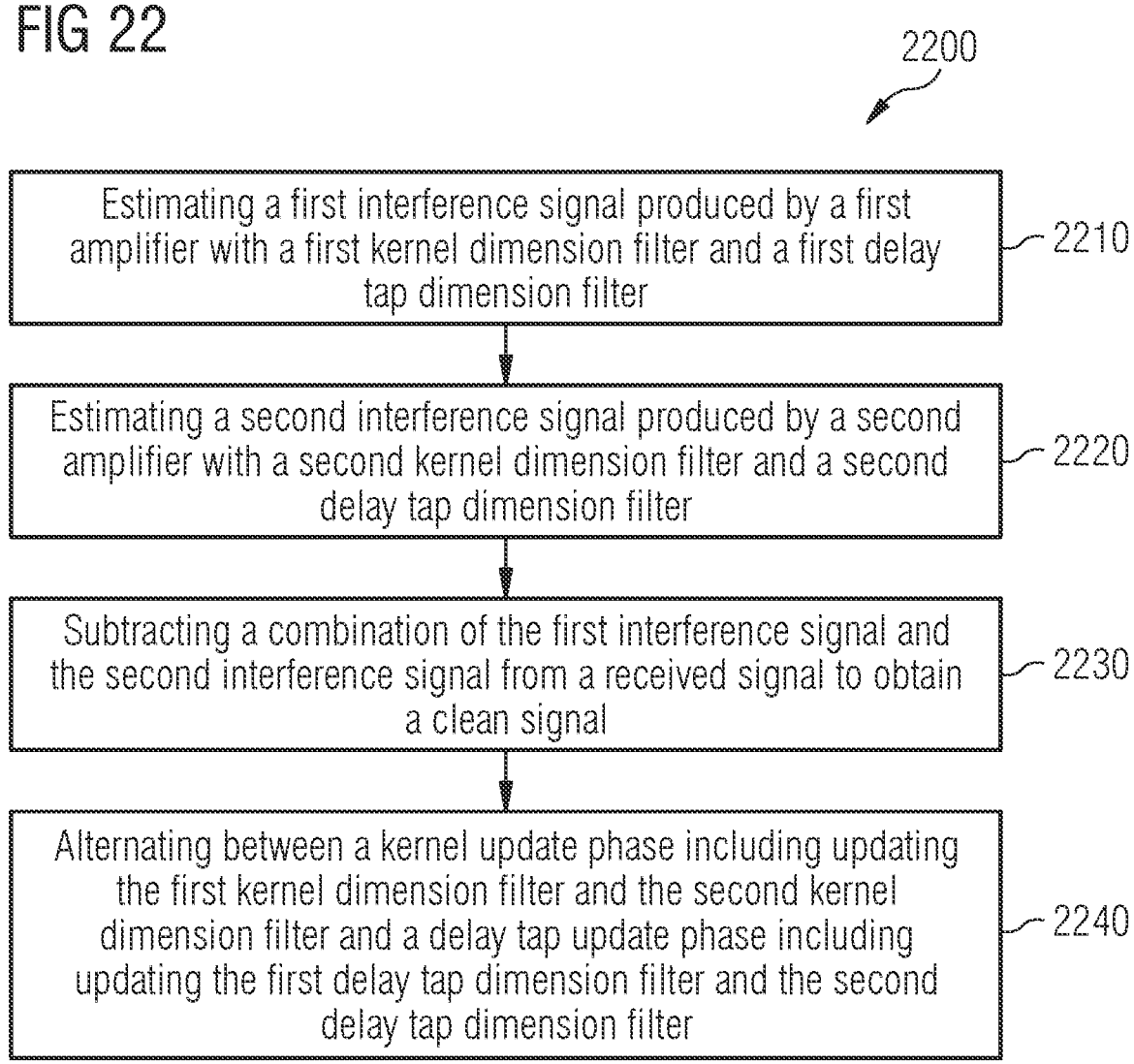

APPARATUSES AND METHODS FOR JOINT INTERFERENCE CANCELATION

CROSS-REFERENCE TO RELATED APPLICATIONS

This application is a national stage entry according to 35 U.S.C. 371 of PCT Application No. PCT/US2016/054286 filed on Sep. 29, 2016, which claims priority to U.S. application Ser. No. 15/214,531 filed on Jul. 20, 2016, which are incorporated herein by reference in their entirety.

TECHNICAL FIELD

Various embodiments relate generally to methods and devices for self-interference cancelation.

BACKGROUND

Interference cancelation is an important component of radio communication systems, in particular for self-interference cancelation for multi-radio coexistence, frequency division duplexing, and full-duplex radio communication systems. As such radio communication systems may transmit and receive simultaneously, interference may leak from the transmit chain to the receive chain and consequently produce corruptive self-interference signal in signals received at the received chain. While certain largely 'passive' solutions such as special duplexing circuitry may be effective in sufficiently isolating the receive chain from the transmit chain, these solutions may be expensive and thus undesirable for many manufacturers.

Digital self-interference cancelation may thus offer a lower cost alternative solution. In such self-interference cancelation solutions, one or more adaptive filters may be utilized to model the leakage path from the transmit chain to the receive chain. Accordingly, assuming an accurate model the adaptive filters may be able to produce estimated interference signals from original transmit signals. The receive chain may then subtract these estimated interference signals from received signals, thus canceling the self-interference from the received signals and producing a clean signal that may be largely free of residual self-interference.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 20 shows a diagram of a bilinear interference cancelation architecture for MIMO with joint FIR filter estimation;

FIG. 21 shows a third method of performing interference cancelation; and

FIG. 22 shows a fourth method of performing interference cancelation.

DESCRIPTION

Figure 1:
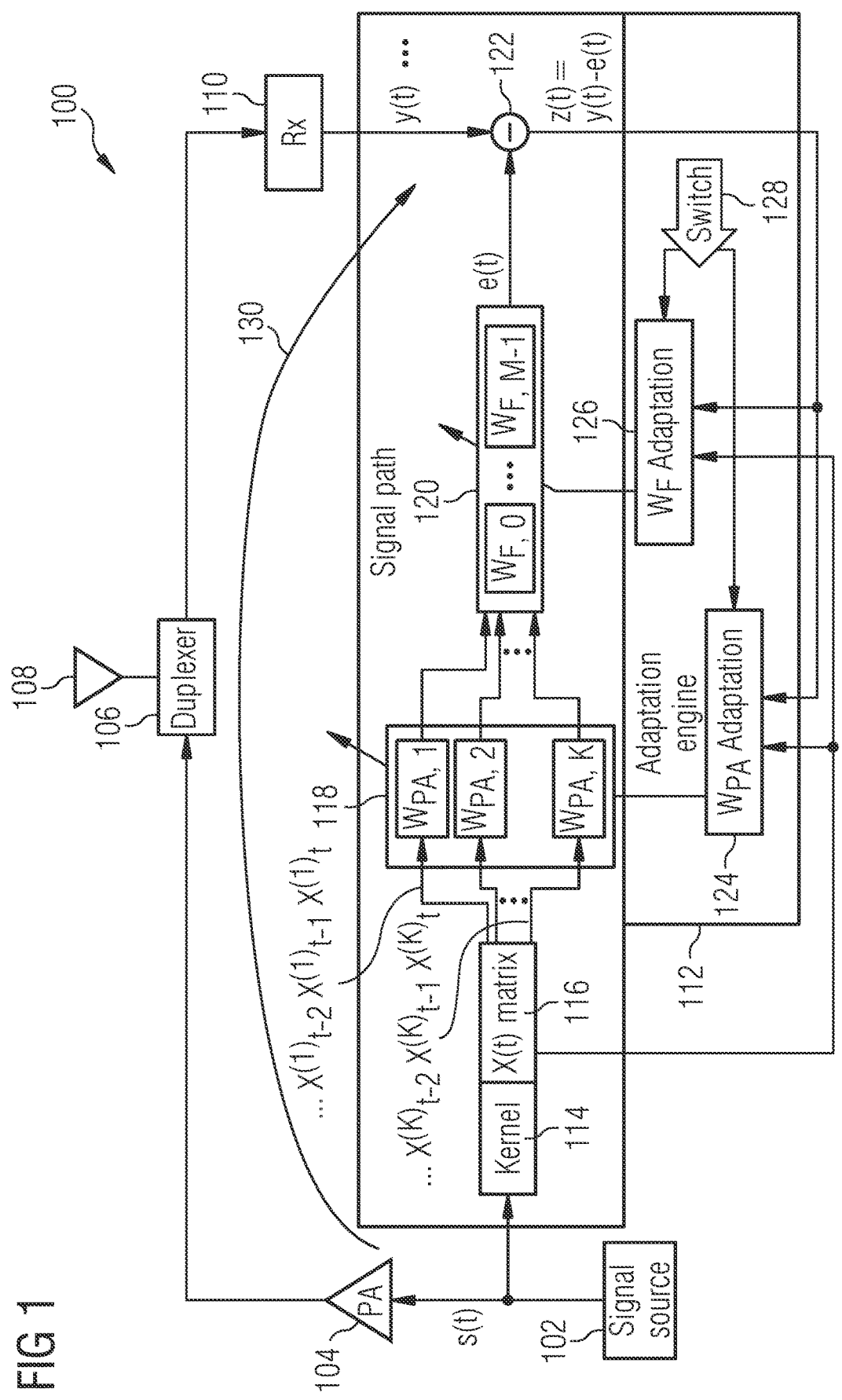
FIG. 1 shows a diagram of communication circuitry.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description and the claims expressly refer to a quantity greater than one. The terms "group (of)", "set [of]", "collection (of)", "series (of)", "sequence (of)", "grouping (of)", etc., and the like in the description and in the claims, if any, refer to a quantity equal to or greater than one, i.e. one or more. Any term expressed in plural form that does not expressly state "plurality" or "multiple" refers to a quantity equal to or greater than one. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g.

including a 1×1 matrix (e.g. a scalar), a 1×M matrix (e.g. a row vector), and an M×1 matrix (e.g. a column vector).

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth®, WLAN (e.g. according to any IEEE 802.11 standard), and other similar radio communication technologies. Metropolitan Area System radio communication technologies include Worldwide Interoperability for Microwave Access (WiMAX™) (e.g. according to an IEEE 802.16 radio communication standard, e.g. WiMAX™ fixed or WiMAX™ mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup tables and other array indexing or searching operations.

Radio communication systems that involve simultaneous transmission and reception, including frequency-division duplexing, full duplexing, and multi-radio coexistence, commonly suffer from self-interference that is caused by a device's own transmitter. As both frequency-division and full duplexing devices transmit and receive simultaneously, such self-interference arises when the transmit signal leaks onto the receive path in the transceiver. Due to the fact that transmit power is considerably higher than receive power, the transmit signal may dominate the received signals and thus lead to a high degree of corruption at the receiver.

The transmit signal involved in self-interference may conventionally leak from the transmit path to the receive path either through a duplexer and/or over the air. While duplexer leakage may be prevented in through specialized duplexing circuitry such components generally need to be very expensive circuitry in order to provide isolation that is sufficient to avoid crippling self-interference.

Self-interference cancelation has thus been recognized as a potentially more cost-effective solution. In self-interference cancelation schemes, adaptive filters may be used to 'model' the transmit path leakage in order to generate estimated interference signals. These estimated interference signals may then be provided to the receive path, which may subtract the estimated interference signal from the received signal. Depending on the accuracy of the employed adaptive filters, the receiver may be able to counter the leakage signal and thus produce a clean signal that is largely free of interference. Self-interference cancelation may thus relax the requirements for expensive duplexers and allow for most cost-efficient transceiver designs.

The adaptive filters used in self-interference cancelation techniques may aim to model the radio power amplifier employed in the transmit path. However, as such radio power amplifiers are generally non-linear, the approximation techniques required to generate accurate filter weights may be relatively complex. Accordingly, many self-interference cancelation approaches may model the power amplifier as a set of 'kernels', where each kernel is tailored to model a separate nonlinear component of the response of power amplifier response. The self-interference cancelation architecture may then derive a separate adaptive filter tailored to each kernel, where the each input sample for the power amplifier may be decomposed into a kernel sample for each kernel and applied to the corresponding adaptive filter. As such designs may conventionally utilize memory-based filters, each adaptive filter may be applied to each kernel sample in addition to the previous kernel samples, or 'taps', in order to generate a filter output. The sum of the adaptive filter output for each kernel may then give the estimated interference signal (where each adaptive filter models the interference contributed by the corresponding kernel), which may be subtracted from the received signal in order to provide a 'clean' signal that is conceivably free of self-interference.

The adaptation engine responsible for dynamically updating the adaptive filter weights may play a critical role in effective self-interference cancelation. These adaptation engines may predominantly examine the 'clean' signal in order to evaluate the effectiveness of the interference cancelation, i.e. whether there is any interference residue remaining in the clean signal after the estimated interference signal has been removed. Based on the efficacy of the interference cancelation, the adaptation engines may provide updates to the adaptive filter weights in order to continuously improve the cancelation performance.

Many adaptation schemes have been developed that offer varying tradeoffs between convergence and area/power. Accordingly, while approaches such as Recursive Least Squares (RLS) designs may offer extremely fast convergence at the expense of large area and power requirements for hardware implementations. Conversely, Least Mean Squares (LMS) may offer comparatively small area and power costs while suffering from poor convergence speed. Various other adaptation schemes and accompanying hardware designs have been proposed that similarly provide different convergence to area and power tradeoffs.

Many existing adaptation solutions may jointly update filter weights for a two-dimensional filter over both kernels and taps, i.e. by considering the PA response as varying over both taps and kernels. As previously indicated, power amplifier input signals may be decomposed into kernel samples according each of a set of predetermined kernels that collectively model the power amplifier. Each of the adaptive filters may then be tailored to estimate the interference associated with a respective kernel based on the current kernel sample and a number of past kernel samples. The adaptive filters may thus function as Finite Impulse Response (FIR) filters that hold the current and multiple previous input samples, apply a respective filter weight to each input sample, and sum the weighted outputs to obtain the filter output. Accordingly, for a given memory length M, i.e. M total taps, each adaptive filter may apply a respective filter weight (out of M total filter weights) to a respective one of the M taps. Expressed mathematically, given an length-M input sample vector $X(t)=[X_t, X_{t-1}, X_{t-2}, \ldots, X_{t-M+1}]$ at a given time t, an FIR filter W with M×1 weight vector $W=[w_0, w_1, \ldots, w_{M-1}]^T$ may calculate a filter output e(t) as $$e(t) = X(t)W \qquad (1)$$
$$= w_0 X_t + w_1 X_{t-1} + w_2 X_{t-2} + \ldots + w_{M-1} X_{t-M+1}$$

where $X_t$ is the current input sample and $X_{t-1}$ to $X_{t-M+1}$ are the M−1 previous input samples and each of $w_0$ to $w_{M-1}$ is a complex weight.

Accordingly, the adaptive filter may need to store the M−1 previous input samples of X(t) in addition to the current sample and, for each new input sample, apply the M weights of W to X(t) in order to obtain filter output e(t), which may represent the estimated self-interference, or 'echo'. By selecting proper weights, the FIR filter W may be able to 'filter' X(t) in order to produce filter output y(t) with certain desired characteristics, such as e.g. to approximate the kernel output in the context of self-interference cancelation.

As previously detailed, many self-interference cancelation schemes may employ kernelization to model the power amplifier as a set of kernels that each represent a non-linear component of the power amplifier (where the case described above regarding Equation (1) may thus be a non-kernelized or single kernel approach). Accordingly, such self-interference cancelation designs may employ a dedicated adaptive filter for each kernel, where each adaptive filter estimates the self-interference resulting from each respectively assigned kernel. Accordingly, the overall filter may be composed of multiple kernel filters that each model a respective kernel. In other words, for a model using K kernels and M taps, the filter W may be a K×M matrix where each row of W may contain the M weights for a respective kernel filter. Accordingly, W may be of the form $$w = \begin{bmatrix} w_t^{(1)} & w_{t-1}^{(1)} & \ldots & w_{t-M+1}^{(1)} \\ \vdots & \vdots & \ddots & \vdots \\ w_t^{(K)} & w_{t-1}^{(K)} & \ldots & w_{t-M+1}^{(K)} \end{bmatrix} \qquad (2)$$

where each k-th row for k=1, 2, ..., K contains the M filter weights for samples $X_t^{(k)}, X_{t-1}^{(k)}, \ldots, X_{t-M+1}^{(k)}$, of the k-th kernel.

The filter system may thus need to retain the previous M samples for each kernel (including the current sample); accordingly, X(t) may thus be defined as a K×M matrix of the past M samples for each of the K kernels, i.e.

$$X(t) = \begin{bmatrix} X_t^{(1)} & X_{t-1}^{(1)} & \ldots & X_{t-M+1}^{(1)} \\ \vdots & \vdots & \ddots & \vdots \\ X_t^{(K)} & X_{t-1}^{(K)} & \ldots & X_{t-M+1}^{(K)} \end{bmatrix} \qquad (3)$$

Denoting the kernel samples for the k-th kernel as $X^{(k)}(t)=[X_t^{(k)} \ldots X_{t-M+1}^{(k)}]$ and the kernel weights for the k-th kernel as $W^{(k)}=[w_t^{(k)} \ldots w_{t-M+1}^{(k)}]$, the overall filter output e(t) may be given as $$e(t) = \sum_{i=1}^{K} X^{(i)}(t) W^{(i)} \quad (4)$$

The filter output may thus produce a single symbol e(t) at each time t that estimates the self-interference as the sum of the application of each of the K kernel filters to the previous M kernel samples of each kernel. Accordingly, such self-interference cancelation designs (which may be commonly known as "Hammerstein" models) may model the leakage as the sum of the contributions of each kernel. The estimated interference signal e(t) may then be subtracted from the received signal y(t) (observed at the receive chain). Assuming the filter W is a suitable approximation of the actual self-interference signal, the resulting 'clean' signal z(t) (where z(t)=y(t)−e(t)) may only contain a small or even negligible amount of residual self-interference and thus may be properly received and decoded by the receiver.

Self-interference cancelation designs may generally compute filter weight updates based on analysis of the clean signal z(t) to determine both which filter weights of W are contributing to the interference residue in z(t) and how to optimally adapt these filter weights to minimize the interference residue for future input samples. As the overall filter W in such conventional solutions may be a K×M matrix of filter weights, an optimal self-interference cancelation scheme may adapt all of the KM total filter weights at each input sample. However, the required computational complexity of updating all KM filter weights may be prohibitively high and, consequently, many self-interference cancelation schemes have explored adaptation schemes that both reduce the number of weights updated at each stage and reduce the computational complexity of the update calculation.

As detailed herein, an advantageous self-interference cancelation solution of this disclosure may 'decouple' the FIR dimension from the kernel dimension in order to allow for computationally manageable adaptation stages. As will be detailed, this decoupling may allow for the FIR dimension to be updated separately from the kernel dimension and may additionally enable the usage of numerous additional computational techniques that may reduce the adaptation complexity. In particular for hardware implementations, the adaptation engine of this disclosure may provide substantial reductions in area and power and may thus prove to be an attractive design feasible with current radio technology. Additionally, the self-interference cancelation scheme may offer configurability, and accordingly may be able to support variable numbers of taps and kernels for the filter weights.

FIG. 1 shows a block diagram of communication circuitry 100, which may implement the self-interference cancelation system of this disclosure and may be a radio communication device (e.g. a mobile terminal, base station, network access point, etc.). As shown in FIG. 1, signal source 102 may generate a baseband transmit signal s(t) for power amplifier 104, which power amplifier 104 may amplify (following radio modulation, analog-to-digital conversion, and other pre-amplification stages not explicitly shown in FIG. 1) to produce an amplified RF transmit signal. Power amplifier 104 may provide the amplified RF transmit signal to duplexer 106, which may be placed between power amplifier 104 and receiver 110 in order to allow for power amplifier 104 and receiver 110 to share antenna 108 (which may be a single antenna or an antenna array). Accordingly, in a full-duplex or frequency-division duplexing scheme duplexer 106 may allow power amplifier 104 and receiver 110 to simultaneously transmit and receive, respectively, with antenna 108. Without loss of generality, communication circuitry 100 may be employed in short range, metropolitan, or cellular radio communication technologies such as 3GPP technologies (LTE, UMTS, GSM, etc.), Wi-Fi®, Bluetooth®, etc. Communication circuitry 100 may be included in either uplink or downlink devices, including mobile terminals, base station, and network access points.

In addition to duplexer leakage, transmissions may leak onto the receive chain through the air, e.g. even if no antennas are shared (not explicitly shown in FIG. 1). Accordingly, one or both of the shared use of antenna 108 and wireless leakage may create self-interference that leaks from power amplifier 104 to receiver 110 over leakage path 130 as shown in FIG. 1 (where leakage path 130 may be composed of a wired and/or wireless path). Accordingly, the amplified radio transmit signal produced by power amplifier 104 via amplification of baseband transmit signal s(t) may appear in the received baseband signal y(t) produced by receiver 110. Accordingly, the presence of this leakage signal in y(t) may corrupt a desired component of y(t), i.e. the signal actually targeted by receiver 110 (such as a downlink signal received from a base station or an uplink signal received from a mobile terminal).

While incorporation of specialized duplexing circuitry in duplexer 106 may minimize the self-interference, such may be considerably expensive and thus undesirable in many designs. In order to enable sufficient reception performance by receiver 110, communication circuitry 100 may instead implement the self-interference cancelation of this disclosure with cancelation circuitry 112. As will be detailed, cancelation circuitry 112 may be configured to generate an estimated interference signal e(t) from s(t) and subtract e(t) from y(t) to produce clean signal z(t). Assuming generation of e(t) that accurately models leakage path 130, cancelation circuitry 112 may be able to effectively remove the self-interference signal from y(t) and thus produce clean signal z(t) that is largely free of self-interference. Cancelation circuitry 112 may employ an adaptive filter system in order to model leakage path 130 which, as detailed below, decouples the PA dimension of the filter from the FIR dimension, thus allowing for reduced computational demands during adaptation.

As will be detailed, in an aspect of this disclosure communication circuitry 100 may be characterized as a communication circuit arrangement including a signal path circuit (e.g. the signal path of cancelation circuitry 112) configured to separately apply a kernel dimension filter and a delay tap dimension filter to an input signal for an amplifier to obtain an estimated interference signal, a cancelation circuit (e.g. cancelation circuit 122) configured to subtract the estimated interference signal from a received signal to obtain a clean signal, and a filter update circuit (e.g. the adaptation engine of cancelation circuitry 112) configured to alternate between updating the kernel dimension filter and the delay tap dimension filter. In another aspect of this disclosure, communication circuitry 100 may be characterized as a communication circuit arrangement including a subsignal generation circuit (e.g. kernel generation circuit 114) configured to obtain one or more subsignals from an input signal for an amplifier, each of the one or more subsignals representing a non-linear component of an amplifier response and composed of a plurality of delay taps, a signal path circuit (e.g. the signal path of cancelation circuitry 112) configured to separately apply a first filter and a second filter to the one or more subsignals to obtain an estimated interference signal, wherein the first filter approximates the amplifier response over the one or more subsignals and the second filter approximates the amplifier response over the plurality of delay taps, a cancelation circuit (e.g. cancelation circuit 122) configured to subtract the estimated interference signal from the received signal to obtain a clean signal, and a filter update circuit (e.g. the adaptation engine of cancelation circuitry 112) configured to alternate between updating the first filter and updating the second filter using the clean signal.

Accordingly, as opposed to utilizing a two-dimensional filter W as expressed above in Equation (2), cancelation circuitry 112 may utilize a single-dimensional K×1 power amplifier filter $W_{PA}$ (PA filter circuit 118) and a single-dimensional M×1 FIR filter $W_F$ (FIR filter circuit 120). Instead of employing M different weights for each of the K PA kernels, cancelation circuitry 112 may thus decouple the PA dimension from the FIR dimension and utilize a single set of K×1 PA filter weights in $W_{PA}$ to collectively model the K PA kernels (over all taps) and similarly utilize a single set of M×1 FIR filter weights in $W_F$ to collectively model the M taps (over all kernels). Given this drastic reduction in the amount of filter weights (from KM to K+M), cancelation circuitry 112 may considerably reduce the amount of computation needed to adapt the filter weights. Accordingly, cancelation circuitry 112 may present an attractive self-interference cancelation system that offers strong convergence speeds while avoiding excessively complex adaptation calculations. Hardware area may consequently also be substantially reduced due to the lower computational complexity.

As shown in FIG. 1, cancelation circuitry 112 may include kernel generation circuit 114, matrix memory 116, PA filter circuit 118, FIR filter circuit 120, cancelation circuit 122, PA filter adaptation circuit 124, FIR filter adaptation circuit 126, and adaptation switch circuit 128. The corresponding functionality of the components of cancelation circuitry 112 may be structurally realized/embodied as hardware logic, e.g. as one or more integrated circuits or FPGAs, as software logic, e.g. as one or more processors executing program code that defining arithmetic, control, and I/O instructions stored in a non-transitory computer-readable storage medium, or as a combination of hardware and software logic. Accordingly, while the individual components of cancelation circuitry 112 are depicted separately in FIG. 1, this depiction serves to highlight the operation of cancelation circuitry 112 on a functional level; consequently, one or more of the components of cancelation circuitry 112 may be integrated into a common hardware and/or software element. Additionally, the functionality of cancelation circuitry 112 detailed herein (in particular e.g. the formulas/equations, flow charts, and prose descriptions) may be readily incorporated by skilled persons into program code for retrieval from a non-transitory computer readable medium and execution by a processor.

Cancelation circuitry 112 may be logically divided into a signal path and an adaptation engine, where the signal path may be tasked with generating the estimated interference signal e(t) and the adaptation engine may be tasked with adapting the filter coefficients of PA filter circuit 118 and FIR filter circuit 120. Accordingly, the signal path may be composed of kernel generation circuit 114, matrix memory 116, PA filter circuit 118, FIR filter circuit 120, and cancelation circuit 122 while the adaptation engine may be composed of PA filter adaptation circuit 124, FIR filter adaptation circuit 126, and adaptation switch 128. Accordingly, the signal path may derive the kernel signals $X_{t:t-M+1}^{(k)}$ for each kernel k for each input sample s(t) and apply PA filter $W_{PA}$ to the kernel signals $X_{t:t-M+1}^{(k)}$ for each kernel k, thus producing a 1×M output vector ($W_{PA}^T X(t)$), before applying FIR filter $W_F$ to $W_{PA}^T X(t)$ (yielding $W_{PA}^T X(t) W_F$) to obtain the estimated interference samples e(t). The signal path may thus produce a sample of e(t) for each input sample of s(t) using the most recent M samples for each of the K kernels.

More specifically, kernel generation circuit 114 may obtain baseband transmit signal s(t) from the receive path at the input to power amplifier 104. Depending on the deployment of cancelation circuitry 112, signal source 102 may be a baseband modem or similar baseband processing circuit (e.g. in a mobile terminal implementation) or a baseband unit (BBU) or similar baseband processing circuit (e.g. in a base station or access point implementation. Accordingly, kernel generation circuit 114 may tap the input to PA 104 to obtain s(t) and may subsequently apply processing in order to derive the kernel samples $X_t^{(1:K)}$, i.e. the most recent kernel sample for each of the K kernels. As previously noted, kernel generation circuit 114 circuit may rely on a 'kernelized' model of PA 104 that estimates the non-linear response of PA 104 by dividing the response into multiple components, i.e. kernels, that collectively sum to model the overall response of PA 104. Such may include using e.g. Cholesky decomposition or similar established processing solution in order to derive $X_t^{(1:K)}$. Accordingly, kernel generation circuit 114 may be responsible for generating kernel samples $X_t^{(1:K)}$ from (t). Various such kernelization techniques are established and are compatible for implementation in kernel generation circuit 114.

Kernel generation circuit 114 may thus generate kernel samples $X_t^{(1:K)}$ for each sample s(t) and provide the resulting samples $X_t^{(1:K)}$ to matrix memory 116. As previously detailed, cancelation circuitry 112 may estimate the self-interference signal e(t) based on the M most recent samples (including the current sample at time t) of each of the K kernels, i.e. $X_{t:t-M+1}^{(1:K)}$. Accordingly, memory matrix 116 may store the K×M matrix containing the M most recent samples for each of the K kernels, which may be expressed as X(t) as defined in Equation (3) at each time t.

As processing circuitry 118 may generate an estimated self-interference sample e(t) at each time t, matrix memory 116 may update X(t) with the K new kernel samples $X_t^{(1:K)}$ for each time t and provide X(t) to PA filter circuit 118. PA filter circuit 118 may store the K filter weights of K×1 PA filter weight vector $W_{PA}$, which may be expressed as $$W_{PA} = \begin{bmatrix} w_{PA,1} \\ w_{PA,2} \\ \vdots \\ w_{PA,K} \end{bmatrix} \quad (5)$$

where each $W_{PA,k}$, k=1, . . . , K is the complex PA weight corresponding to the k-th PA kernel.

PA filter circuit 118 may then apply $W_{PA}$ to X(t) as $W_{PA}^T X(t)$ to obtain an M×1 vector, which PA filter circuit 118 may provide to FIR filter circuit 120. FIR filter circuit 120 may likewise store the M filter weights of M×1 filter weight vector $W_F$, which may be expressed as $$W_F = \begin{bmatrix} w_{F,1} \\ w_{F,2} \\ \vdots \\ w_{F,M} \end{bmatrix} \quad (6)$$

where each $w_{F,m}$, m=M is the complex FIR weight corresponding to the m-th tap, i.e. the m-th most recent sample. As leakage path 130 may include (in addition to the non-linear response of PA 104) multiple transmit and receive FIR filters, the weights of FIR filter $W_F$ may therefore model the various taps of each of these FIR filters.

FIR filter circuit 120 may then apply $W_F$ to the output vector $W_{PA}^T X(t)$ of PA filter circuit 118 as $W_{PA}^T X(t) W_F$ to obtain a single estimated self-interference sample e(t) for each time t. Cancelation circuit 122 may then subtract e(t) from y(t) provided by receiver 110 to obtain clean signal z(t)=y(t)−e(t) for each time t, which may be largely free of self-interference if e(t) closely matches the actual self-interference signal leaking from power amplifier 104 through duplexer 106 on leakage path 130.

The efficacy of the self-interference cancelation scheme applied by cancelation circuitry 112 may depend on how accurately $W_{PA}$ and $W_F$ model the self-interference over each kernel and tap. Accordingly, cancelation circuitry 112 may employ the adaptation engine composed of PA filter adaptation circuit 124, FIR filter adaptation circuit 126, and adaptation switch circuit 128 in order to dynamically update the filter weights $W_{PA}$ and $W_F$ of PA filter circuit 118 and FIR filter circuit 120.

As the PA and FIR filter weights $W_{PA}$ and $W_F$ have been decoupled (compared to the 'coupled' weights of W in Equation (2)), the adaptation engine of cancelation circuitry 112 may be able to update $W_{PA}$ and $W_F$ separately, which may substantially reduce the computational complexity of the update process and consequently reduce hardware area and power requirements. Whereas update of the full K×M matrix W involved considering all KM filter weights for update, the adaptation engine may only need to consider either K or M total filter weights of $W_{PA}$ and $W_F$, respectively, at a time. Additionally, the adaptation engine of cancelation circuitry 112 may employ an adaptation scheme in which $W_{PA}$ or $W_F$ (depending on which is currently being updated and which is fixed) is updated for every input sample s(t). Accordingly, $W_{PA}$ or $W_F$ may continuously 'track' the system in real-time in order to adaptively track changes. Furthermore, such may provide the possibility to re-use shared processing circuitry to update $W_{PA}$ and $W_F$ at disparate times, thus allowing for further hardware reductions.

Figure 2:
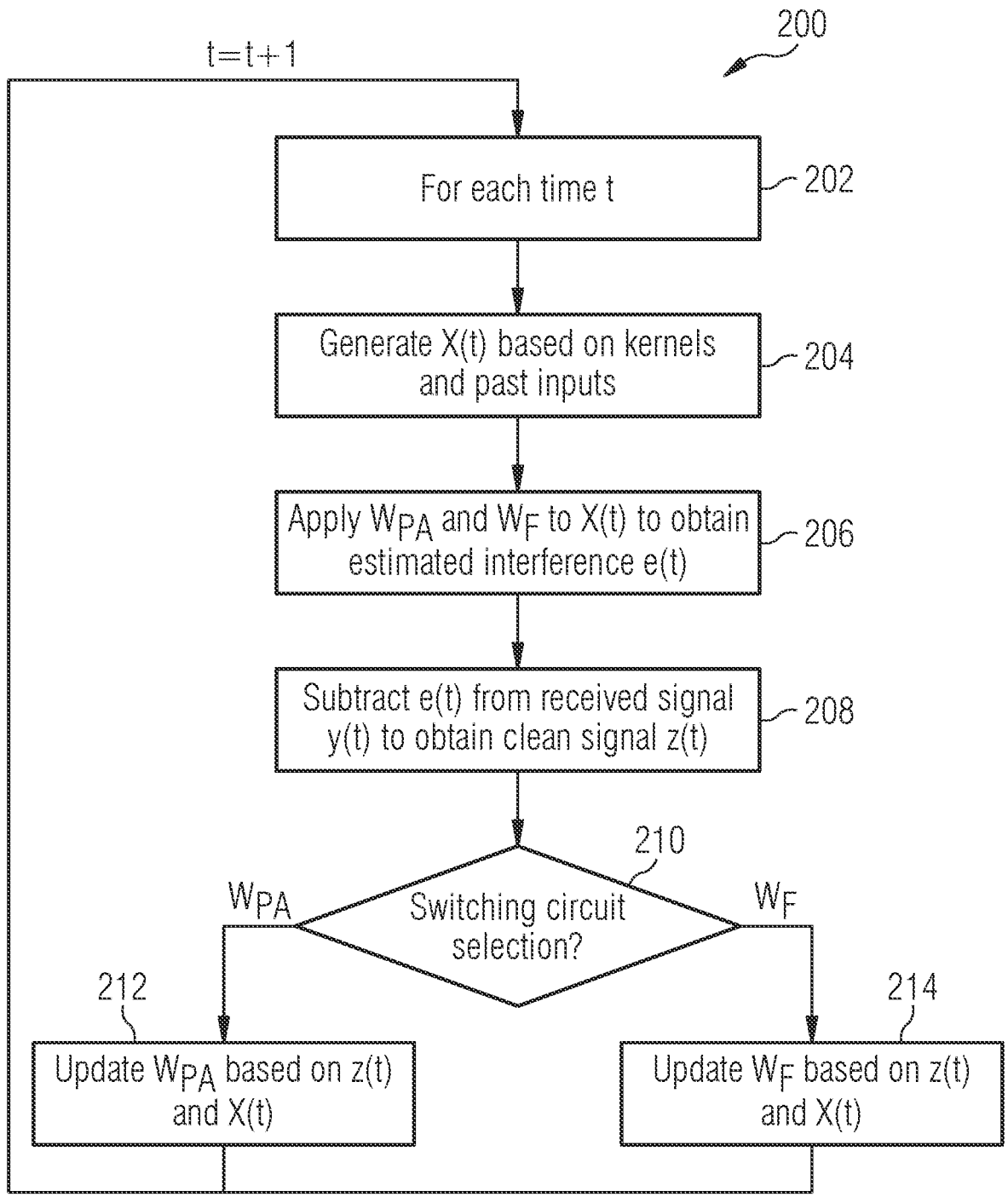
FIG. 2 shows a flow chart illustrating a self-cancelation interference procedure.

FIG. 2 shows method 200 illustrating the general procedure of cancelation circuitry 112, which may iterate over each time t starting at 202. Kernel generation circuit 114 and matrix memory 116 may first generate the KM entries of X(t) from s(t) based on the most recent kernel samples $X_t^{(1:K)}$ and the past kernel samples $X_{t-1:t-M+1}^{(1:K)}$ in 204. Each set of kernel samples $X_{t:t-M+1}^{(k)}$, may thus be considered a 'subsignal' derived from baseband input signal s(t), e.g. according to kernel generation scheme such as based on Cholesky decomposition. PA filter circuit 118 and FIR filter circuit 120 may then apply $W_{PA}$ and $W_F$, respectively, to X(t) as $W_{PA}^T X(t) W_F$ to obtain e(t) in 206. Cancelation circuit 122 may then subtract e(t) from received signal y(t) to obtain clean signal z(t) in 208. If switching circuit 128 has currently selected $W_{PA}$ for adaptation, PA filter adaptation circuit 124 may update $W_{PA}$ based on z(t) and X(t) in 212, i.e. by evaluating the uncanceled leakage in z(t) resulting from X(t); alternatively, if switching circuit 128 has currently selected $W_F$ for adaptation, FIR filter adaptation circuit 126 may update $W_F$ based on z(t) and X(t) in 214. Method 200 may then iteratively repeat for t=t+1, where switching circuit 128 may periodically change the selection between PA adaptation circuit 124 and FIR adaptation circuit 126 in order to ensure that both $W_{PA}$ and $W_F$ are updated over time.

The decoupling of $W_{PA}$ and $W_F$ updates may provide considerable reductions in computational complexity due to the reduced number of filter weights, which may also open up the possibility for re-using the same shared processing circuitry to update $W_{PA}$ and $W_F$ at alternating times (thus further saving hardware area). Additionally, the decoupling of $W_{PA}$ and $W_F$ may allow for cancelation circuitry 112 to also employ numerous additional computational techniques that further reduce the computational complexity. As will be further detailed below, such techniques may include a Dichotomous Coordinate Descent (DCD) update algorithm, simplified maximum magnitude selection, reduced matrix memory storage, preprocessing calculation stages, and clock pipelining schedules. The self-interference cancelation solution of this disclosure may additionally offer configurability in terms of the supported number of taps M and kernels K. Such enhancements are considered optional and may or may not be included in various aspects of this disclosure.

The general update procedure of the adaptation engine of cancelation circuitry 112 will first be detailed. As $W_{PA}$ and $W_F$ are decoupled into two separate vectors, the adaptation engine may update each of $W_{PA}$ and $W_F$ separately (as in 212 and 214 of method 200 depending on the selection of switching circuit 128). By updating only one of $W_{PA}$ or $W_F$ at a time, the adaptation engine may 'fix' one dimension (i.e. either the PA dimension or the FIR dimension) and ignore any dependencies on the fixed dimension during update of the other dimension, thus simplifying the adaptation process. Accordingly, switching circuit 128 may control PA filter adaptation circuit 124 and FIR filter adaptation circuit 126 to alternate between updating the PA weights of $W_{PA}$ and the FIR weights of $W_F$. Accordingly, only K or M filter weights will be considered for update at a given time (resulting directly from the decoupling), which may present a drastic reduction over the KM filter weights of W.

As previously indicated, the adaptation engine may utilize clean signal z(t) in order to decide which filter weights to update. More specifically, as shown in FIG. 1 both PA filter adaptation circuit 124 and FIR adaptation circuit 126 may receive both z(t) and X(t) (the clean signal sample z(t) and kernel sample matrix X(t) at time t) and compare z(t) with X(t) to determine if z(t) is correlated with X(t). Accordingly, if z(t) is correlated with X(t), this may indicate that the self-interference cancelation is not effective and that the filter weights need to be adjusted to obtain more accurate estimates in e(t). Depending on the specifics of the adaptation scheme used by the adaptation engine, PA filter adaptation circuit 124 and FIR adaptation circuit 126 may then analyze the relationship between z(t) with X(t) in order to identify one or more filter weights of $W_{PA}$ and $W_F$ to update. In optimal adaptation schemes, PA filter adaptation circuit 124 and FIR adaptation circuit 126 may determine an update for each weight of $W_{PA}$ and $W_F$, such as an optimal update for each weight to minimize the square error of an error signal (in the case of LMS) or to minimize a cost function (in the case of RLS). Accordingly, in certain aspects of this disclosure, the adaptation engine of cancelation circuitry 112 may update the filter weights of $W_{PA}$ and $W_F$ with an adaptation scheme, such as e.g. LMS or RLS, which may include switching circuit 128 alternating between update of $W_{PA}$ and $W_F$ by activating one of either PA filter adaptation circuit 124 or FIR filter adaptation circuit 126 at a time. Accordingly, one of either $W_{PA}$ and $W_F$ will be updated during each update iteration at time t and the weight adjustments will be reflected in application of $W_{PA}$ and $W_F$ to X(t+1) by PA filter circuit 118 and FIR filter circuit 120.

While application of such optimal update schemes (i.e. to update each filter weight) to the decoupled filters $W_{PA}$ and $W_F$ is within the scope of the solution presented in this disclosure, such schemes may be overly complex due to the need to calculate an update for each filter weight. Accordingly, the adaptation engine may instead select a reduced number of filter weights (i.e. only some of the filter weights) to update at a time. For example, in update iterations where PA filter adaptation circuit 124 is activated by switching circuit 128 (and thus FIR filter adaptation circuit 126 is deactivated), PA filter adaptation circuit 124 may compare z(t) and X(t) and identify a single weight of $W_{PA}$ that makes the greatest contribution to the self-interference residue remaining in z(t), i.e. that is 'most accountable' for un-canceled self-interference in z(t). PA filter adaptation circuit 124 may then only calculate an update for the identified weight of $W_{PA}$ during the current update iteration. If switching circuit 128 selects to update $W_{PA}$ again during the next update iteration, PA filter adaptation circuit 124 may compare z(t+1) and X(t+1) (i.e. the clean signal and kernel matrix for the next time t+1) and again select a single weight of $W_{PA}$ to update. As the update occurs at the next time t+1, the clean signal z(t+1) may reflect the change in $W_{PA}$ as e(t+1) will directly depend on the updated weight. FIR filter adaptation circuit 126 may similarly select single weights of $W_F$ to update during each update iteration for which FIR filter adaptation circuit 126 is activated by switching circuit 128.

Accordingly, instead of updating all or some of the filter weights of $W_{PA}$ and $W_F$ during each update iteration, the adaptation engine may select only one weight of $W_{PA}$ or $W_F$ (depending on the selection by switching circuit 128) to update during each update iteration. Such adaptation schemes are commonly known as Coordinate Descent (CD), where updates are made in only a single direction at a time. As previously detailed regarding LMS and RLS, adaptive algorithms may aim to reduce a squared error term or a cost function; accordingly, LMS-CD may update a single weight in order to reduce the squared error term while RLS-CD may update a single weight in order to reduce a cost function. While the adaptation engine of cancelation circuitry 112 may employ any of a number of different adaptation schemes to update $W_F$ and $W_{PA}$, an advantageous solution of this disclosure may utilize an RLS-DCD scheme in which a single weight of $W_F$ or $W_{PA}$ (depending on the current selection of switching circuit 128) is updated using a single bit-inversion in order to minimize a cost function derived from X(t) and z(t). Accordingly, in each update iteration, the appropriate adaptation engine (PA filter adaptation circuit 124 or FIR filter adaptation circuit 126) may evaluate X(t) and z(t) to identify which filter weight (of $W_{PA}$ or $W_F$) is the worst-offender in terms of uncanceled leakage in z(t) and to identify which bit of a binary representation of the selected weight should be inverted, or 'flipped', in order to reduce the cost function. Accordingly, this single-bit inversion update of a single weight may yield the 'Dichotomous' Coordinate Descent nomenclature while the minimization of a cost function (namely the uncanceled residue in z(t) represented by the cross-correlation between X(t) and z(t)) may yield the RLS designation. It is nevertheless noted that other adaptation algorithms may be integrated mutatis mutandis in place of the RLS-DCD algorithm to update the decoupled weights of $W_{PA}$ and $W_F$.

Figure 3:
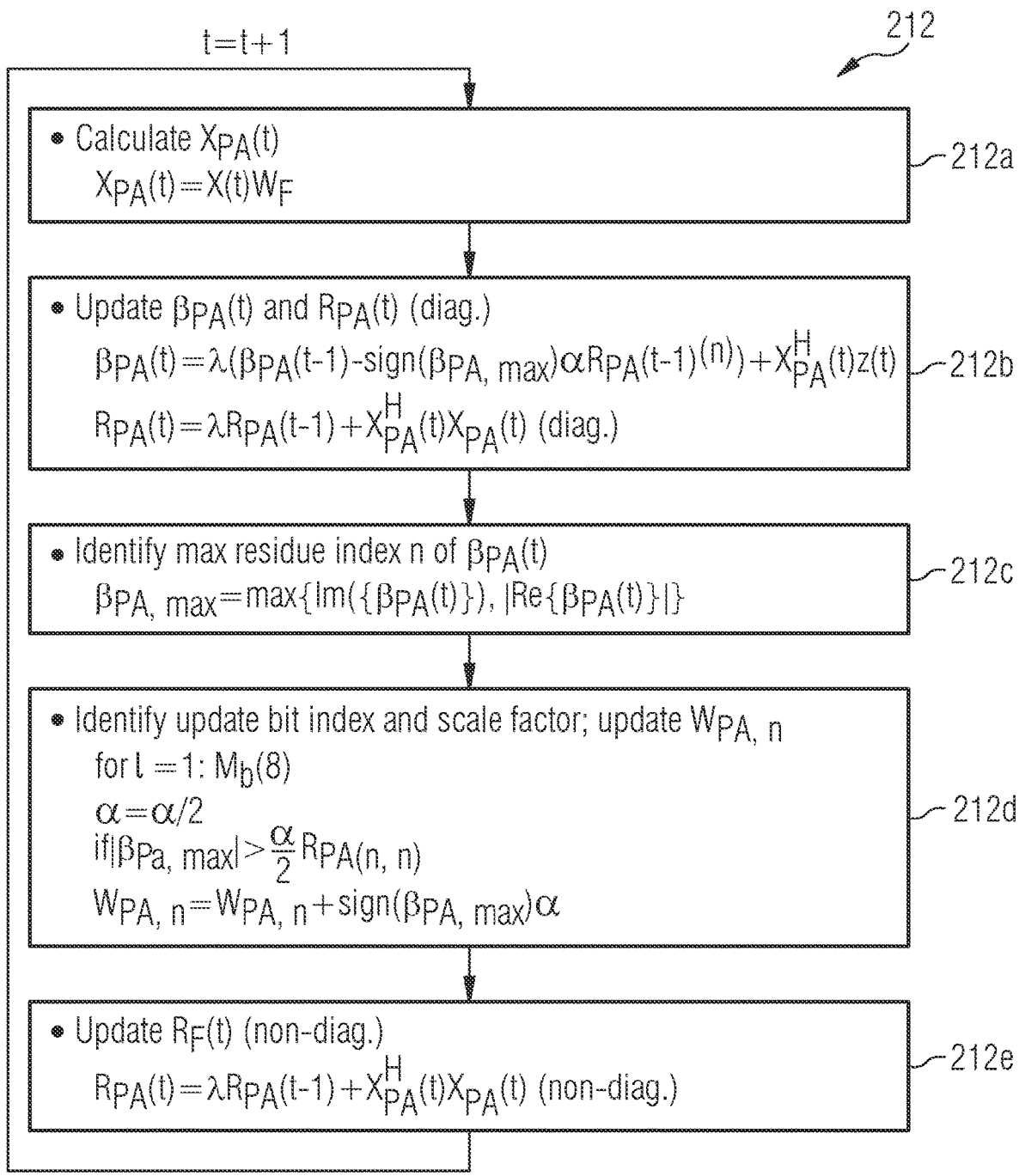
FIG. 3 shows a flow chart illustrating update of a kernel dimension filter.
Figure 4:
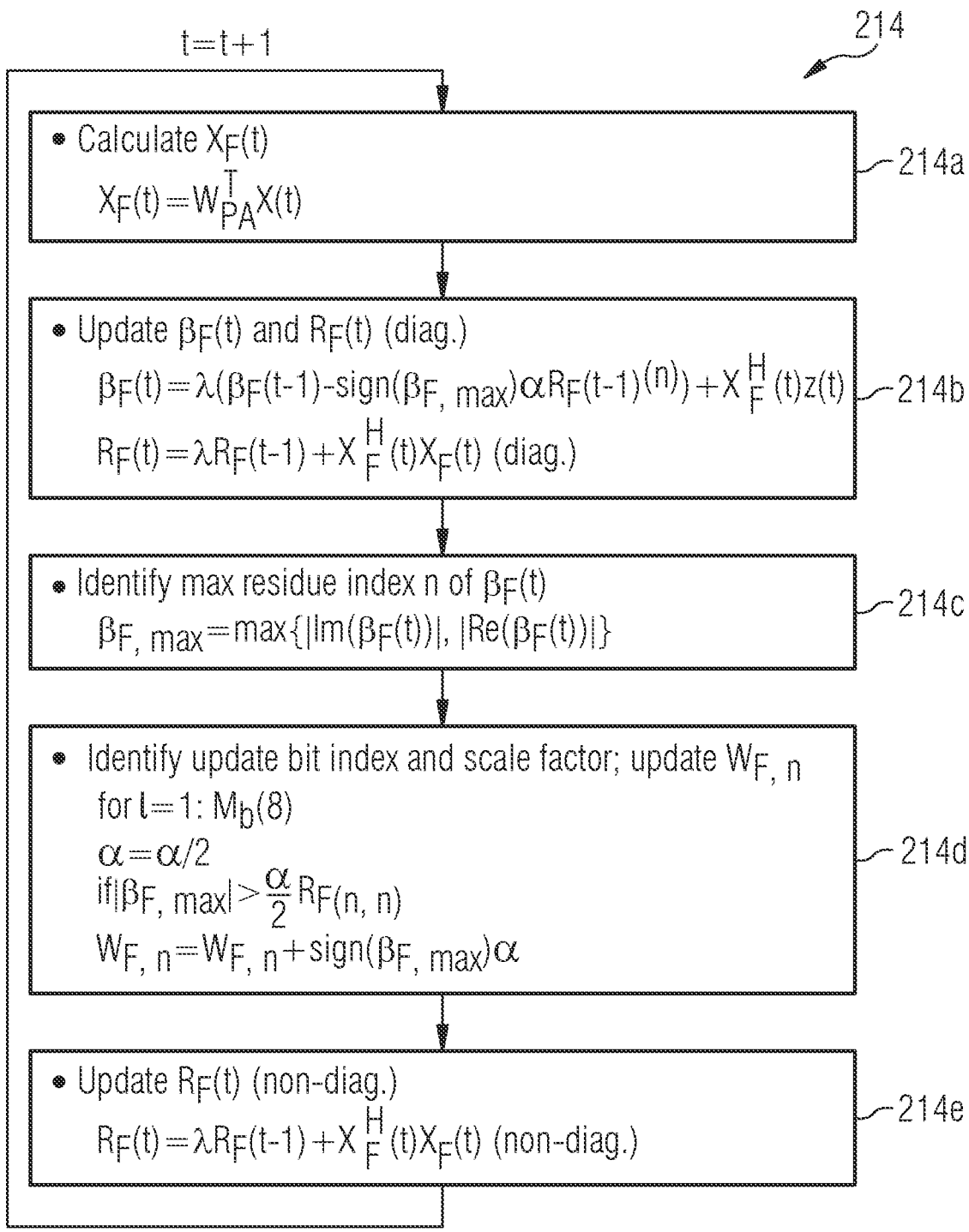
FIG. 4 shows a flow chart illustrating update of a delay tap dimension filter.

FIGS. 3 and 4 further illustrate the update iterations 212 and 214 of method 200, where PA filter adaptation circuit 124 and FIR filter adaptation circuit 126 may respectively update $W_{PA}$ and $W_F$ depending on the current selection by switching circuit 128. PA update iteration 212 may involve largely identical calculations to FIR update iteration 214, where the only substantial difference involves the calculation of the decoupled input signals $X_{PA}(t)$ and $X_F(t)$. As will be later detailed, the adaptation engine may thus be able to re-use the same shared circuitry for update iterations 212 and 214. Without loss of generality, the context depicted in FIGS. 3 and 4 and detailed below corresponds to a RLS-DCD adaptation algorithm in which where PA filter adaptation circuit 124 and FIR filter adaptation circuit 126 aim to minimize the uncanceled leakage residue in z(t) by selecting a single bit to invert of a selected filter weight of $W_{PA}$ or $W_F$. However, other adaptation algorithms, such as based on LMS, CD, gradient descent, etc., may also be employed to update $W_{PA}$ and $W_F$ in a decoupled manner while remaining within the scope of this disclosure.

As shown in FIG. 3, PA filter adaptation circuit 124 may first calculate decoupled PA input signal $X_{PA}(t)$ in 212a as $X_{PA}(t)=X(t)W_F$, where $X_{PA}(t)$ is of dimension 1×K and each k-th element of $X_{PA}(t)$ is representative of the M taps of the k-th kernel of X(t). Accordingly, PA filter adaptation circuit 124 may 'fix' the weights of $W_F$ and only pursue update of $W_{PA}$. As previously indicated, PA filter adaption circuit 124 may compare X(t) to z(t) in order to identify which weights of $W_{PA}$ are contributing to uncanceled leakage in z(t). More specifically, PA filter adaptation circuit 124 may utilize the cross-correlation $\beta_{PA}(t)$ between $X_{PA}(t)$ and z(t) in order to identify which elements of $X_{PA}(t)$ are substantially correlated with z(t), thus allowing PA filter adaptation circuit 124 to identify the weights of $W_{PA}$ corresponding to the correlated elements of $X_{PA}(t)$ as requiring update. As PA filter adaptation circuit 124 may need the correlations $R_{PA}(t)$ between each of the samples of $X_{PA}(t)$ in order to calculate the proper update, PA filter adaptation circuit 124 may also calculate correlation matrix $R_{PA}(t)$.

Accordingly, in 212b PA filter adaptation circuit 124 may calculate cross-correlation vector $\beta_{PA}(t)$ (of dimension 1×M) in 212b as $$\beta_{PA}(t)=\lambda(\beta_{PA}(t-1)-\text{sign}(\beta_{PA,max})\alpha R_{PA}(t-1)^{(n)})+X_{PA}^{H}(t)Z(t) \qquad (7)$$

and correlation matrix $R_{PA}(t)$ as $$R_{PA}(t)=\lambda R_{PA}(t-1)+X_{PA}^{H}(t)X_{PA}(t)(\text{diag.}) \qquad (8)$$

where $\lambda$ is a forgetting factor, $\text{sign}(\beta_{PA,max})\alpha R_{PA}(t-1)^{(n)}$ is an update vector that updates $\beta_{PA}(t)$ according to the filter weight update of the n-th element of $W_{PA}$ from the previous iteration at t−1, and (diag.) indicates that only the diagonal elements of $R_{PA}(t)$ are updated. As will be later detailed, $R_{PA}(t-1)^{(n)}$ may be the n-th column vector of $R_{PA}(t-1)$, where n corresponds to the index of $W_{PA}$ that was updated at the iteration for time t−1. As will also be later detailed, the diagonal and non-diagonal elements of $R_{PA}(t)$ may be performed separately in order to support for an effective hardware pipeline schedule, e.g. where the diagonal elements of $R_{PA}(t)$ are updated first in 212b and are later followed by update of the non-diagonal elements of $R_{PA}(t)$ in 212e (e.g. where the diagonal elements of $R_{PA}(t)$ are part of the critical path and thus should be processed before the non-diagonal elements to optimize performance). However, in certain aspects of this disclosure all elements of $R_{PA}(t)$ may alternatively be updated in a single procedure. As the update vector $\text{sign}(\beta_{PA,max})\alpha R_{PA}(t-1)^{(n)}$ depends on the previous update iteration, PA filter adaptation circuit 124 may calculate $\beta_{PA}(t)$ in the first update iteration as $\lambda\beta_{PA}(t-1)+X_{PA}^H(t)z(t)$, where $\beta_{PA}(t-1)$ is the initialization value of $\beta_{PA}$ (which may be set to e.g. a zero matrix). $R_{PA}(t-1)$ may likewise be the initialization value of $R_{PA}$.

Accordingly, $\beta_{PA}(t)$ may indicate the cross-correlation between decoupled PA input signal $X_{PA}(t)$ and clean signal $z(t)$, which thus indicates the residual uncanceled leakage attributed to each weight of $W_{PA}$. Accordingly, inaccurate weights of $W_{PA}$ (i.e. weights that do not accurately characterize the corresponding kernel) will produce corresponding elements of $\beta_{PA}(t)$ that have high magnitude. As the goal of PA filter adaptation circuit 124 is to minimize $\beta_{PA}(t)$ (i.e. $\beta_{PA}(t)$ is the RLS cost function), PA filter adaptation circuit 124 may thus aim to update the weights of $W_{PA}$ in order to reduce $\beta_{PA}(t)$, thus reducing the uncanceled leakage residue in $z(t)$.

As previously indicated, in an RLS-DCD context PA filter adaptation circuit 124 may select a single weight of $W_{PA}$ based on $\beta_{PA}(t)$ and invert a single bit of $W_{PA}$ in order to minimize $\beta_{PA}(t)$. This may be computationally simpler than e.g. updating each weight of $W_{PA}$ and/or calculating an optimum update for each updated weight of $W_{PA}$. As the weights of $W_{PA}$ that make the greatest contribution to uncanceled residue will correspond to the elements of $\beta_{PA}(t)$ with the highest magnitude, PA filter adaptation circuit 124 may in 212c identify the element $\beta_{PA,max}$ of $\beta_{PA}(t)$ having the highest magnitude and the corresponding index n ($n\in 1, \ldots, K$) of $\beta_{PA,max}$ within $\beta_{PA}(t)$, which PA filter adaptation circuit 124 may then apply to update the n-th weight of $W_{PA}$. As the elements of $\beta_{PA}(t)$ may be complex, in an optimal scenario PA filter adaptation circuit 124 may in 212c calculate the Euclidean norm of each element of $\beta_A(t)$ and identify the element with the highest magnitude, i.e. $\max(|\beta_{PA}(t)|)$. However, as such may involve the computation of a squares and square roots ($|a+jb|=\sqrt{a^2+b^2}$), PA filter adaptation circuit 124 may simplify the computation in 212c by identifying the element of $\beta_{PA}(t)$ with the highest real or imaginary part as $\beta_{PA,max}$ (located at index n in $\beta_{PA}(t)$), i.e.

$$\beta_{PA,max}=\max\{|\text{Im}\{\beta_{PA}(t)\}|,|\text{Re}\{\beta_{PA}(t)\}|\} \qquad (9)$$

Accordingly, while Equation (9) is an approximation such may still allow PA filter adaptation circuit 124 to identify an element of $\beta_{PA}(t)$ with the highest real or imaginary part, which may likely be one of the highest if not the highest-magnitude elements of $\beta_{PA}(t)$. PA filter adaptation circuit 124 may thus identify $\beta_{PA,max}$ and the corresponding index n of $\beta_{PA,max}$ in $\beta_{PA}(t)$, which may correspond to the n-th weight of $W_{PA}$ thus resulting in PA filter adaptation circuit 124 identifying the weight of $W_{PA}$ that is selected for update.

PA filter adaptation circuit 124 may then update the n-th weight of $W_{PA}$, $w_{PA,n}$, based on $\beta_{PA,max}$ and correlation matrix $R_{PA}(t)$. In a conventional RLS-CD update solution (i.e. non-Dichotomous), PA filter adaptation circuit 124 may update $W_{PA,n}$ in 212d as $W_{PA,n}=w_{PA,n}+\beta_{PA,max}/R_{PA(n,n)}$, i.e. by performing a division of $\beta_{PA,max}$ by the correlation value $R_{PA(n,n)}$ of the n-th element of $X_{PA}(t)$ with itself (located at the n-th diagonal term of $R_{PA}$), which may provide the optimal minimization of $\beta_{PA}(t)$ as achieved by update of a single weight. Without loss of generality, PA filter adaptation circuit 124 may alternatively avoid the computational complexity of the divisional operation by instead selecting a single bit of w (i.e. to flip from a 0 to 1 or vice versa). As $R_{PA(n,n)}$ is located on the diagonal of $R_{PA}(t)$, PA filter adaptation circuit 124 may thus need to ensure that the diagonal entries of $R_{PA}(t)$ are up-to date at 214d. As the non-diagonally entries of $R_{PA}(t)$ will then be used in 214e to update $R_F(t)$, PA filter adaptation circuit 124 may separate the update of $R_{PA}(t)$ into diagonal and non-diagonal portions in order to enable a pipelined clock schedule that shares computational elements.

As expressed in the algorithmic logic of 212d in FIG. 3, PA filter adaptation circuit 124 may check each of the $M_b$ bits of $w_{PA,n}$ in order to identify which of the bits would optimally minimize $\beta_{PA}(t)$ if inverted. Accordingly, for e.g. $M_b=8$, this may amount to a subtraction of $1, 2, 4, 8, \ldots$, or 128 from $W_{PA,n}$ (i.e. $2^0, 2^1, \ldots, 2^7$). As the optimal update to $W_{PA,n}$ is $-\beta_{PA,max}/R_{PA(n,n)}$, PA filter adaptation circuit 124 may aim to determine in 212d which of the possible subtraction values from $2^{M_b-1}$ to $2^0$ that $\beta_{PA,max}/R_{PA(n,n)}$ is closest to. Accordingly, starting with e.g. $\alpha=2^{M_b}$ (although the initiating value of a may be a design parameter and other values other than the most significant bit could be chosen, such as e.g. the second-most significant bit, third-most significant bit, etc.), PA filter adaptation circuit 124 may iterate from $l=1$ to $l=M_b$ (e.g. $M_b=8$) in order to determine which $$\frac{\alpha}{2}$$

satisfies the condition $$|\beta_{PA,max}| > \frac{\alpha}{2} R_{PA(n,n)}$$

and, upon identifying the appropriate $$\frac{\alpha}{2},$$

take $\alpha$ as the update value for $W_{PA,n}$. By identifying the first $\alpha$ for which $$|\beta_{PA,max}| > \frac{\alpha}{2} R_{PA(n,n)}, \text{ or } \frac{|\beta_{PA,max}|}{R_{PA(n,n)}} > \frac{\alpha}{2},$$

PA filter adaptation circuit 124 may identify the a closest in value to $\beta_{PA,max}/R_{PA(n,n)}$, i.e. the optimum update of $W_{PA,n}$ to minimize $\beta_{PA}(t)$. In other words, starting from a possible set of update values $2^{M_b-1}$ to $2^0$, PA filter adaptation circuit 124 may identify which update value is closest to the optimum update value $\beta_{PA,max}/R_{PA(n,n)}$ and select the identified update value as $\alpha$. Flipping the l-th bit (where l gives the iteration for which $$|\beta_{PA,max}| > \frac{\alpha}{2} R_{PA(n,n)}$$

is satisfied) may thus produce an update of $\alpha$ (positive or negative depending on the sign of $\beta_{PA,max}$).

Upon identifying update factor $\alpha$, PA filter adaptation circuit 124 may flip the l-th LSB bit of $W_{PA,n}$ to update $W_{PA,n}$ as $$W_{PA,n}=W_{PA,n}+\text{sign}(\beta_{F,max})\alpha \quad (10)$$

where sign $(\beta_{F,max})$ preserves the sign of $\beta_{F,max}$ to ensure that $W_{PA,n}$ is updated in the proper direction.

Accordingly, upon completion of the update of $w_{PA,n}$ in 212d, PA filter adaptation circuit 124 may have selected the 'worst offender' $W_{PA,n}$ of $W_{PA}$, i.e. the weight of $W_{PA}$ with the highest contribution (based on having the maximum real or imaginary part) to the uncanceled residue in z(t) and invert a single bit of the selected weight $W_{PA,n}$ in order to minimize $\beta_{PA}(t)$, which in connection also minimizes the leakage residue in z(t). PA filter adaptation circuit 124 may then complete the update iteration for time t by updating the non-diagonal elements of $R_{PA}(t)$ in 212e as $$R_{PA}(t)=\lambda R_{PA}(t-1)+X_{PA}{}^H(t)X_{PA}(t) \text{(non-diag)} \quad (11)$$

As previously indicated, as the update of $\beta_{PA}(t)$ in 212b requires the off-diagonal elements of $R_{PA}(t-1)$ for the n-th column $R_{PA}(t-1)^{(n)}$, PA filter adaptation circuit 124 may perform the off-diagonal update in 212e separately in order to re-use computational hardware for both 212b and 212e.

Assuming switching circuit 128 proceeds to t+1 with PA filter adaptation circuit 124 still selected, PA filter adaptation circuit 124 may repeat 212 for t=t+1. Switching circuit 128 may be configured to maintain the update selection of PA filter adaptation circuit 124 or FIR filter adaptation circuit 126 for multiple iterations before switching, which may include maintaining the selection of either PA filter adaptation circuit 124 or FIR filter adaptation circuit 126 until the selected filter $W_{PA}$ or $W_F$ converges or switching between PA filter adaptation circuit 124 or FIR filter adaptation circuit 126 according to a predetermined cyclic number of update iterations (e.g. every other iteration, every 3 iterations, every 10 iterations, etc.). Accordingly, PA filter adaptation circuit 124 may continue to update $W_{PA}$ during each iteration by calculating a new $X_{PA}(t)$ based on the new X(t) matrix in 212a, updating $\beta_{PA}(t)$ and $R_{PA}(t)$ in 212b, identifying the maximum element $\beta_{PA,max}$ of $\beta_{PA}(t)$ and corresponding index n in 212c, selecting a bit to flip of $W_{PA,n}$ by determining $\alpha$ in 212d, and completing update of $R_{PA}(t)$ in 212e.

Conversely, when switching circuit 128 selects FIR filter adaptation circuit 126 for update, FIR filter adaptation circuit 126 may execute the FIR update iteration 214 as shown in FIG. 4. FIR filter adaptation circuit 126 may thus calculate decoupled FIR input signal $X_F(t)$ in 214a as $X_F(t)=W_{PA}{}^T X(t)$, where $X_F(t)$ is of dimension 1×M and each m-th element represents the joint contribution of all K kernels to the m-th taps X(t). Likewise to PA update iteration 212, FIR filter adaptation circuit 126 may be configured to evaluate the cross-correlation $\beta_F(t)$ between $X_F(t)$ and z(t) in order to identify which taps of $X_F(t)$ are most correlated with z(t), thus identifying which taps of $W_F$ are the 'worst-offenders' in terms of uncanceled residual leakage in z(t). As these taps are accordingly the least accurate, in accordance with RLS-DCD FIR filter adaptation circuit 126 may proceed to select the least accurate tap $W_{F,n}$ and flip a single bit of $W_{F,n}$ to reduce $\beta_F(t)$, thus reducing the uncanceled leakage in z(t).

Accordingly, in 214b FIR filter adaptation circuit 126 may calculate cross-correlation vector $\beta_F(t)$ (of dimension 1×M) as $$\beta_F(t)=\lambda(\beta_F(t-1)-\text{sign}(\beta_{F,max})\alpha R_F(t-1)^{(n)})+X_F{}^H(t)z(t) \quad (12)$$

and correlation matrix $R_F(t)$ as $$R_F(t)=\lambda R_F(t-1)+X_F{}^H(t)X_F(t)(\text{diag.}) \quad (13)$$

where, likewise to PA update iteration 212, $\lambda$ is a forgetting factor, $\text{sign}(\beta_{F,max})\alpha R_F(t-1)^{(n)}$ is an update vector that updates $\beta_F(t)$ according to the filter weight update of the n-th element $W_{F,n}$ of $W_F$ from the previous iteration at t−1 (with the n-th column of $R_F(t)$), and (diag.) indicates that only the diagonal elements of $R_F(t)$ are updated. Likewise to above, FIR filter adaptation circuit 126 may update the diagonal and non-diagonal elements of $R_F(t)$ separately in order to support a hardware pipeline clock schedule that re-uses computational hardware for 214b and 214e; however, in various aspects of this disclosure FIR filter adaptation circuit 126 may alternatively update all elements of $R_F(t)$ in a single procedure. As the update vector $\text{sign}(\beta_{F,max})\alpha R_F(t-1)^{(n)}$ depends on the previous update iteration, FIR filter adaptation circuit 124 may calculate $\beta_F(t)$ in the first update iteration as $\lambda\beta_F(t-1)+X_F{}^H(t)z(t)$, where $\beta_F(t-1)$ is the initialization value of $\beta_F$ (which may be set to e.g. a zero matrix). $R_F(t-1)$ may likewise be the initialization value of $R_F$.

As in PA update iteration 212, $\beta_F(t)$ may represent the cross-correlation between each tap of decoupled FIR input signal $X_F(t)$ and clean signal z(t). Accordingly, FIR filter adaptation circuit 126 may aim to identify the element of $\beta_F(t)$ with the highest magnitude, which may point to the element of $W_F$ that is least accurate. FIR filter adaptation circuit 126 may thus identify index n of the maximum-valued element of $\beta_F(t)$ in 214c as $$\beta_{F,max}=\max\{|\text{Im}\{\beta_F(t)\}|,|\text{Re}\{\beta_F(t)\}|\} \quad (14)$$

As detailed above regarding 212c, identifying the element $\beta_{F,max}$ of $\beta_F(t)$ with the highest real or imaginary part may be less computationally complex than calculating the magnitude (e.g. L2 norm) of each element of $\beta_F(t)$. The approximation of Equation (14) may nevertheless generally identify $\beta_{F,max}$ as an element of $\beta_F(t)$ that has one of the highest magnitudes.

FIR filter adaptation circuit 126 may thus identify $\beta_{F,max}$ and the index n of $\beta_{F,max}$ within $\beta_F(t)$, where index n also corresponds to the index of the weight $W_{F,n}$ of $W_F(t)$ that is the 'worst offender' and thus needs to be updated. Likewise as to 212d, FIR filter adaptation circuit 126 may in 214d select a single bit of $W_{F,n}$ to flip in order to minimize $\beta_F(t)$. As the optimum update value of $W_{F,n}$ is given as $\beta_{F,max}/R_{F(n,n)}$, FIR filter adaptation circuit 126 may identify the scale factor $\alpha \in (2^0, 2^1, \ldots, 2^{M_b-1})$ (each corresponding to flipping the l-th bit of $W_{F,n}$ for l=1, 2, ..., $M_b$) to adjust $W_{F,n}$ by.

Accordingly, as shown in FIG. 4, in 214d FIR filter adaptation circuit 126 may check the condition $$|\beta_{F,max}| > \frac{\alpha}{2} R_{F(n,n)}$$

for $\alpha=2^{M_b-1}$ to $2^0$ and, if the condition is satisfied, take the current value of $\alpha$ as being closest to the optimum update value $\beta_{F,max}/R_{F(n,n)}$ and update $W_{F,n}$ as $$w_{F,n}=w_{F,n}+\text{sign}(\beta_{F,max})\alpha \quad (15)$$

thus updating $W_F$ to minimize the uncanceled leakage residue indicated by $\beta_F(t)$.

FIR filter adaptation circuit 126 may then update the off-diagonal elements of $R_F(t)$ as $$R_F(t)=\lambda R_F(t-1)+X_F^H(t)X_F(t)(\text{non-diag.}) \quad (16)$$

As in the case of PA filter adaptation circuit 124 noted above, FIR filter adaptation circuit 126 may then proceed to update $W_F(t)$ in the next iteration for t=t+1 with X(t+1) and z(t+1) if switching circuit 128 maintains the selection of FIR filter adaptation circuit 126.

As update of PA filter $W_{PA}$ and FIR filter $W_F$ are decoupled, each of PA filter adaptation circuit 124 and FIR filter adaptation circuit 126 may be able to compute updates to $W_{PA}$ and $W_F$ in an isolated environment, i.e. without having to account for the other dimension. The computational requirements required for each update may be substantially reduced in comparison with the two-dimensional case of the K×M filter matrix W noted above regarding the existing solution. In particular, the computational complexity of the correlation matrices $R_{PA}$ and $R_F$ may be markedly diminished. More specifically, in the existing solution the adaptation engine may be required to compute a KM×KM correlation matrix R that represents the correlations between each M taps of each K kernels. In contrast, the adaptation engine of cancelation circuitry 112 may only need to calculate K×K PA correlation matrix $R_{PA}$ and M×M FIR correlation matrix $R_F$. Furthermore, instead of applying the K×M filter W to X(t) as in the existing solution, the signal path of cancelation circuitry 112 may only apply a K×1 PA filter vector $W_{PA}$ and M×1 FIR filter vector $W_F$.

Various advantageous modifications have been noted above regarding cancelation circuitry 112, including the use of RLS-DCD (as opposed to gradient descent, traditional coordinate descent, etc.) and identifying the maximum magnitude on account of the highest real or imaginary component. These simplifications are optional, and may or may not be utilized along with the decoupled filter application and adaptation while still remaining within the scope of this disclosure. The adaptation engine may optionally also employ a variety of further techniques in order to reduce the required computational complexity, including reduced matrix storage, preprocessing calculation stages, and specific pipelining schedules that allow for re-use of hardware during different clock cycles.

Figure 5:
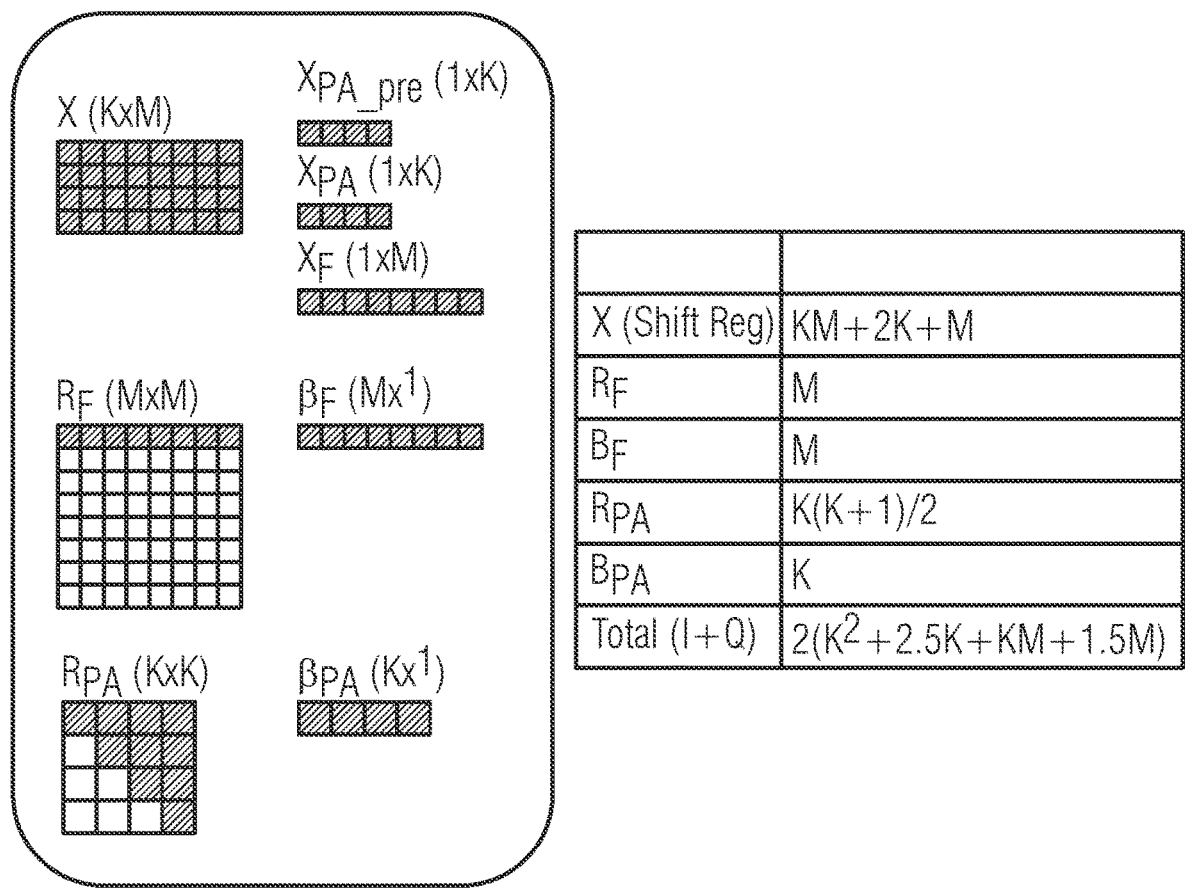
FIG. 5 shows a graphical depiction of a matrix storage scheme.

FIG. 5 shows a matrix memory storage scheme that the adaptation engine of cancelation circuitry 112 may employ in order to both reduce the amount of required memory and required calculations during each PA and FIR update iteration in 212 and 214, respectively. As previously indicated, matrix memory 116 may store the M most recent samples for each of the K kernels, which as shown in FIG. 1 may also be provided to PA filter adaptation circuit 124 and FIR filter adaptation circuit 126 for calculation of $X_{PA}(t)$, $X_F(t)$, $R_{PA}(t)$, $R_F(t)$, $\beta_{PA}(t)$, and $\beta_F(t)$.

Figure 6:
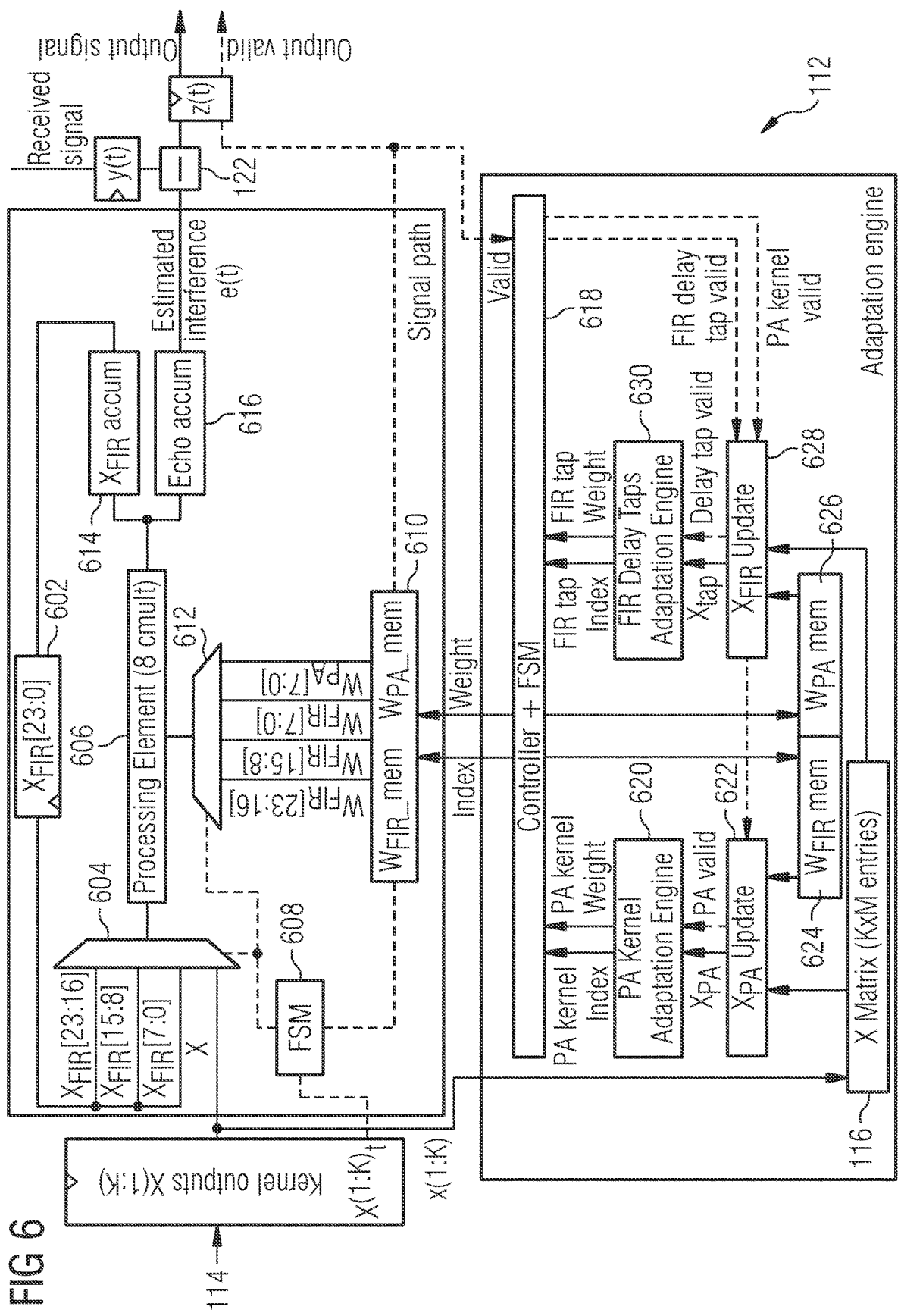
FIG. 6 shows a diagram of processing circuitry including a signal path and an adaptation engine.

FIG. 6 shows a more detailed architecture of cancelation circuitry 112, which may correspond to the matrix storage scheme of FIG. 5. As shown in FIG. 6, kernel generation circuit 114 may provide the kernel outputs $X_t^{(1:K)}$ for time t to the signal path and adaptation engine of cancelation circuitry 112. In the implementation of FIG. 6, matrix memory 116 may be located in the adaptation engine and accordingly may store the KM samples $X_{t:t-M+1}^{(1:K)}$ for use in updating $W_{PA}$ and $W_F$. This K×M storage is thus reflected in the matrix storage scheme of FIG. 5. Likewise, FIR filter memory 624 and PA filter memory 626 may each store the respective M and K weights of $W_F$ and $W_{PA}$, which may similarly be stored at filter memory 610 of the signal path.

In a general description of the operation of cancelation circuitry 112 as shown in FIG. 6, processing element 606 may apply $W_{PA}$ and $W_F$ to X(t) as previously detailed. In order to reduce hardware complexity and area, processing element 606 may utilize a pipelined approach in order to apply $W_{PA}$ and $W_F$ to X(t). In the example of FIG. 6, processing element 606 may be composed of e.g. 8 complex multipliers and 7 complex adders and may apply $W_{PA}$ and $W_F$ to X(t) over four cycles (although it is noted that numerous other implementations including a full, single-cycle (i.e. non-pipelined) implementation are within the scope of this disclosure). As noted above, processing element 606 may calculate e(t) as $W_{PA}^T X(t) W_F$, which processing element 606 may perform over e.g. four clock cycles for M=24 and K=8 as a. Clock cycle 1 : Compute $X_{F,t}(t) = \sum_{i=1}^{8} X_t^{(i)}(t) w_{PA,i}$ b. Clock cycle 2 : Compute $EEC_{acc(m=1:8)} = \sum_{i=1}^{8} X_{F,t-i+1}(t) w_{F,i}$ c. Clock cycle 3 : Compute $EEC_{acc(m=1:16)} =$ $\sum_{i=9}^{16} X_{F,t-i+1}(t) w_{F,i} + EEC_{acc(m=1:8)}$ d. Clock cycle 4 : Compute $EEC_{acc(m=1:24)} =$ $\sum_{i=17}^{24} X_{F,t-i+1}(t) w_{F,i} + EEC_{acc(m=1:16)}$ where $e(t)=EEC_{acc(m=1:24)}$, $X_{F,t}(t)$ is the sample of $X_F(t)$ for time t, and $EEC_{acc(m=1:24)}$ denotes the accumulated estimated echo.

Accordingly, processing element 606 may calculate the most recent sample $X_{F,t}(t)$ of $X_F(t)$ in clock cycle 1 by applying $W_{PA}$ to the K samples of X(t) for time t, i.e. the kernel samples for each of the K kernels. As denoted in clock cycle 1 above, processing element 606 may apply 8 complex multipliers to calculate $X_t^{(i)}(t)w_{PA,i}$ for i=1, . . . , 8 and provide each intermediate product to accumulation circuit 614, which may sum each intermediate product to obtain $X_{F,t}(t)$. Accumulation circuit 614 may then provide each $X_{F,t}(t)$ to register 602, which may hold the M samples of $X_F(t)$, e.g. as a first-in-first-out buffer where the oldest sample from time t−M is pushed out and the newest sample for time t is entered. Accordingly, the signal path of processing circuit 112 may avoid performing the entire multiplication of $X_F(t)=W_{PA}^T X(t)$ and instead calculate a single sample $X_{F,t}(t)$ at each time t and store the results in register 602.

Processing element 606 may then calculate e(t) in clock cycles 2-4 by applying $W_F(t)$ to $X_F(t)$. As detailed above for clock cycles 2-4, processing element 606 may employ the 8 complex multipliers to calculate 8 samples $X_{F,t-i+1}W_{F,i}$ for i=1:8, i=9:16, and i=17:24. Processing element 606 may provide each of the intermediate products $X_{F,t-i+1}W_{F,i}$ to accumulation circuit 616, which may sum each of the 8 intermediate products for each clock cycle to obtain e(t) as the accumulated estimated echo $EEC_{acc(m=1:24)}$. Accumulation circuit 616 may then provide e(t) to cancelation circuit 122, which may then subtract e(t) from received signal y(t)

to obtain clean signal z(t). Depending on the accuracy of $W_{PA}$ and $W_F$, clean signal z(t) may be largely free of self-interference.

As shown in FIG. 6, multiplexers 604 and 612 may provide the appropriate selection of 8 samples from $X_F(t)$, X(t), $W_F$, and $W_{PA}$ to processing element 606 in accordance with the equations provided above for clock cycles 1-4. The multiplexer selection signals may be provided by FSM 608, which may utilize a finite state machine logic to cycle through the appropriate multiplexer selection signals.

As previously detailed above regarding FIGS. 1-4, the adaptation engine of cancelation circuitry 112 may be responsible for adaptively updating $W_{PA}$ and $W_F$ based on X(t) and z(t) in order to enhance the estimation accuracy of e(t) and thus improve the self-interference cancelation offered by cancelation circuitry 112. As shown in FIG. 6, matrix memory 116 may receive the kernel samples $X_t^{(1:K)}$ at each time t from kernel generation circuit 114 and may subsequently store each of the kernel outputs from the M previous samples, i.e. $X_{t:t-M+1}^{(1:K)}$, as X(t). As illustrated in the matrix storage scheme of FIG. 5, matrix memory 114 may store the entire K×M entries of X(t).

Matrix memory 116 may provide the current X(t) to PA update circuit 622 and FIR update circuit 628, which may be respectively responsible for calculating $X_{PA}(t)$ and $X_F(t)$ in 212a and 214a based on X(t) and $W_F$ and $W_{PA}$ provided by FIR filter memory 624 and PA filter memory 626. As shown in FIG. 6, PA update circuit 622 and FIR update circuit 628 may provide $X_{PA}(t)$ and $X_F(t)$ to PA kernel adaptation circuit 620 and FIR delay taps adaptation circuit 630, which may each respectively store the K and M samples of $X_{PA}(t)$ and $X_F(t)$.

PA kernel adaptation circuit 620 and FIR delay taps adaptation circuit 630 may then calculate $R_{PA}(t)$, $\beta_{PA}(t)$, $R_F(t)$, add $\beta_F(t)$ in 212b and 214b. However, as shown in the matrix storage scheme of FIG. 5, PA kernel adaptation circuit 620 and FIR delay taps adaptation circuit 630 may avoid calculating and storing the entire K×K and M×M matrices for $R_F(t)$ and $R_{PA}(t)$ and may instead store only the upper row of $R_F(t)$ and the upper triangle of $R_{PA}(t)$, thus conserving considerable storage and reducing the computational demands.

More specifically, as $R_{PA}(t)$ is the correlation between each of the kernels of $X_{PA}(t)$ with one another, $R_{PA}(t)$ will be a Hermitian matrix, where the lower triangle of off-diagonal elements is equal to the complex conjugate of the upper triangle of off-diagonal elements. Accordingly, instead of calculating the entire M×M matrix for $R_{PA}(t)$, PA kernel adaptation circuit 620 may instead in 212b calculate the upper triangle of $R_{PA}(t)$ (including the diagonal elements) and consequently only store the upper triangle elements of $R_{PA}(t)$. For any subsequent calculations involving lower triangle elements of $R_{PA}(t)$, PA kernel adaptation circuit 620 may take the complex conjugate of the corresponding upper-triangle element in order to obtain the lower triangle element.

Regarding $R_F(t)$, as noted above $R_F(t)$ may be the correlation between each of the taps of $X_F(t)$ with one another. While $R_F(t)$ may also be Hermitian, each row of $R_F(t)$ may share considerable statistical similarities given the relationship between each tap and the fact that the kernel dimension is fixed during update of $W_F$. In other words, the first row of $R_F(t)$, which gives the correlations between the first tap of $X_F(t)$ and each of the remaining M−1 taps of $X_F(t)$, may be increasingly similar to the other rows of $R_F(t)$, which may likewise give the correlations between a given tap of $X_F(t)$ and the other taps of $X_F(t)$. As each of the taps are proximate in time, it follows that each row may be approximately similar to the other rows; accordingly, without loss of generality, as opposed to calculating the entire M×M matrix or even the upper triangle of $R_F(t)$ FIR delay taps adaptation circuit 630 may instead calculate and store only a single row of $R_F(t)$, e.g. the first row of $R_F(t)$. FIR delay taps adaptation circuit 630 may then utilize the single row of $R_F(t)$ as an approximation when using $R_{F(n,n)}$ and $R_F(t-1)^{(m)}$. While this may act as an approximation, FIR delay taps adaptation circuit 630 may reduce storage and computational requirements through only storing a single row of $R_F(t)$.

Accordingly, in 212d and 214d when $R_{PA}(t)$ and $R_F(t)$ are needed in determining update factor α, PA kernel adaptation circuit 620 may simply retrieve $R_{PA(n,n)}$ (which is a diagonal element and thus will be explicitly stored as part of the upper triangle) while FIR delay taps adaptation circuit 630 may retrieve $R_{F(1,1)}$ regardless of n. As the actual value of $R_{F(n,n)}$ gives the correlation between the n-th tap and itself, $R_{F(1,1)}$ may serve as a suitable approximation as the correlation of the n=1 tap with itself. As can be seen from the matrix storage scheme illustrated in FIG. 5, this implementation may lead to considerable reductions in both storage and computational demands on the adaptation engine.

As shown in FIG. 6, PA kernel adaptation circuit 620 and FIR delay taps adaptation circuit 630 may each provide index n and weight $W_{PA,n}/W_{F,n}$ to controller/FSM 618, which may proceed to instruct filter memory 610 to update the corresponding n-th element of $W_{PA}/W_F$ with the specified weight $W_{PA,n}/W_{F,n}$. As such may involve a DCD update scheme of only a single bit, controller/FSM 618 may simply identify the weight index n and bit index m that needs to be flipped, thus prompting filter memory 610 to flip the m-th bit of the n-th weight of $W_{PA}/W_F$. Controller/FSM 618 may additionally include switching circuit 128 and thus may be responsible for selecting which of PA filter adaptation circuit 124 or FIR filter adaptation circuit 126 to activate.

Figure 7A:
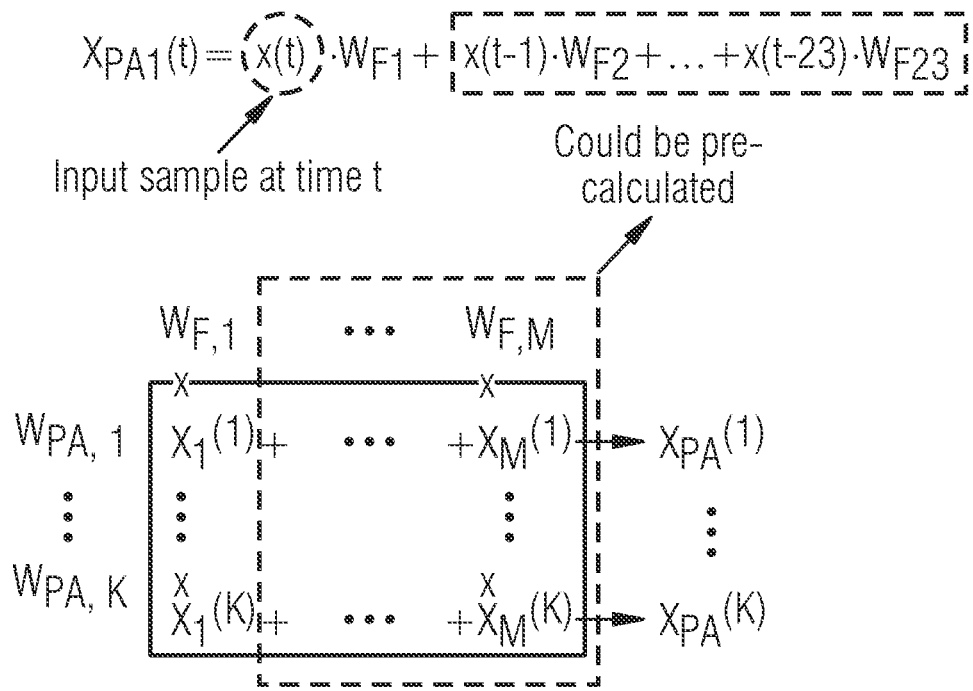
FIG. 7A-7B show a decoupled kernel dimension input signal calculation and decoupled delay tap dimension input signal calculation.

In addition to the matrix storage scheme, the adaptation engine of cancelation circuitry 112 may additionally reduce the computational requirements involved in calculating $X_{PA}(t)$ and $X_F(t)$ at PA update circuit 622 and FIR update circuit 628. FIG. 7A shows an illustration of the matrix multiplication $X_{PA}(t)=X(t)W_F$, where each k-th element of $X_{PA}(t)$ for k=1, ..., K may be the dot product of $W_F$ with the k-th row X(t). As denoted in FIG. 7A, the k-th element $X_{PA,k}(t)$ of $X_{PA}(t)$ may then be given as $$X_{PA,k}(t)=X_t^{(k)}w_{F,1}+X_{t-1}^{(k)}w_{F,2}+\ldots+X_{t-M+1}^{(k)}w_{F,M} \qquad (17)$$

where $W_{F,m}$ gives the m-th tap of $W_F$.

Accordingly, only the first sum term $X_t^{(k)}w_{F,1}$ will depend on the current input sample at time t while all of the remaining sum terms $X_{t-1}^{(k)}w_{F,2}$, $X_{t-2}^{(k)}w_{F,3}$, ..., $X_{t-M+1}^{(k)}w_{F,M}$ depend on past samples from times t−1 and previous. Accordingly, as opposed to requiring the calculation of KM total sum terms required to calculate all of the K elements of $X_{PA}(t)$ after receiving the most recent $X_t^{(1:K)}$, PA update circuit 622 may pre-calculate and sum the past sum terms $X_{t-1}^{(k)}w_{F,2}$, $X_{t-2}^{(k)}w_{F,3}$, ..., $X_{t-M+1}^{(k)}w_{F,M}$ for k=1, ..., K at an earlier time and, after calculating $W_{F,1}X_t^{(1:K)}$, simply add the preprocessing sum terms to $W_{F,1}X_t^{(1:K)}$ to obtain the full $X_{PA}(t)$. PA update circuit 622 may therefore only need to have sufficient hardware to calculate K sum terms for $X_t^{(1:K)}w_{F,1}$, and thus may re-use this hardware to calculate the other sum terms at an earlier time (which may additionally require memory for K extra terms as shown for $X_{PA\_pre}(t)$ in FIG. 5). While the required computations may be the same, this may substantially reduce the hardware area requirements of PA update circuit 622, thus directly reducing manufacturing costs.

Figure 7B:
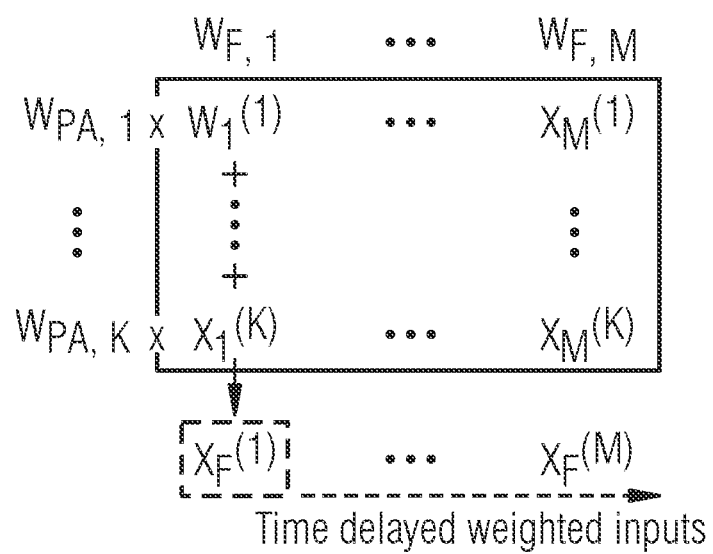

FIR update circuit 628 may also drastically simplify the calculation of $X_F(t)$ in 214a. As shown in FIG. 7B, since $W_{PA}$ is fixed during update of $W_F$, each of the M elements of $X_F(t)$ may be time-delayed weighted inputs of one another. Accordingly, FIR update circuit 628 may not need to calculate all M samples of $X_F(t)$ for each time t; instead, FIR update circuit 628 may utilize a first-in-first-out buffer approach (similar to as detailed above regarding buffer 602) and calculate $X_{F,t}(t)$, i.e. the sample of $X_F(t)$ for time t, to be stored with the previous M−1 samples of $X_F(t)$. The oldest sample of $X_F(t)$, i.e. from time t−M, may then be discarded every time a new sample $X_{F,t}(t)$ is calculated. As such may reduce the required computations from MK multiplications and M(K−1) additions to K multiplications and K−1 additions, FIR update circuit 628 may save considerably reduce complexity and the required hardware area.

Accordingly, PA update circuit 622 may employ preprocessing in order to reduce the hardware requirements for calculating $X_{PA}(t)$ while FIR update circuit 628 may utilize the time-delayed weighted relationship to reduce the computational requirements for calculating $X_F(t)$. As noted above, these modifications are optional and may or may not be implemented in various aspects of this disclosure.

Due to the complexity involved in self-interference estimation, a key constraint in many self-interference cancelation designs is hardware area. As noted above, the preprocessing modification of PA update circuit 622 may reduce the number of multiplication and addition hardware elements needed as PA update circuit 622 may only need to perform K multiplications with the current kernel samples $X_t^{(1:K)}$ followed by K additions with each of the K preprocessing sum terms to obtain $X_{PA}(t)$. PA update circuit 622 may then perform the K(M−1) complex multiplications and K(M−2) complex additions by re-using the same hardware during other clock cycles. The adaptation engine of cancelation circuitry 112 may utilize further hardware computation schedules in order to re-use hardware and thus reduce the hardware requirements of cancelation circuitry 112. As noted above, such hardware scheduling is optional and thus may or may not be utilized in various aspects of this disclosure.

Figure 8:
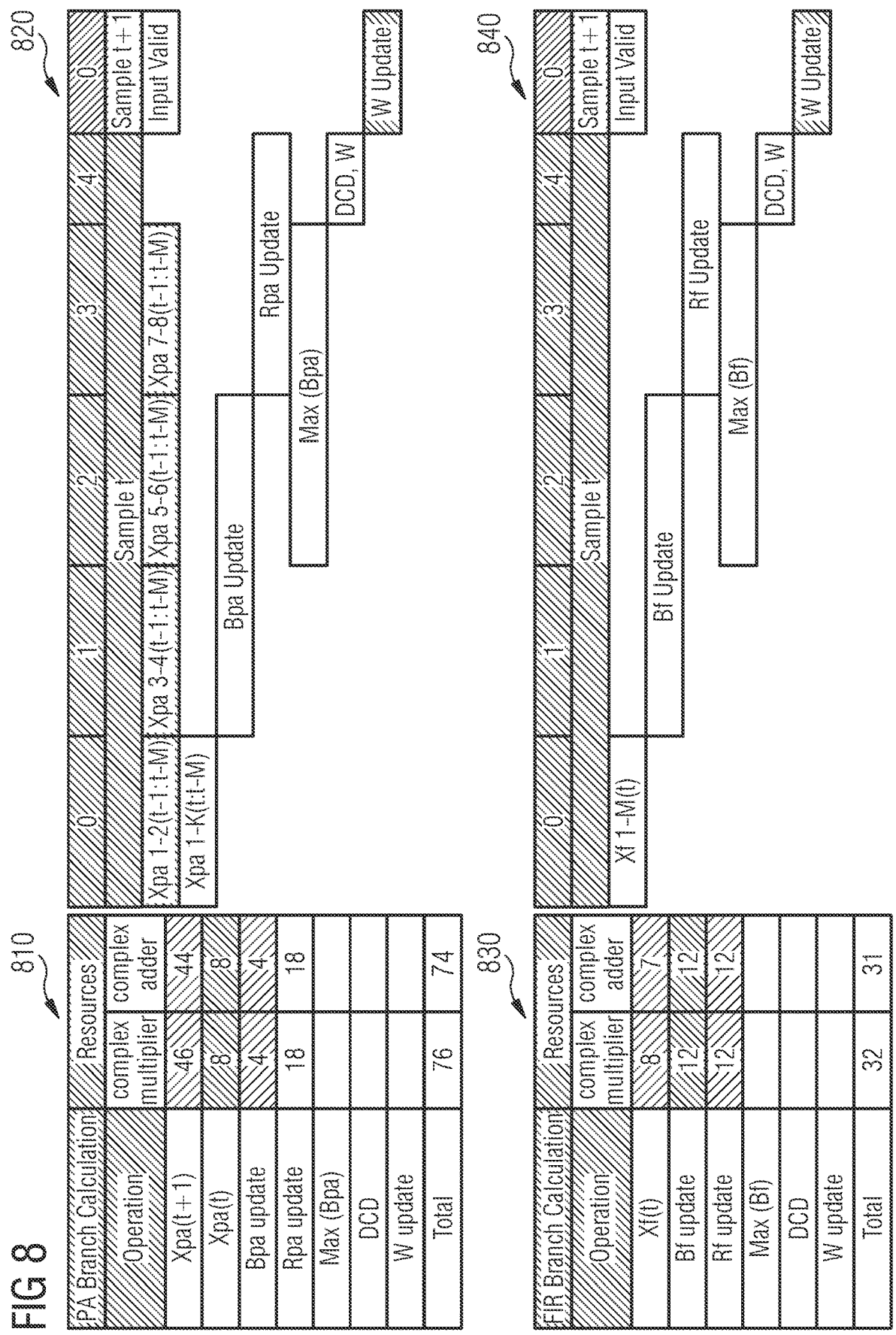
FIG. 8 shows a resource table and hardware pipeline clock schedule.

FIG. 8 depicts an exemplary hardware computation schedule for PA adaptation circuit 124 (PA update circuit 622, PA kernel adaptation circuit 620, and controller/FSM 618) and FIR adaptation circuit 126 (FIR update circuit 628, FIR delay taps adaptation circuit 630, and controller/FSM 618). Tables 810 and 830 show the total numbers of multipliers and adders (as will be further detailed) that the adaptation engine may utilize for each operation while hardware schedules 820 and 840 depict the computational operations executed by PA adaptation circuit 124 and FIR adaptation circuit 126 during each clock cycle. As shown in hardware schedules 820 and 840, both PA adaptation circuit 124 and FIR adaptation circuit 126 may utilize 5 clock cycles in order to complete a single update of $W_{PA}$ and $W_F$ for a given sample t.

As shown in PA branch schedule 820, PA update circuit 622 may calculate the preprocessing sum terms $X_{t-1}^{(k)}w_{F,2}$, $X_{t-2}^{(k)}w_{F,3}, \ldots, X_{t-M+1}^{(k)}w_{F,M}$ for k=1, ... K of $X_{PA}(t)$ as noted above regarding Equation (17) in 'hidden' clock cycles (denoted as shaded cycles in hardware schedule 820), which may be distributed at any time prior to the start of calculations for sample time t. As denoted in the exemplary context of FIG. 8, M and K may be set to M=24 and K=8; accordingly, PA update circuit 622 may reuse the same computation hardware over multiple clock cycles. As shown in hardware schedule 820, PA update circuit 622 may utilize e.g. 2(M−1) complex multipliers and 2(M−2) complex adders in order to support calculation of the preprocessing sum terms $X_{t-1}^{(k)}w_{F,2}$, $X_{t-2}^{(k)}w_{F,3}, \ldots, X_{t-M+1}^{(k)}w_{F,M}$ for two k indices at a time; e.g. for k=1,2 in clock cycle 0, k=3,4 in clock cycle 1, k=5,6 in clock cycle 2, and k=7,8 in clock cycle 3. The amount of computation hardware may be adjusted to various different with varying tradeoffs between the number of clock cycles and hardware area.

PA update circuit 622 may then apply a subset of the same complex multipliers and adders to calculate the sum terms for the kernels of time t, $X_t^{(1:K)}$, as $w_{F,1}X_t^{(1:K)}$, during clock cycle 0 and add the sum terms to the preprocessing sum terms to obtain $X_{PA}(t)$ (212a). As each element $X_{PA}(t)$ is needed to calculate $\beta_A(t)$, PA kernel adaptation circuit 620 may begin the update of $\beta_{PA}(t)$ (212b) in clock cycle 1. In order to reduce the hardware requirements, PA kernel adaptation circuit 620 may update $\beta_{PA}(t)$ over both clock cycles 1 and 2, thus only requiring 4 complex multipliers and 4 complex adders as denoted in table 810 while still avoiding any data dependencies. PA kernel adaptation circuit 620 may also begin identifying $\beta_{PA,max}$ and n (212c) in clock cycle 2 with the elements of $\beta_{PA}(t)$ calculated in clock cycle 1 and completing the identification of $\beta_{PA,max}$ and n in clock cycle 3 with the remaining elements of $\beta_{PA}(t)$ calculated in clock cycle 2. PA kernel adaptation circuit 620 may simultaneously begin updating $R_{PA}(t)$ (212b) in clock cycle 3, which may be completed in clock cycle 4 (212e). As previously indicated, PA kernel adaptation circuit 620 may update the diagonal elements of $R_{PA}(t)$ in the clock cycle 3 and the non-diagonal elements of $R_{PA}(t)$ in clock cycle 4 in order to avoid data dependency issues related to the use of $R_{PA}(n,n)$ in identifying $\beta_{PA,max}$.

While completing update of $R_{PA}(t)$ in clock cycle 4, PA kernel adaptation circuit 620 may concurrently perform the DCD update scheme in order to identify α, i.e. the bit of $W_{PA,n}$ that will be flipped. PA kernel adaptation circuit 620 may provide n and a to controller/FSM 618, which may complete the update of $W_{PA}$ by updating $W_{PA,n}$ according to a during the next clock cycle, which PA update circuit 622 may concurrently utilize as clock cycle 0 to calculate $w_{F,1}X_{t+1}^{(1:K)}$ for the next time t+1.

FIR adaptation circuit 126 may similarly utilize a specific 5-clock cycle as shown in hardware schedule 840. As FIR update circuit 628 may only need to perform M multiplications and M−1 additions to calculate $X_F(t)$ (due to the time-delayed weighted relationship noted above), FIR adaptation circuit 126 may not need to perform any preprocessing stages in hidden clock cycles. Accordingly, FIR update circuit 628 may apply M complex multipliers and M−1 complex adders in clock cycle 0 to calculate $X_F(t)$ (214a). FIR delay taps adaptation circuit 630 may similarly use a staggered clock cycle scheme in clock cycles 1-4 in order to update $\beta_F(t)$, $R_F(t)$, and identify n and $\beta_{F,max}$ (214b and 214c). FIR delay taps adaptation circuit 630 may then apply the DCD scheme to determine a (214d) in clock cycle 4 and provide n and a to controller/FSM 618 for update of $W_{F,n}$ in the following clock cycle 0 of the next update. FIR delay taps adaptation circuit 630 may likewise calculate the diagonal elements of $R_F(t)$ in clock cycle 3 and the non-diagonal elements of $R_F(t)$ in clock cycle 4 in order to avoid data dependency issues.

The schedules and hardware resource tables depicted in FIG. 8 may thus provide an efficient implementation that offers an advantageous tradeoff between latency and hardware area. Numerous other schedules and hardware architectures are also within the scope of this disclosure.

The individual components of cancelation circuitry 112 detailed above may be structurally realized/embodied as hardware logic, e.g. as one or more integrated circuits or FPGAs, as software logic, e.g. as one or more processors executing program code that defining arithmetic, control, and I/O instructions stored in a non-transitory computer-readable storage medium, or as a combination of hardware and software logic. Accordingly, while the individual components of cancelation circuitry 112 are depicted separately in FIG. 1 and FIG. 6, this depiction merely serves to highlight the operation of cancelation circuitry 112 on a functional level; consequently, one or more of the components of cancelation circuitry 112 may be integrated into a common hardware and/or software element.

Figure 9:
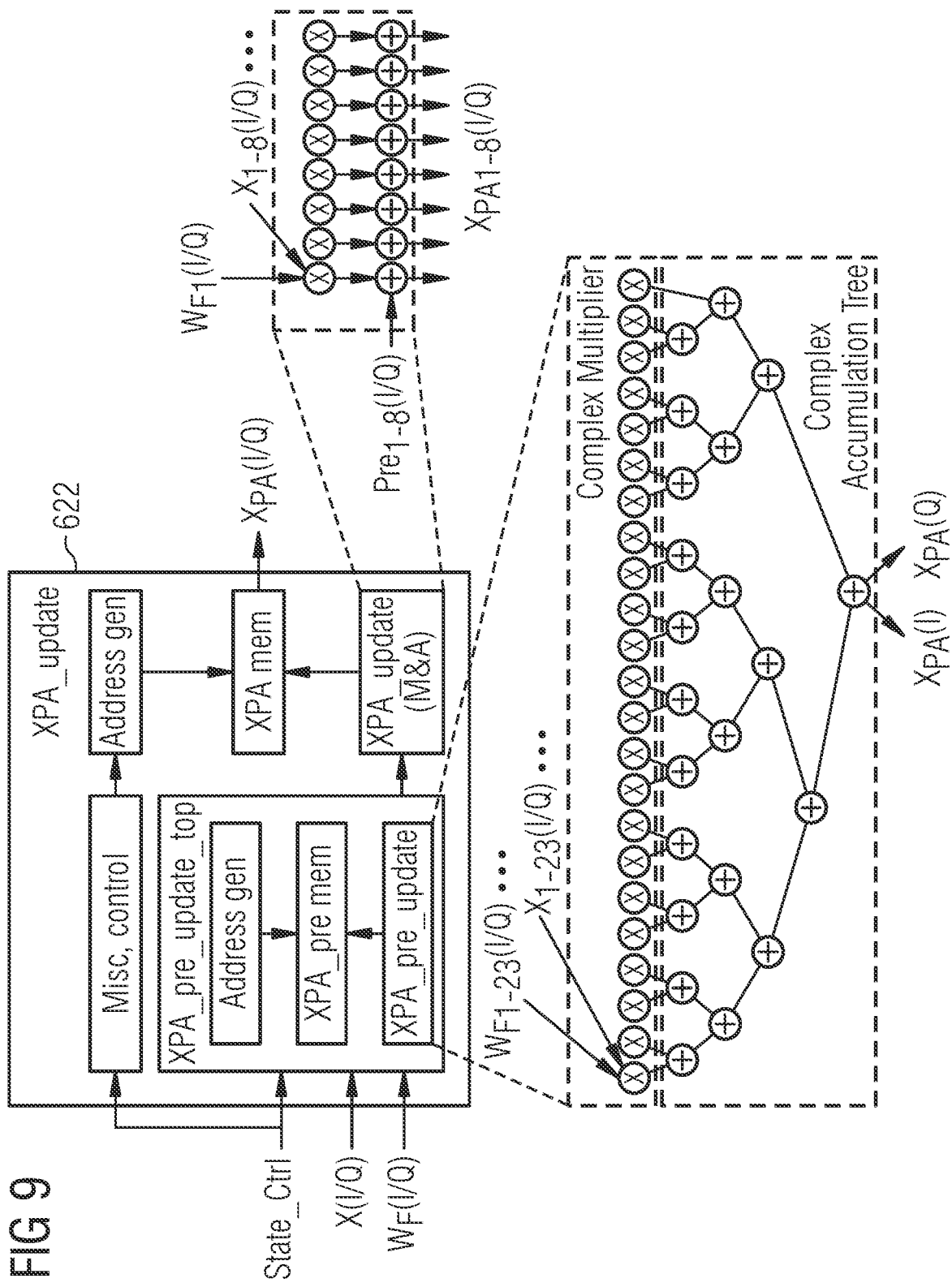
FIG. 9 shows a diagram of a decoupled kernel dimension input signal calculation circuit.
Figure 10:
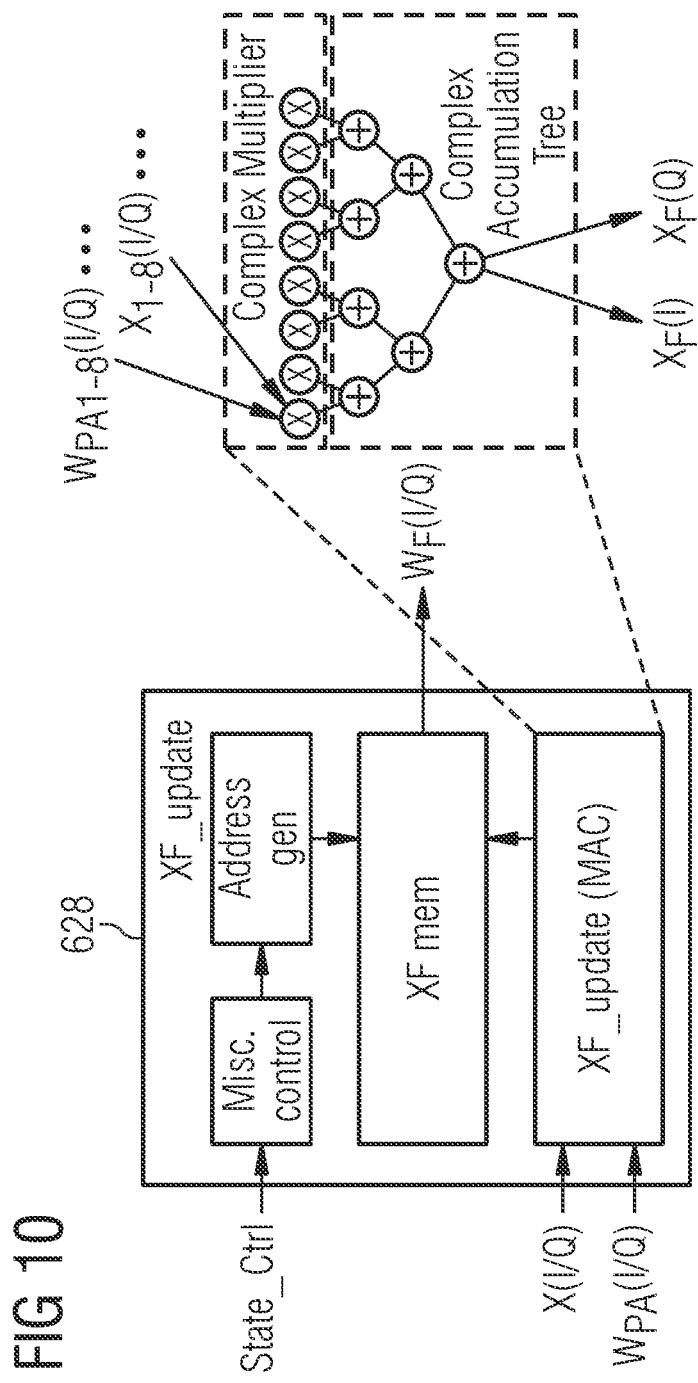
FIG. 10 shows a diagram of a decoupled delay tap dimension input signal calculation circuit.
Figure 11:
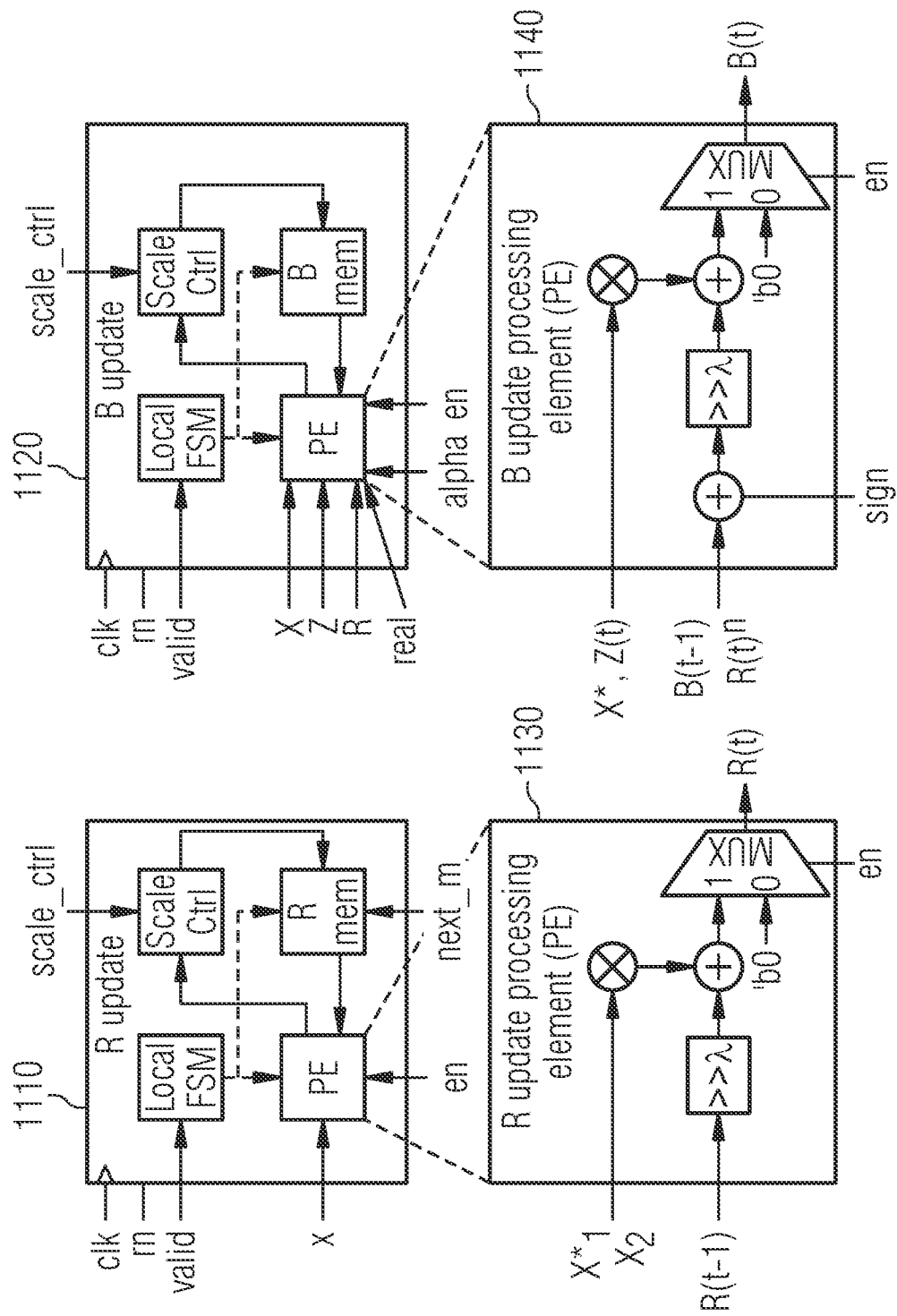
FIG. 11 shows diagrams of a correlation and cross-correlation update circuit.

Without loss of generality, FIGS. 9-11 illustrate exemplary internal configurations of PA update circuit 622, FIR update circuit 628, PA kernel adaptation circuit 622, and FIR delay taps adaptation circuit 630.

FIG. 9 shows the internal computational and memory elements of PA update circuit 622. Corresponding to table 810, PA update circuit 622 may include 2 (M− 1) complex mulitpliers and 2 (M− 2) complex adders for the preprocessing $X_{PA}(t)$ calculations and K complex multipliers and complex adders for the current $X_{PA}(t)$ calculation. PA update circuit 622 may additionally include the K element memories for $X_{PA\_pre}(t)$ and $X_{PA}(t)$ as shown in FIG. 9. FIR update circuit 628 shown in FIG. 10 may include the M element $X_F(t)$ memory and K complex multipliers and K−1 complex adders for $X_F(t)$.

FIG. 11 shows correlation update circuit 1110 and cross-correlation update circuit 1120. As the correlation and cross-correlations of PA update iteration 212 and FIR update iteration 214 may be identical, both PA kernel adaptation circuit 620 and FIR delay taps adaptation circuit 830 may include multiple correlation update circuits 1110 and cross-correlation update circuits 1120 in order to perform the calculations needed to obtain $R_{PA}(t)$, $\beta_{PA}(t)$, $R_F(t)$, and $\beta_F(t)$. The number of correlation update circuits 1110 and cross-correlation update circuits 1120 included in both PA kernel adaptation circuit 620 and FIR Depay taps adaptation circuit 630 may depend on the M, K, and various factors related to clock cycle/pipeline schedules and hardware area. As shown in FIG. 11, both correlation update circuit 1110 and cross-correlation update circuit 1120 may include a local FSM to direct the clock cycle scheduling, e.g. in accordance with a hardware schedule such as shown in FIG. 8), a set of processing elements (PE) composed of either correlation PEs 1130 or cross-correlation PEs 1140, a matrix memory for holding $R(t)/\beta(t)$, and a scale control circuit. The capacity and contents of the matrix memories may correspond to whether correlation update circuit 1110 and cross-correlation update circuit 1120 is assigned to PA kernel adaptation circuit 620 or FIR delay taps adaptation circuit 830.

The number of PEs included in each of correlation update circuit 1110 and cross-correlation update circuit 1120 may be dictated by the number of matrix elements that need to be calculated in parallel. As each correlation PE 1130 and cross-correlation PE 1140 may be configured to update a single element of $R(t)/\beta(t)$, PA kernel adaptation circuit 620 and FIR delay taps adaptation circuit 630 may each include multiple correlation update circuits 1110 and multiple cross-correlation update circuits 1120 in order to support calculation of multopole updates to $R(t)/\beta(t)$ in parallel. Such may consequently depend on the desired clock cycle scheduling, such as shown in FIG. 8. As detailed in table 810, PA kernel adaptation circuit 620 may include e.g. 18 correlation update circuits 1110 and e.g. 4 cross-correlation update circuits 1120 for K=8 and M=24 in order to enable a 5 clock cycle update iteration. Such may allow PA kernel adaptation circuit 620 to calculate the 36 total required complex multiplications and additions to update $R_{PA}(t)$ spread over two clock cycles (18 complex multiplications and additions per clock cycle) and to calculate the 8 total required complex multiplications and additions to update $\beta_{PA}(t)$ spread over two clock cycles (4 per complex multiplications and additions per clock cycle).

As noted in table 830, FIR delay taps adaptation circuit 630 may need to include e.g. 12 correlation update circuits 1110 and e.g. 12 cross-correlation update circuits 1120. Such may thus allow FIR delay taps adaptation circuit 630 to calculate the 24 total required complex multiplications and additions to update $R_F(t)$ spread over two clock cycles (12 complex multiplications and additions per clock cycle) and to calculate the 12 total required complex multiplications and additions to update $\beta_{FIR}(t)$ spread over two clock cycles (12 per complex multiplications and additions per clock cycle).

Due to the equivalence in the calculations for PA and FIR updates and the decoupled operation mode, PA kernel adaptation circuit 620 and FIR delay taps adaptation circuit 630 may in certain aspects of this disclosure be configured to share the same correlation update circuit 1110 and cross-correlation update circuit 1120, i.e. to re-use the same hardware at different times depending on which of PA kernel adaptation circuit 620 and FIR delay taps adaptation circuit 630 is currently updating $W_{PA}$ or $W_F$, respectively. As PA kernel adaptation circuit 124 and FIR adaptation circuit 126 operate separately, such may only require that the shared correlation update circuit 1110 and shared cross-correlation update circuit 1120 include the proper number of correlation PEs 1130 and cross-correlation PEs 1140 to support both PA and FIR updates, e.g. 18 correlations PEs 1130 and 12 cross-correlation PEs 1140.

Figure 12:
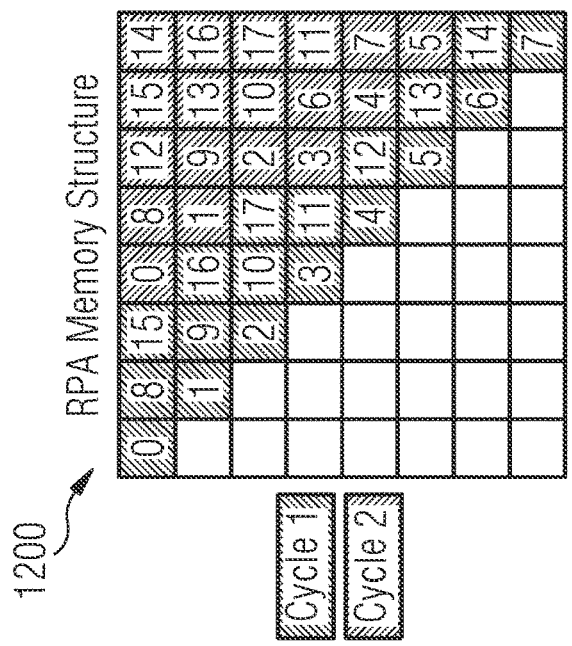
FIG. 12 shows a matrix memory indexing scheme.

As shown in FIG. 11, each correlation PE 1130 may receive two samples of $X_{PA}(t)/X_F(t)$ to multiply. In order to simplify the input data switching overhead, correlation update circuit 1110 may utilize a smart memory indexing and cycle allocation scheme. FIG. 12 illustrates the smart memory indexing and cycle allocation scheme for an exemplary implementation where correlation update circuit 1110 includes 18 correlation PEs 1130 and utilizes two cycles to calculate $R_{PA}(t)$ for K=8 and M=24. As denoted by the shading of table 1200, correlation update circuit 1100 may optimize the calculation of each element of $R_{PA}(t)$ by ensuring that each correlation PE 1130 calculates an element of $R_{PA}(t)$ in the first cycle that is in the same column or row as the element of $R_{PA}(t)$ calculated in the second cycle. As either the column or row remains the same, one input of each correlation PE 1130 may remain the same for both the first and second cycles (as this input will be same element of $X_{PA}(t)$). Such is shown by the numerical indices of table 1200, which indicate which of the 18 total correlation PEs 1130 will calculate the corresponding element of $R_{PA}(t)$. Additionally, correlation update circuit 1110 may calculate the diagonal elements of $R_{PA}(t)$ in the first cycle, thus eliminating the data dependency that can occur in the pipeline schedule shown in FIG. 8. Correlation update circuit 1110 may thus utilize the memory index shown in table 1210 to index the memory for $R_{PA}(t)$.

The optional enable signal en at each of correlation PEs 1130 and cross-correlation PEs 1140 may allow for configurable operation, e.g. for cancelation circuitry 112 to be utilized for any K'≤K kernels and M'≤M taps. Accordingly, the enable signal en may be utilized to disable all unused correlation PEs 1130 and cross-correlation PEs 1140, e.g. K–K' or M– M' unused correlation PEs 1130 and cross-correlation PEs 1140.

While optional, the scale control circuits may be included in order to maintain the stability between $W_{PA}$ and $W_F$. As both dimensions are decoupled in cancelation circuitry 112, it may be possible for the weights to become biased towards either PA or FIR, i.e. where one of $W_{PA}$ and $W_F$ becomes much stronger than the other. Accordingly, the scale control circuitry may be configured to detect if the weights become biased towards one of $W_{PA}$ and $W_F$ and, if so, apply a scale factor in order to counter the bias.

Figure 13:
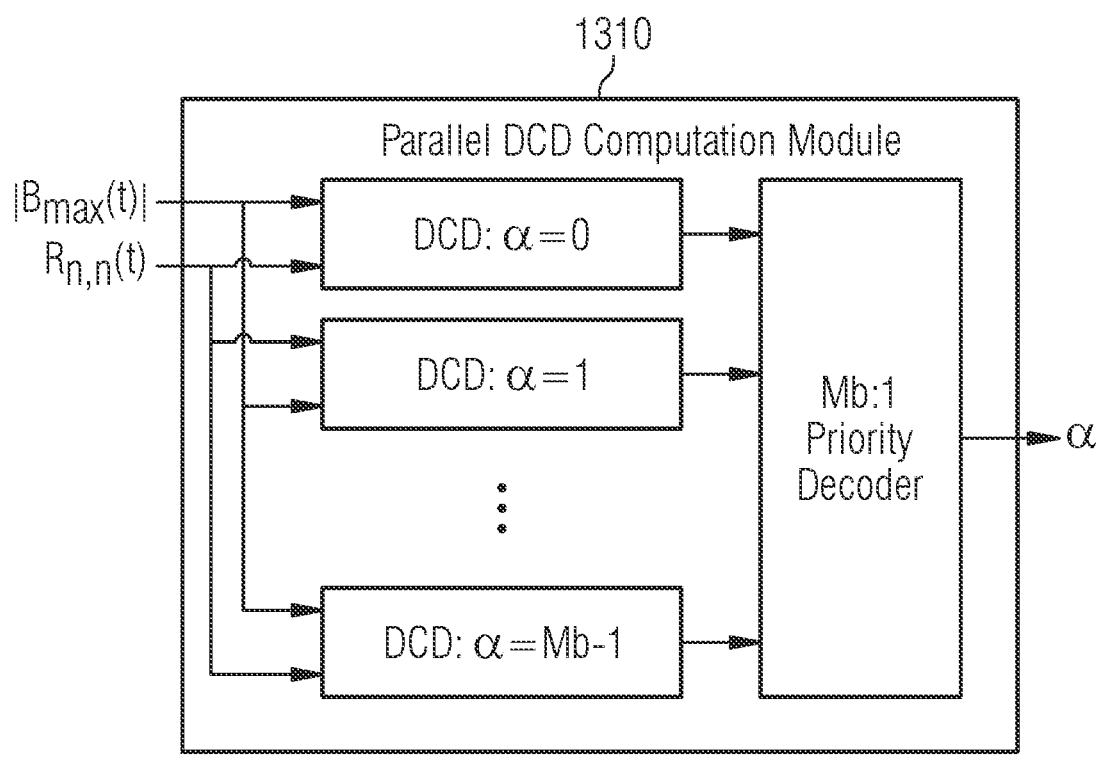
FIG. 13 shows a diagram of a DCD circuit.

Each of PA kernel adaptation circuit 620 and FIR delay taps adaptation circuit 830 may additionally include DCD circuit 1310 as shown in FIG. 13, which may be configured to execute the DCD update process to identify a (212*d*/214*d*). As for the other modifications introduced above, this internal configuration of DCD circuit 1310 is exemplary and other realizations are within the scope of this disclosure. While mathematically expressed as a for loop in 212*d* and 214*d*, DCD circuit 1310 may be implemented with a parallel architecture, where DCD circuit 1310 may evaluate each value of $\alpha=2^0, 2^1, \ldots, 2^{M_b-1}$ in parallel with e.g. one comparator per hypothesis to evaluate the comparison $$|\beta_{max}| > \frac{\alpha}{2} R_{(n,n)} \qquad (30)$$

of 212*d*/214*d*. As only one comparator may be needed, this may offer a significant tradeoff between hardware and throughput, thus considerably favoring a parallel architecture. DCD circuit 1310 may also be configurable to support up to $M_b$ bits as the individual a comparators may be left unused.

Figure 14:
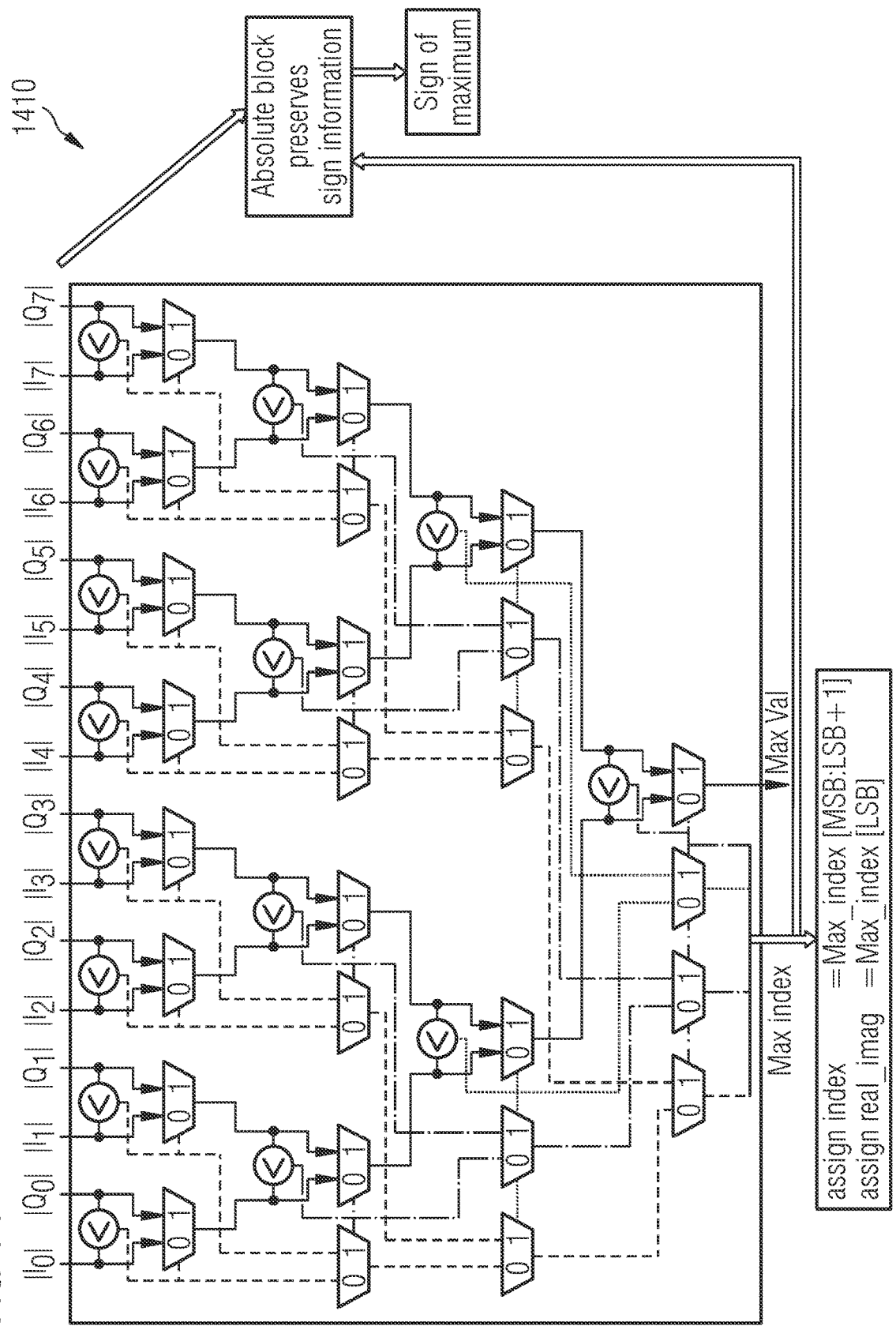
FIG. 14 shows a diagram of a maximum cross-correlation identification circuit.

PA kernel adaptation circuit 620 and FIR delay taps adaptation circuit 830 may additionally include maximum cross-correlation detection circuit 1410 shown in FIG. 14, which may be configured to identify $\beta_{max}$ for $\beta_{PA}(t)$ and $\beta_F(t)$ in 212*c*/214*c* by identifying the element of $\beta_{PA}(t)/\beta_F(t)$ with the largest real or imaginary part using the comparator and multiplexer logic shown in FIG. 14. Maximum cross-correlation detection circuit 1410 may additionally preserve the sign of $\beta_{max}$ in order to update $w_n$ in the proper direction. Generally speaking, PA kernel adaptation circuit 620 and FIR delay taps adaptation circuit 830 may each thus be composed of correlation update circuit 1110, cross-correlation update circuit 1120, DCD circuit 1310, and maximum cross-correlation detection circuit 1410.

Accordingly, any of the various modifications noted above may be implemented as part of cancelation circuitry 112, which may offer a variety of advantages including reduced computational demands and latency, reduced hardware area, reduced memory requirements, etc. Cancelation circuitry 112 may thus provide a highly effective self-interference cancelation system that may be realizable with current technology. Although M and K may be scaled to any values, M=24 and K=8 may present an attractive balance between estimation accuracy and complexity. When combined with various of the optional modifications noted above, such may provide a system that has as much as an 80% hardware reduction compared to the existing 'non-decoupled' solution (i.e. with updates of W of dimension K×M). As noted above, cancelation circuitry 112 may additionally be implemented as a 'configurable' design where cancelation circuitry 112 may be realized to support up to M taps and K kernels but can be dynamically configured to perform self-interference cancelation with any M'≤M taps and K'≤K kernels.

Figure 15:
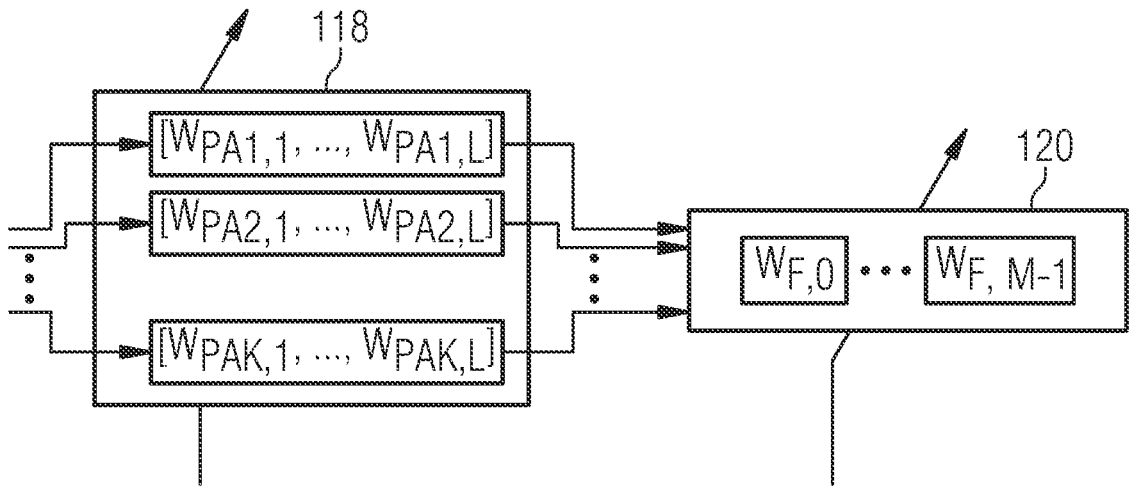
FIG. 15 shows a diagram of a memory-based power amplifier estimation.

The self-interference cancelation scheme detailed thus far may utilize a memoryless model of power amplifier 104 (where the FIR weights $W_F$ are designed to model the various transmit and receive FIR filters in leakage path 130). However, although power amplifiers may generally be designed to be memoryless, power amplifiers may in practical scenarios exhibit unintended memory effects. These memory effects may be caused by imperfections such as charging and discharging junctions, thermal variations, and other physical phenomena and may cause time-dependencies on the power amplifier output. Accordingly, cancelation circuitry 112 may be slightly modified in order to model such PA memory effects by adding L>1 taps for each kernel. FIG. 15 shows an exemplary configuration in which $W_{PA}$ is implemented as K×L (with L>1) matrix where each kernel is thus modeled over L taps (as opposed to the memoryless design previously detailed with L=1). Using $W_{PA}$ defined as a long vector $$W_{PA} = \begin{bmatrix} w_{PA,1,1} \\ w_{PA,1,2} \\ \ldots \\ w_{PA,1,L} \\ w_{PA,2,1} \\ \ldots \\ w_{PA,2,L} \\ \ldots \\ w_{PA,K,1} \\ \ldots \\ w_{PA,K,L} \end{bmatrix} \qquad (18)$$

PA filter circuit 118 may apply $W_{PA}$ to X(t) to obtain $X_F$ defined as $$X_F = [X_{F,t}, X_{F,t-1}, \ldots, X_{F,t-M+1}] \qquad (19)$$

where each entry $X_{F,j}$ is calculated as $$X_{F,j} = W_{PA}^H \begin{bmatrix} X_t^{(1)} \\ X_{t-1}^{(1)} \\ \ldots \\ X_{t-L+1}^{(1)} \\ X_t^{(2)} \\ X_{t-1}^{(2)} \\ \ldots \\ X_{t-L+1}^{(2)} \\ \ldots \\ X_t^{(K)} \\ X_{t-1}^{(K)} \\ \ldots \\ X_{t-L+1}^{(K)} \end{bmatrix} \qquad (20)$$

PA filter adaptation circuit 124 may thus be configured to adapt each of the KL weights of $W_{PA}$ in order to fully approximate the L taps of the PA response.

Figure 16:
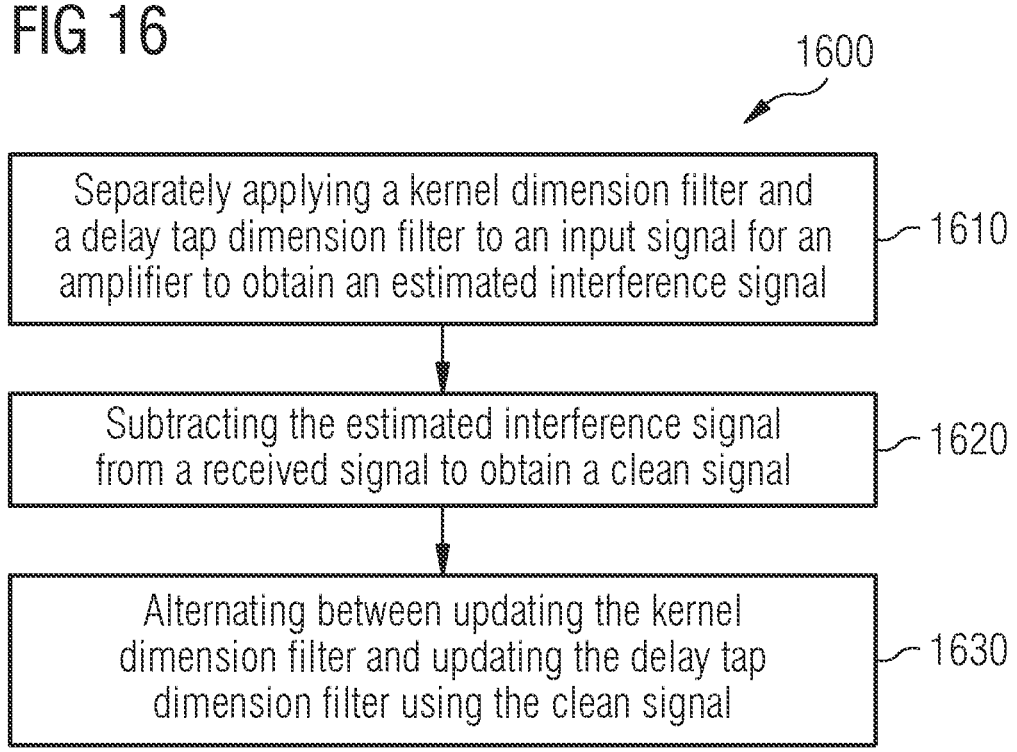
FIG. 16 shows a first method of performing interference cancelation.

FIG. 16 shows method 1600 of method of performing interference cancelation. As shown in FIG. 16, method 1600 includes separately applying a kernel dimension filter and a delay tap dimension filter to an input signal for an amplifier to obtain an estimated interference signal (1610), subtracting the estimated interference signal from a received signal to obtain a clean signal (1620), and alternating between updating the kernel dimension filter and updating the delay tap dimension filter using the clean signal (1630).

Figure 17:
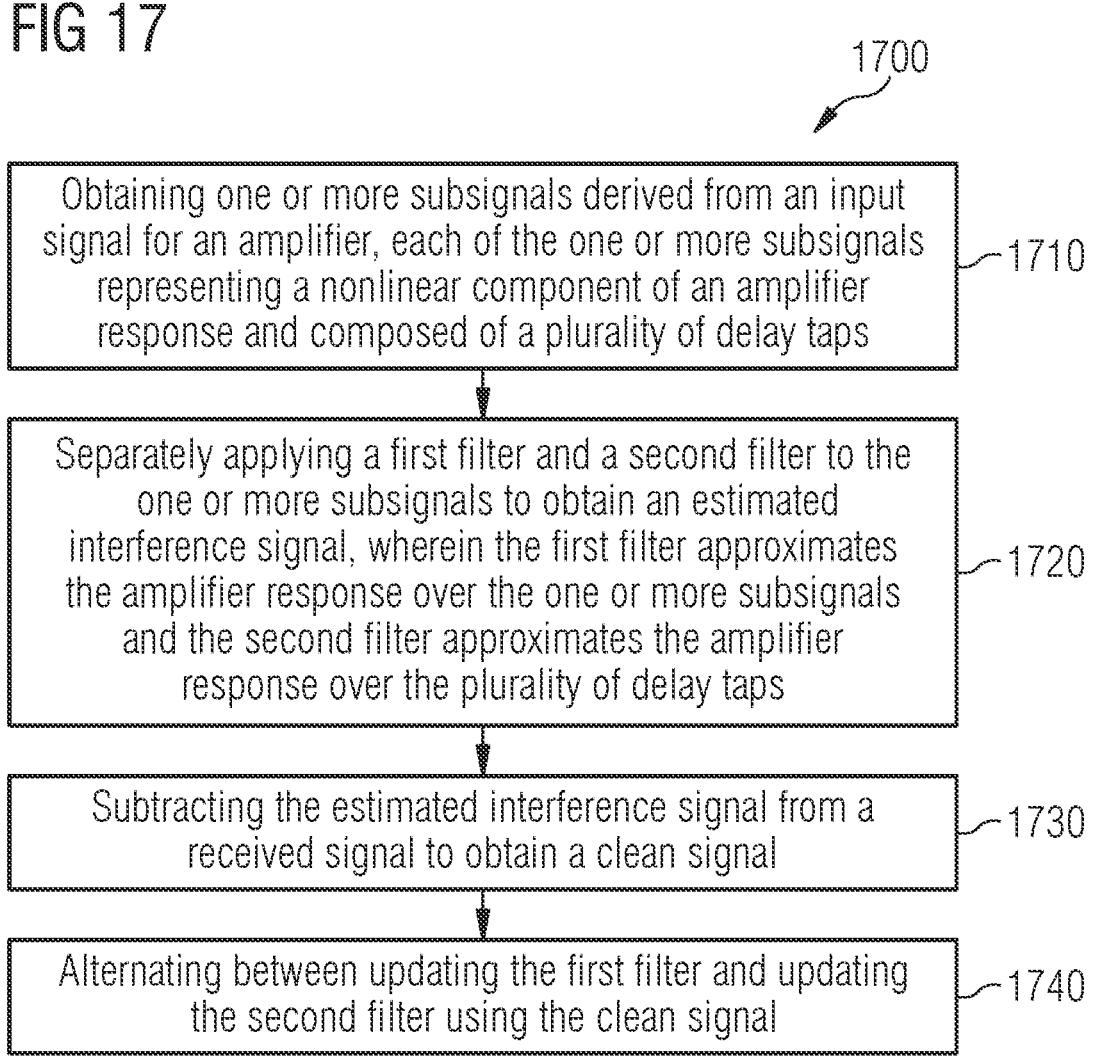
FIG. 17 shows a second method of performing interference cancelation.

FIG. 17 shows method 1700 of performing interference cancelation. As shown in FIG. 17, method 1700 includes obtaining one or more subsignals derived from an input signal for an amplifier (1710), each of the one or more subsignals representing a non-linear component of an amplifier response and composed of a plurality of delay taps, separately applying a first filter and a second filter to the one or more subsignals to obtain an estimated interference signal (1720), wherein the first filter approximates the amplifier response over the one or more subsignals and the second filter approximates the amplifier response over the plurality of delay taps (1730), subtracting the estimated interference signal from a received signal to obtain a clean signal, and alternating between updating the first filter and updating the second filter using the clean signal (1740).

In one or more further exemplary aspects of the disclosure, one or more of the features described above in reference to FIGS. 1-15 may be further incorporated into method 1600 and/or 1700. In particular, method 1600 and/or 1700 may be configured to perform further and/or alternate processes as detailed regarding cancelation circuitry 112 and/or communication circuitry 100.

Figure 18:
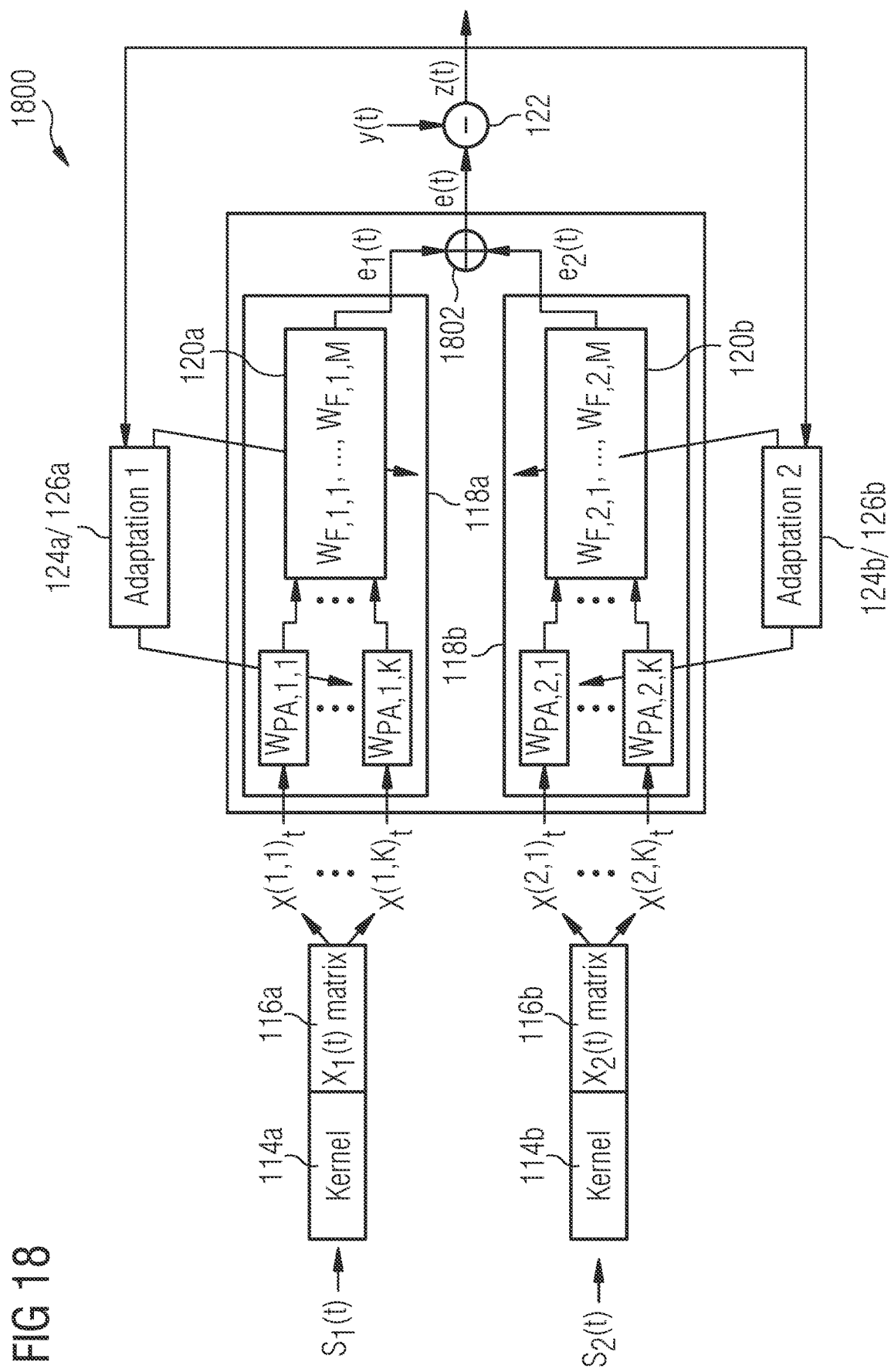
FIG. 18 shows a diagram of a bilinear interference cancelation system for a MIMO architecture.
Figure 19:
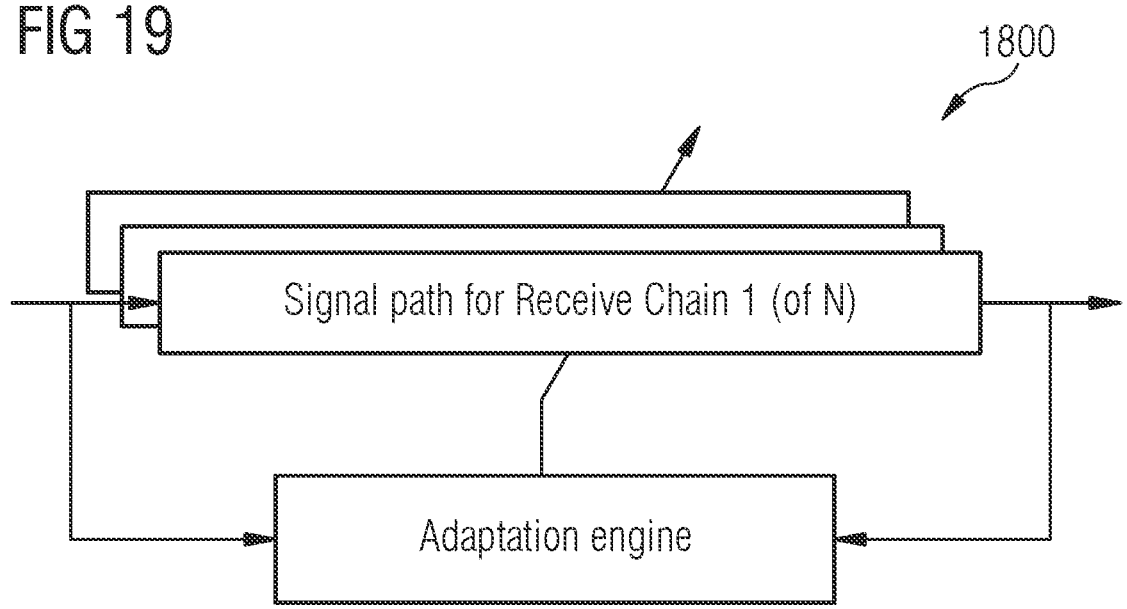
FIG. 19 shows a diagram illustrating adaptation resource sharing for a MIMO architecture.

Furthermore, the implementations of cancelation circuitry 112 shown in FIGS. 1 and 4 include only a single signal path, which may be appropriate for a Single Input Single Output (SISO) configuration with one receive chain and one transmit chain. FIGS. 18-20 detail several different configurations that may be employed in MIMO cases having multiple transmit and receive chains. Each receive chain may therefore need to include self-interference cancelation circuitry in order to remove leakage from received signals; however, as each of the transmit chains may produce leakage onto each receive chain, the self-interference cancelation circuitry for each receive chain may need to estimate and cancel leakage from each transmit chain. Accordingly, each of the receive chains may need to have a different $W_F$ and $W_{PA}$ (assuming use of a bilinear cancelation architecture) for each transmit chain. For example, for an N×N MIMO scheme each of the N receive chain may need to have N FIR filters $W_{F,1:N}$ and N PA filters $W_{PA,1:N}$, i.e. one per transmit chain, in order to produce estimated interference signals $e_{1:N}(t)$ for summation to obtain the combined interference signal e(t) (where each receive chain produces a separate e(t) from separate $e_{1:N}(t)$). As each transmit chain utilizes a different power amplifier and has a different data5 stream, each receive chain may additionally generate a separate kernel matrix $X_{1:N}(t)$ for each transmit chain to utilize along with the clean signal z(t) to calculate updates to $W_{F,1:N}$ and $W_{PA,1:N}$. Such may be extended to MIMO schemes of any dimensions with any number of transmit receive chains.

Such MIMO applications may unavoidably increase the signal path circuitry and memory requirements for an employed SIC scheme due to the need to store and apply a separate $W_{F,1:N}$, $W_{PA,1:N}$, and $X_{1:N}(t)$ per each of the N receive chains; accordingly each receive chain may have a separate kernel generation circuit 114, matrix memory 116, PA filter circuit 118, and FIR filter circuit 120 for each of the N transmit chains. FIG. 18 illustrates such a configuration for cancelation circuitry 1800 that may be employed in the case of two receive chains, such as e.g. for a 2×2 MIMO scheme. As shown in FIG. 18, cancelation circuitry 1800 may therefore include multiple 'duplicates' of certain components in order to perform the estimation of the leakage signals from each transmit chain, such as kernel generation circuits 114a and 114b, matrix memories 116a and 116b, PA filter circuits 118a and 118b, FIR filter circuits 120a and 120b.

As the power amplifiers have separate input transmit signals in $s_1(t)$ and $s_2(t)$ and additionally utilize different antennas, cancelation circuitry 1800 may utilize a separate kernel generation circuit for each power amplifier in kernel generation circuits 114a and 114b. Accordingly, kernel generation circuits 114a and 114b may each both receive the input transmit signals $s_1(t)$ and $s_2(t)$ at each time t for the power amplifiers of both transmit chains and generate kernel samples $X_t^{(1,1:K)}$ and $X_t^{(2,1:K)}$ to provide to matrix memories 116a and 116b. Matrix memories 116a and 116b may each retain the past M kernel samples for each transmit chain as K×M matrices $X_1(t)$ and $X_2(t)$, which each may provide respectively to PA filter circuits 118a and 118b for preprocessing. PA filter circuits 118a and 118b may then apply the respective PA filters $W_{PA,1}$ and $W_{PA,2}$ as $W_{PA,1}^T X_1(t)$ and $W_{PA,2}^T X_2(t)$, which may each be a K×1 weight vector that models the K kernels of the respective power amplifier (and each may contain respective PA weights $w_{PA,k}^{(b)}$ for k=1, . . . , K, where b=1 or 2 depending on which PA filter). PA filter circuits 118a and 118b may then provide the resulting $X_{PA,1}(t)$ and $X_{PA,2}(t)$ to FIR filter circuits 120a and 120b. FIR filter circuits 120a and 120b may then apply respective FIR filters $W_{F,1}$ and $W_{F,2}$ (and each may contain respective FIR weights $w_{F,m}^{(b)}$ for m=1, . . . , M) where b=1 or 2 depending on which FIR filter) as $W_{PA,1}^T X_1(t) W_{F,1}$ and $W_{PA,2}^T X_2(t) W_{F,2}$ to obtain the estimated interference signals $e_1(t)$ and $e_2(t)$ resulting from the first and second transmit chains, respectively. Summation circuit 1802 may then add both estimated interference signals to obtain the overall estimated interference signal e(t) (for the first receive chain) as $e(t)=e_1(t)+e_2(t)$. Cancelation circuit 122 may then subtract e(t) from the receive signal y(t) for the first receive chain to obtain clean signal z(t), which may largely contain exclusively desired data assuming accurate filter models.

FIG. 18 may also include adaptation circuits 124a/126a and 124b/126b (respectively composed of PA filter adaptation circuit 124a/FIR filter adaptation circuit 126a and PA filter adaptation circuit 124b/FIR filter adaptation circuit 126b), which may each perform the adaptation techniques detailed above (e.g. a bilinear technique such as RLS-DCD, further detailed regarding FIGS. 2 and 3 for PA update iteration 212 and FIR update iteration 214) for the respective transmit chains to continuously update the FIR and PA filters to enable accurate interference estimation and cancelation. As the adaptations are separate, adaptation circuits 124a/126a and 124b/126b may run independently from one another to update the FIR and PA filters (where FIR and PA update iterations for each are alternated by fixing one dimension and adapting the other).

In order to reduce the amount of hardware and requisite area for cancelation circuitry 1800, cancelation circuitry 1800 may share adaptation circuitry instead of employing separate adaptation circuits each dedicated to a respective transmit chain. Accordingly, instead of utilizing separate adaptation circuits 124a/126a and 124b/126b, cancelation circuitry 1800 may instead utilize only one adaptation circuit, e.g. adaptation circuit 124a/126a, that may alternate between updating $W_{PA,1}$ and $W_{F,1}$ for the first transmit chain and $W_{PA,2}$ and $W_{F,2}$ for the second transmit chain and thus handle the adaptation responsibilities for the filters of both transmit chains. For example, adaptation circuit 124a/126a may update $W_{PA,1}$ and $W_{F,1}$ (based on $X_1(t)$ and $z(t)$, which PA adaptation circuit 124a and FIR adaptation circuit 126a may additionally update by alternating in a decoupled switching fashion) for a predefined cycle of samples or until a convergence criteria is reached (e.g. for $\beta_{F,1}(t)$ and/or $\beta_{PA,1}(t)$ for the first transmit chain) before switching to updating $W_{PA,2}$ and $W_{F,2}$ (based on $X_2(t)$ and $z(t)$, which PA adaptation circuit 124a and FIR adaptation circuit 126a may additionally update by alternating in a decoupled switching fashion) for a predefined cycle of samples or until a convergence criteria is reached (e.g. for $\beta_{F,2}(t)$ and/or $\beta_{PA,2}(t)$ for the first transmit chain). As complete convergence may occur after several hundred samples, such may enable cancelation circuitry 1800 to employ a single adaptation engine in adaptation circuit 124a/126a to handle filter adaptation for interference cancelation of multiple transmit chains, thus considerably reducing hardware.

As each of the N receive chains may require an instance of cancelation circuitry 1800, this adaptation engine sharing may still require N adaptation circuits 124a/126a, where each adaptation circuit 124a/126a handles the leakage estimation for N transmit chains for the respective receive chain. Accordingly, in order to further reduce hardware requirements, the self-interference cancelation architecture may expand the adaptation engine sharing between receive chains. FIG. 19 shows an example of such in which a single adaptation engine (e.g. adaptation circuit 124a/126a, which contains at least one PA adaptation circuit 124a and one FIR adaptation circuit 126a) may handle the adaptation for multiple instances of cancelation circuitry 1800 where each instance of cancelation circuitry 1800 is responsible for leakage estimation and cancelation for one receive chain. Accordingly, the adaptation engine may alternate between adapting $W_{PA,n}$ and $W_{F,n}$, n=1, . . . , N, for each of the N receive chains, e.g. with switching based on a predefined number of samples or a convergence criteria, and thus may enable a significant reduction in hardware area. While such adaptation resource sharing may necessarily produce some performance degradation compared to dedicated adaptation resources, this may be offset by the resulting hardware area reductions.

As shown in FIG. 18, cancelation circuitry 1800 may employ separate PA and FIR filters to model the leakage from each transmit chain at the receive chain associated with cancelation circuitry 1800. In the case of PA filters $W_{PA,1}$ and $W_{PA,2}$, such may be necessary in order to effectively model the separate power amplifiers in each transmit chain; for example, even if the same power amplifier model or type is used for both power amplifiers, different filters may be needed to model each power amplifier due to the differing input streams in $s_1(t)$ and $s_2(t)$ and differing antennas. However, in the case of FIR filters $W_{F,1}$ and $W_{F,2}$, cancelation circuitry 1800 may be modified to utilize a single FIR filter $W_{F,1}$ to jointly model the FIR dimension of both transmit chains. More specifically, if the transmit chain FIR filters that $W_{F,1}$ and $W_{F,2}$ are intended to model are similar (e.g. have a similar response), cancelation circuitry 1800 may collectively model the FIR filters of both transmit chains with only a single FIR filter $W_F$. In other words, if the signal paths for each transmit chain utilize separate FIR filters or FIR filters with different weights, the taps of each transmit chain may need to be estimated separately from one another. However, if each transmit chain uses similar FIR filters, the interference cancelation circuitry may be simplified considerably as the similar FIR filters may be estimated jointly. Such may further reduce hardware area requirements and/or reduce the degree of resource sharing.

FIG. 20 shows cancelation circuitry 2000, which may utilize a single joint FIR filter 120c and thus may be suited for use in scenarios where the N transmit chains (e.g. two in the context of FIG. 2) contain similar FIR filters and are thus suitable for joint estimation. Cancelation circuitry 2000 may thus be deployed in each receive chain in order to estimate and cancel leakage resulting from the transmit chains.

As opposed to separately estimating the tap filter weights for each transmit chain, cancelation circuitry 2000 may instead jointly estimate the tap filter weights for FIR filter circuit 120c, which may function equivalently to FIR filter circuit 120 of FIG. 1 in the SISO case. Cancelation circuitry 2000 may apply $W_{PA,1}$ and $W_{PA,2}$ to $X_1(t)$ and $X_2(t)$ to obtain $X_{F,1}(t)$ and $X_{F,2}(t)$, which cancelation circuitry 2000 may sum at summation circuit 2002 to obtain $X_{FIL}(t)$. Cancelation circuitry 2000 may then apply joint FIR filter $W_F$ to $X_{FIL}(t)$ to obtain e(t) for subsequent cancelation from y(t) to obtain clean signal z(t).

FIR filter adaptation circuit 126c of adaptation circuit 124a/124b/126c may function equivalently to FIR filter adaptation circuit 126 as detailed in FIG. 4 regarding FIR update iteration 214 using $X_{FIL}(t)$ and $z(t)$ and accordingly calculate the correlation $R_{FIL}(t)$ of $X_{FIL}(t)$ and the cross-correlation $\beta f_{FIL}(t)$ of $X_{FIL}(t)$ and $z(t)$ to identify updates to weights of $W_F$. As the FIR filters of each transmit chain are assumed to be similar, the updates calculated by FIR filter adaptation circuit 126c may able to accurately characterize the leakage path for both transmit chains and accordingly may continue to offer effective interference cancelation.

As the power amplifiers for each transmit chain are different (and may have different input signals and antennas), the non-linearities of each PA may need to be estimated separately. Adaptation circuit 124a/124b/126c may therefore need to adapt both FIR filters $W_{PA,1}$ and $W_{PA,2}$ (one per transmit chain) and thus may contain two PA adaptation circuits 124a and 124b, which may each adapt PA filters $W_{PA,1}$ and $W_{PA,2}$ equivalent to PA filter adaptation circuit 126 as detailed in FIG. 3 regarding PA update iteration 212, i.e. by applying joint FIR filter $W_F$ to filter matrices $X_1(t)$ and $X_2(t)$ to respectively obtain $X_{PA,1}(t)$ and $X_{PA,2}(t)$ and updating $W_{PA,1}$ and $W_{PA,2}$ accordingly. Similar as detailed above regarding alternating between updating the PA and FIR dimensions, adaptation circuit 124a/124b/126c may alternate between updating joint FIR filter $W_F$ and PA filters $W_{PA,1}$ and $W_{PA,2}$, where adaptation circuit 124a/124b/126c may fix $W_F$ while updating $W_{PA,1}$ and $W_{PA,2}$ for multiple input samples before switching to fix $W_{PA,1}$ and $W_{PA,2}$ while updating $W_F$.

As cancelation circuitry 2000 may utilize a single joint FIR filter $W_F$ and accompanying FIR filter circuit 120c, cancelation circuitry 2000 may significantly reduce the amount of updates compared to both cancelation circuitry 1800 and other adaptation schemes, i.e. M+2K updates per receive chain (with two transmit chains) compared to 2(M+K) updates and 2 MK updates. Cancelation circuitry 2000 may thus be suitable for deployment in architectures where the FIR filters of each transmit chain are similar. Returning to the context of FIG. 19, adaptation circuit 124a/124b/126c may additionally be utilized for adaptation resource sharing between multiple receive chains, where adaptation circuit 124a/124b/126c may alternate between updating $W_{PA,n}$ and $W_{F,n}$, n=1, . . . , N, for each of the N receive chains, e.g. with switching based on a predefined number of samples or a convergence criteria, and thus may enable a significant reduction in hardware area.

In particular for MIMO applications, stability of the cancelation may become an issue. Such may be exacerbated in the case of cancelation circuitry 1800 due to the parallel operation of two adaptation blocks, which may result in the adaptation blocks struggling between one another and becoming unbalanced. Additionally, the bilinear architecture may allow for a greater dynamic range of $W_F$ and $W_{PA}$ compared to the conventional 'Hammerstein' architecture. While the bilinear algorithms detailed herein may perform effectively when $W_F$ and $W_{PA}$ are balanced, 'peaky' or 'noisy' samples may drive the adaptation out of reasonable range and thus impair performance. Accordingly, either the FIR weights of $W_F$ or the PA weights of $W_{PA}$ may become much larger than the other dimension; while the resulting mathematical calculations may generally produce the same e(t), noisy samples may produce instability (as one of $W_F$ or $W_{PA}$ will be very large). Additionally, fixed-point numerical representations (e.g. in the nature of the bit-level inputs shown in FIG. 6) may eventually run into overflow problems when one of $W_F$ or $W_{PA}$ grows to be too large. Accordingly, the update of correlation matrices $R_{PA}(t)$ and $R_F(t)$ in 212b/212e and 214b/214e may be modified in order to introduce a regularization factor, which may counter such imbalances between $W_F$ and $W_{PA}$ and ensure that cancelation performance remains stable. Specifically, instead of the correlation updates detailed in Equations (8) and (13), PA filter adaptation circuit 124 and FIR filter adaptation circuit 126 may update $R_{PA}(t)$ and $R_F(t)$ as $$R_{PA}(t)=\lambda R_{PA}(t-1)+X_{PA}^H(t)X_{PA}(t)+\in_{PA} I \qquad (21)$$

$$R_F(t)=\lambda R_F(t-1)+X_F^H(t)X_F(t)+\in_F I \qquad (22)$$

where $\in_{PA}$ and $\in_F$ are small positive numbers that serve as a regularization factor and I is the identity matrix.

By including regularization factors $\in_{PA}$ and $\in_F$ in the correlation update, self-interference cancelation schemes (cancelation circuitry 112, cancelation circuitry 1800, and/or cancelation circuitry 2000) may counter imbalances between the PA and FIR dimension filters. Regularization factors $\in_{PA}$ and $\in_F$ may need to carefully selected since the strength thereof will determine the strength of the regularization effect; for example, if $\in_{PA}$ or $\in_F$ is too large, convergence will suffer. Although both $\in_{PA}$ and $\in_F$ are design parameters that may vary on a case-by-case basis, $\in_{PA}$ and $\in_F$ may be in the order of e.g. $2^{-4}$ or $2^{-8}$ (although such is exemplary and any value could be used) and may need to be selected based on information about the received signal and/or the expected strength of the interference. Although SISO architectures may additionally utilize Equations (21) and (22), regularization may be more important in MIMO architectures. Different regularization factors $\in_{PA}$ and $\in_F$ may be chosen for the cancelation circuitry of each receive chain (including $\in I=0$, i.e. a zero matrix that provides no regularization) and may be adjusted in order to ensure update stability.

FIG. 21 shows method 2100 of performing interference cancelation. As shown in FIG. 21, method 2100 includes applying a first kernel dimension filter to a first input signal to estimate a first kernel dimension interference signal derived from a first amplifier (2110), applying a second kernel dimension filter to a second input signal to estimate a second kernel dimension interference signal derived from a second amplifier (2120), applying a joint delay tap dimension filter to a combination of the first kernel dimension interference signal and the second kernel dimension interference signal to obtain an estimated joint interference signal (2130), and removing the estimated joint interference signal from a received signal to obtain a clean signal (2140).

FIG. 22 shows method 2200 of performing interference cancelation. As shown in FIG. 22, method 2200 includes estimating a first interference signal produced by a first amplifier with a first kernel dimension filter and a first delay tap dimension filter (2210), estimating a second interference signal produced by a second amplifier with a second kernel dimension filter and a second delay tap dimension filter (2220), subtracting a combination of the first interference signal and the second interference signal from a received signal to obtain a clean signal (2230), and alternating between a kernel update phase including updating the first kernel dimension filter and the second kernel dimension filter and a delay tap update phase including updating the first delay tap dimension filter and the second delay tap dimension filter (2240).

The terms "user equipment", "UE", "mobile terminal", "user terminal", etc., may apply to any wireless communication device, including cellular phones, tablets, laptops, personal computers, wearables, multimedia playback and other handheld electronic devices, consumer/home/office/commercial appliances, vehicles, and any number of additional electronic devices capable of wireless communications.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device.

Likewise, it is appreciated that implementations of devices detailed herein are understood as capable of being implemented as a corresponding method. It is thus understood that a device corresponding to a method detailed herein may include one or more components configured to perform each aspect of the related method.

The following examples pertain to further aspects of this disclosure:

Example 1 is a communication circuit arrangement including a first kernel dimension filter circuit configured to apply a first kernel dimension filter to a first input signal to estimate a first kernel dimension interference signal from a first amplifier, a second kernel dimension filter circuit configured to apply a second kernel dimension filter to a second input signal to estimate a second kernel dimension interference signal from a second amplifier, a joint delay tap dimension filter configured to apply a joint delay tap dimension filter to a combination of the first kernel dimension interference signal and the second kernel dimension interference signal to obtain an estimated joint interference signal, and a cancelation circuit configured to remove the estimated joint interference signal from a received signal to obtain a clean signal.

In Example 2, the subject matter of Example 1 can optionally further include one or more filter adaptation circuits configured to alternate between a kernel update phase during which the one or more filter adaptation circuits update the first kernel dimension filter and second kernel dimension filter and a delay tap update phase during which the one or more filter adaptation circuits update the joint delay tap dimension filter.

In Example 3, the subject matter of Example 1 or 2 can optionally be configured as a radio communication device and further including one or more receive chains, a first transmit chain including the first amplifier, a second transmit chain including the second amplifier, and one or more antennas coupled to the one or more receive chains and the first transmit chain.

In Example 4, the subject matter of Example 1 or 2 can optionally include wherein the first amplifier is configured to amplify the first input signal to form a first amplified signal and the second amplifier is configured to amplify the second input signal to form a second amplified signal and wherein the one or more antennas are configured to transmit the first amplified signal and the second amplified signal.

In Example 5, the subject matter of Example 3 or 4 can optionally include wherein a first receive chain of the one or more receive chains is configured to receive the received signal via the one or more antennas, wherein the estimated joint interference signal includes approximation of leakage from the first transmit chain and the second transmit chain to the first receive chain.

In Example 6, the subject matter of Example 5 can optionally include wherein the one or more filter adaptation circuits are further configured to update one or more kernel dimension filters or one or more delay tap dimension filters of at least a second receive chain of the one or more receive chains.

In Example 7, the subject matter of Example 5 or 6 can optionally include wherein the joint delay tap dimension filter is configured to estimate a delay tap response of one or more filters that are common to a leakage path from the first transmit chain and the second transmit chain to the first receive chain.

In Example 8, the subject matter of any one of Examples 3 to 7 can optionally include wherein the first input signal and the second input signal are transmit layers of a Multiple Input Multiple Output (MIMO) communication scheme.

In Example 9, the subject matter of any one of Examples 1 to 8 can optionally include wherein the one or more filter adaptation circuits are configured to update the first kernel dimension filter, the second kernel dimension filter, and the joint delay tap dimension filter in real-time.

In Example 10, the subject matter of any one of Examples 1 to 9 can optionally include wherein the one or more filter adaptation circuits are configured to update the first kernel dimension filter, the second kernel dimension filter, and the joint delay tap dimension filter by iteratively updating the first kernel dimension filter, the second kernel dimension filter, and the joint delay tap dimension filter over each of a plurality of samples of the first input signal and the second input signal.

In Example 11, the subject matter of any one of Examples 1 to 10 can optionally further include a first kernel generation circuit configured to process the first input signal to derive a first plurality of kernel signals from the first input signal, each of the first plurality of kernel signals approximating a non-linear component of a leakage path of the first amplifier, wherein the first kernel dimension filter circuit is configured to apply the first kernel dimension filter to the first input signal by applying the first kernel dimension filter to the first plurality of kernel signals.

In Example 12, the subject matter of Example 11 can optionally include wherein each of the first plurality of kernel signals is composed of a first plurality of delay taps, wherein each weight of the first kernel dimension filter corresponds to a respective one of the first plurality of kernel signals and each weight of the joint delay tap dimension filter corresponds to a respective one of the first plurality of delay taps.

In Example 13, the subject matter of Example 12 can optionally include wherein the first kernel dimension filter is configured to approximate the leakage path of the first amplifier over the first plurality of kernel signals, and wherein the joint delay tap dimension filter is configured to approximate the leakage path of the first amplifier over the first plurality of delay taps.

In Example 14, the subject matter of any one of Examples 1 to 13 can optionally further include a second kernel generation circuit configured to process the second input signal to derive a second plurality of kernel signals from the second input signal, each of the second plurality of kernel signals approximating a non-linear component of a leakage path of the second amplifier, wherein the second kernel dimension filter circuit is configured to apply the second kernel dimension filter to the second input signal by applying the second kernel dimension filter to the second plurality of kernel signals.

In Example 15, the subject matter of Example 14 can optionally include wherein each of the second plurality of kernel signals is composed of a second plurality of delay taps, wherein each weight of the second kernel dimension filter corresponds to a respective one of the second plurality of kernel signals and each weight of the joint delay tap dimension filter corresponds to a respective one of the second plurality of delay taps.

In Example 16, the subject matter of Example 15 can optionally include wherein the second kernel dimension filter is configured to approximate the leakage path of the second amplifier over the second plurality of kernel signals and wherein the joint delay tap dimension filter is configured to approximate the leakage path of the second amplifier over the second plurality of delay taps.

In Example 17, the subject matter of any one of Examples 1 to 16 can optionally include wherein the first kernel dimension filter, the second kernel dimension filter, and the joint delay tap dimension filter are vectors.

In Example 18, the subject matter of any one of Examples 1 to 17 can optionally include wherein the one or more filter adaptation circuits are configured to update the first kernel dimension filter, the second kernel dimension filter, and the joint delay tap dimension filter based on the first input signal, the second input signal, and the clean signal.

In Example 19, the subject matter of any one of Examples 2 to 18 can optionally include wherein the one or more filter adaptation circuits are configured to alternate between the kernel update phase and the delay tap update phase by comparing the combination of the first kernel dimension interference signal and the second kernel dimension interference signal to the clean signal to identify at least one weight of the joint delay tap dimension filter to update during the delay tap update phase.

In Example 20, the subject matter of Example 1 can optionally include wherein the one or more filter adaptation circuits are configured to compare the combination of the first kernel dimension interference signal and the second kernel dimension interference signal to the clean signal to identify at least one weight of the joint delay tap dimension filter to update by determining a cross-correlation vector between the combination of the first kernel dimension interference signal and the second kernel dimension interference signal and the clean signal, and identifying a first weight of the joint delay tap dimension filter to update based on the cross-correlation vector.

In Example 21, the subject matter of Example 20 can optionally include wherein the one or more filter adaptation circuits are configured to update exclusively the first weight of the joint delay tap dimension filter.

In Example 22, the subject matter of Example 20 or 21 can optionally include wherein the one or more filter adaptation circuits are configured to update the first weight of the joint delay tap dimension filter according to a recursive least squares (RLS) optimization scheme.

In Example 23, the subject matter of Example 22 can optionally include wherein the one or more filter adaptation circuits are configured to update exclusively a single bit of the first weight of the joint delay tap dimension filter according to recursive least squares (RLS) dichotomous coordinate descent (DCD) optimization scheme.

In Example 24, the subject matter of any one of Examples 2 to 23 can optionally include wherein the one or more filter adaptation circuits are configured to alternate between the kernel update phase and the delay tap update phase by first applying the joint delay tap dimension filter to the first input signal to obtain a first filtered input signal, first comparing the first filtered input signal to the clean signal to identify at least one weight of the first kernel dimension filter to update, second applying the joint delay tap dimension filter to the second input signal to obtain a second filtered input signal, and second comparing the second filtered input signal to the clean signal to identify at least one weight of the second kernel dimension filter to update, wherein the first applying, first comparing, second applying, and second comparing are performed during the kernel update phase.

In Example 25, the subject matter of Example 1 can optionally include wherein the one or more filter adaptation circuits are configured to compare the first filtered input signal to the clean signal to identify at least one weight of the first kernel dimension filter to update by determining a cross-correlation vector between the first filtered input signal and the clean signal, identifying a first weight of the first kernel dimension filter to update based on the cross-correlation vector.

In Example 26, the subject matter of Example 25 can optionally include wherein the one or more filter adaptation circuits are configured to update exclusively the first weight of the first kernel dimension filter.

In Example 27, the subject matter of Example 25 or 26 can optionally include wherein the one or more filter adaptation circuits are configured to update the first weight of the first kernel dimension filter according to a recursive least squares (RLS) optimization scheme.

In Example 28, the subject matter of Example 27 can optionally include wherein the one or more filter adaptation circuits are configured to update exclusively a single bit of the first weight of the first kernel dimension filter according to recursive least squares (RLS) dichotomous coordinate descent (DCD) optimization scheme.

In Example 29, the subject matter of any one of Examples 1 to 28 can optionally include wherein the one or more filter adaptation circuits include a first kernel dimension adaptation circuit configured to perform the updates to the first kernel dimension filter and further include a different second kernel dimension adaptation circuit configured to perform the updates to the second kernel dimension filter.

In Example 30, the subject matter of any one of Examples 1 to 28 can optionally include wherein the one or more filter adaptation circuits include a shared kernel dimension update filter compared to alternate between updating the first kernel dimension filter and the second kernel dimension filter.

Example 31 is a communication circuit arrangement including a signal path circuit configured to estimate a first interference signal produced by a first amplifier with a first kernel dimension filter and a first delay tap dimension filter and further configured to estimate a second interference signal produced by a second amplifier with a second kernel dimension filter and a second delay tap dimension filter, a cancelation circuit configured to subtract a combination of the first interference signal and the second interference signal from a received signal to obtain a clean signal, and one or more filter adaptation circuits configured to alternate between a kernel update phase during which the one or more filter adaptation circuits update the first kernel dimension filter and the second kernel dimension filter and a delay update phase during which the one or more filter adaptation circuits update the first delay tap dimension filter and the second delay tap dimension filter.

In Example 32, the subject matter of Example 31 can optionally be configured as a radio communication device and further including one or more receive chains, a first transmit chain including the first amplifier, a second transmit chain including the second amplifier, and one or more antennas coupled to the one or more receive chains and the first transmit chain.

In Example 33, the subject matter of Example 32 can optionally include wherein a first receive chain of the one or more receive chains is configured to receive the received signal via the one or more antennas, wherein the combination of the first interference signal and the second interference signal includes approximation of leakage from the first transmit chain and the second transmit chain to the first receive chain.

In Example 34, the subject matter of Example 33 can optionally include wherein the one or more filter adaptation circuits are further configured to update one or more kernel dimension filters or one or more delay tap dimension filters of at least a second receive chain of the one or more receive chains.

In Example 35, the subject matter of any one of Examples 32 to 34 can optionally include wherein the first transmit chain and the second transmit chain are layers of a Multiple Input Multiple Output (MIMO) communication scheme.

In Example 36, the subject matter of any one of Examples 31 to 35 can optionally include wherein the first kernel dimension filter and the first delay tap dimension filter are configured to approximate a leakage path from the first amplifier and the second kernel dimension filter and the second delay tap dimension filter are configured to approximate a leakage path from the second amplifier.

In Example 37, the subject matter of any one of Examples 31 to 36 can optionally include wherein the one or more filter adaptation circuits are configured to update the first kernel dimension filter, the first delay tap dimension filter, the second kernel dimension filter, and the second delay tap dimension filter in real-time.

In Example 38, the subject matter of any one of Examples 31 to 37 can optionally include wherein the first kernel dimension filter, the second kernel dimension filter, the first delay tap dimension filter, and the second delay tap dimension filter are vectors.

In Example 39, the subject matter of any one of Examples 31 to 38 can optionally include wherein the signal path circuit is configured to estimate the first interference signal by applying the first kernel dimension filter and the first delay tap dimension filter to a first input signal for the first amplifier to obtain the first interference signal and configured to estimate the second interference signal by applying the second kernel dimension filter and the second delay tap dimension filter to a second input signal for the second amplifier to obtain the second interference signal.

In Example 40, the subject matter of Example 39 can optionally include wherein the one or more filter adaptation circuits are configure to update the first kernel dimension filter, the first delay tap dimension filter, the second kernel dimension filter, and the second delay tap dimension filter by iteratively updating the first kernel dimension filter, the first delay tap dimension filter, the second kernel dimension filter, and the second delay tap dimension filter over each of a plurality of samples of the first input signal and the second input signal.

In Example 41, the subject matter of Example 39 or 40 can optionally further include a first kernel generation circuit configured to process the first input signal to derive a first plurality of kernel signals from the first input signal, each of the first plurality of kernel signals approximating a non-linear component of a leakage path of the first amplifier, wherein the signal path circuit is configured to apply the first kernel dimension filter to the first input signal by applying the first kernel dimension filter to the first plurality of kernel signals.

In Example 42, the subject matter of Example 41 can optionally include wherein each of the first plurality of kernel signals is composed of a plurality of delay taps, wherein each weight of the first kernel dimension filter corresponds to a respective one of the first plurality of kernel signals and each weight of the first delay tap dimension filter corresponds to a respective one of the plurality of delay taps.

In Example 43, the subject matter of Example 42 can optionally include wherein the first kernel dimension filter is configured to approximate the leakage path of the first amplifier over the first plurality of kernel signals and the first delay tap dimension filter is configured to approximate the leakage path of the first amplifier over the first plurality of delay taps.

In Example 44, the subject matter of any one of Examples 39 to 43 can optionally further include a second kernel generation circuit configured to process the second input signal to derive a second plurality of kernel signals from the second input signal, each of the second plurality of kernel signals approximating a non-linear component of a leakage path of the second amplifier, wherein the signal path circuit is configured to apply the second kernel dimension filter to the second input signal by applying the second kernel dimension filter to the second plurality of kernel signals.

In Example 45, the subject matter of Example 44 can optionally include wherein each of the second plurality of kernel signals is composed of a second plurality of delay taps, wherein each weight of the second kernel dimension filter corresponds to a respective one of the second plurality of kernel signals and each weight of the second delay tap dimension filter corresponds to a respective one of the second plurality of delay taps.

In Example 46, the subject matter of Example 45 can optionally include wherein the second kernel dimension filter is configured to approximate the leakage path of the second amplifier over the second plurality of kernel signals and the second delay tap dimension filter is configured to approximate the leakage path of the second amplifier over the second plurality of delay taps.

In Example 47, the subject matter of any one of Examples 39 to 46 can optionally include wherein the one or more filter adaptation circuits are configured to update the first kernel dimension filter and the first delay tap dimension filter based on the first input signal and the clean signal and configured to update the second kernel dimension filter and the second delay tap dimension filter based on the second input signal and the clean signal.

In Example 48, the subject matter of any one of Examples 39 to 47 can optionally include wherein the one or more filter adaptation circuits are configured to alternate between the kernel update phase and the delay tap update phase by first applying the first kernel dimension filter to the first input signal to obtain a first filtered input signal, first comparing the first filtered input signal to the clean signal to identify at least one weight of the first delay tap dimension filter to update, second applying the second kernel dimension filter to the second input signal to obtain a second filtered input signal, and second comparing the second filtered input signal to the clean signal to identify at least one weight of the second delay tap dimension filter to update, wherein the first applying, first comparing, second applying, and second comparing are performed during the delay tap update phase.

In Example 49, the subject matter of Example 48 can optionally include wherein the one or more filter adaptation circuits are configured to compare the first filtered input signal to the clean signal to identify the at least one weight of the first delay tap dimension filter to update by determining a cross-correlation vector between the first filtered input signal and the clean signal, identifying a first weight of the first delay tap dimension filter to update based on the cross-correlation vector.

In Example 50, the subject matter of Example 49 can optionally include wherein the one or more filter adaptation circuits are configured to update exclusively the first weight of the first delay tap dimension filter.

In Example 51, the subject matter of Example 49 or 50 can optionally include wherein the one or more filter adaptation circuits are configured to update the first weight of the first delay tap dimension filter according to a recursive least squares (RLS) optimization scheme.

In Example 52, the subject matter of Example 51 can optionally include wherein the one or more filter adaptation circuits are configured to update the first weight of the first delay tap dimension filter according to a recursive least square (RLS) dichotomous coordinate descent (DCD) optimization scheme.

In Example 53, the subject matter of any one of Examples 48 to 52 can optionally include wherein the one or more filter adaptation circuits include a first delay tap dimension filter adaptation circuit configured to perform the updates to the first delay tap dimension filter and further include a different second delay tap dimension adaptation circuit configured to perform the updates to the second delay tap dimension filter.

In Example 54, the subject matter of any one of Examples 48 to 52 can optionally include wherein the one or more filter adaptation circuits include a shared delay tap dimension update filter compared to alternate between updating the first delay tap dimension filter and the second delay tap dimension filter In Example 55, the subject matter of any one of Examples 39 to 52 can optionally include wherein the one or more filter adaptation circuits are configured to alternate between the kernel update phase and the delay tap update phase by first applying the first delay tap dimension filter to the first input signal to obtain a first filtered input signal, first comparing the first filtered input signal to the clean signal to identify at least one weight of the first kernel dimension filter to update, second applying the second delay dimension filter to the second input signal to obtain a second filtered input signal, and second comparing the second filtered input signal to the clean signal to identify at least one weight of the second kernel dimension filter to update, wherein the first applying, first comparing, second applying, and second comparing are performed during the kernel update phase.

In Example 56, the subject matter of Example 55 can optionally include wherein the one or more filter adaptation circuits are configured to compare the first filtered input signal to the clean signal to identify at least one weight of the first kernel dimension filter to update by determining a cross-correlation vector between the first filtered input signal and the clean signal, identifying a first weight of the first kernel dimension filter to update based on the cross-correlation vector.

In Example 57, the subject matter of Example 56 can optionally include wherein the one or more filter adaptation circuits are configured to update exclusively the first weight of the first kernel dimension filter.

In Example 58, the subject matter of Example 56 or 57 can optionally include wherein the one or more filter adaptation circuits are configured to update the first weight of the first kernel dimension filter according to a recursive least squares (RLS) optimization scheme.

In Example 59, the subject matter of Example 58 can optionally include wherein the one or more filter adaptation circuits are configured to update exclusively a single bit of the first weight of the first kernel dimension filter according to recursive least squares (RLS) dichotomous coordinate descent (DCD) optimization scheme.

In Example 60, the subject matter of any one of Examples 55 to 59 can optionally include wherein the one or more filter adaptation circuits include a first kernel dimension filter adaptation circuit configured to perform the updates to the first kernel dimension filter and further include a different second kernel dimension adaptation circuit configured to perform the updates to the second kernel dimension filter.

In Example 61, the subject matter of any one of Examples 55 to 59 can optionally include wherein the one or more filter adaptation circuits include a shared kernel dimension update filter compared to alternate between updating the first kernel dimension filter and the second kernel dimension filter.

Example 62 is a method of performing interference cancelation including applying a first kernel dimension filter to a first input signal to estimate a first kernel dimension interference signal derived from a first amplifier, applying a second kernel dimension filter to a second input signal to estimate a second kernel dimension interference signal derived from a second amplifier, applying a joint delay tap dimension filter to a combination of the first kernel dimension interference signal and the second kernel dimension interference signal to obtain an estimated joint interference signal, and removing the estimated joint interference signal from a received signal to obtain a clean signal.

In Example 63, the subject matter of Example 62 can optionally further include alternating between a kernel update phase including updating the first kernel dimension filter and the second kernel dimension filter and a delay tap update phase including updating the joint delay tap dimension filter.

In Example 64, the subject matter of Example 62 or 63 can optionally further include amplifying the first input signal with the first amplifier to form a first amplified signal, amplifying the second input signal with the second amplifier to form a second amplified signal, and wirelessly transmitting the first amplified signal and the second amplified signal.

In Example 65, the subject matter of Example 64 can optionally further include receiving the received signal at a receive chain, where the estimated joint interference signal includes approximation of leakage from the first amplifier and the second amplifier to the receive chain.

In Example 66, the subject matter of Example 65 can optionally include wherein the joint delay tap estimation filter estimates a delay tap response of one or more filters that are common to a leakage path from both the first amplifier and the second amplifier to the receive chain.

In Example 67, the subject matter of any one of Examples 64 to 66 can optionally include wherein the first input signal and the second input signal are transmit layers of a Multiple Input Multiple Output (MIMO) communication scheme.

In Example 68, the subject matter of any one of Examples 63 to 67 can optionally include wherein the kernel update phase and the delay tap update phase include updating the first kernel dimension filter, the second kernel dimension filter, and the joint delay tap dimension filter in real-time.

In Example 69, the subject matter of any one of Examples 63 to 68 can optionally include wherein the kernel update phase and the delay tap update phase include iteratively updating the first kernel dimension filter, the second kernel dimension filter, and the joint delay tap dimension filter over each of a plurality of samples of the first input signal and the second input signal.

In Example 70, the subject matter of any one of Examples 62 to 69 can optionally further include processing the first input signal to derive a first plurality of kernel signals from the first input signal, each of the first plurality of kernel signals approximating a non-linear component of a leakage path of the first amplifier, and wherein applying the first kernel dimension filter to the first input signal to estimate the first kernel dimension interference signal includes applying the first kernel dimension filter to the first plurality of kernel signals.

In Example 71, the subject matter of Example 70 can optionally include wherein each of the first plurality of kernel signals is composed of a first plurality of delay taps, wherein each weight of the first kernel dimension filter corresponds to a respective one of the first plurality of kernel signals and each weight of the joint delay tap dimension filter corresponds to a respective one of the first plurality of delay taps.

In Example 72, the subject matter of Example 71 can optionally include wherein the first kernel dimension filter is configured to approximate the leakage path of the first amplifier over the first plurality of kernel signals and the joint delay tap dimension filter is configured to approximate the leakage path of the first amplifier over the first plurality of delay taps.

In Example 73, the subject matter of any one of Examples 62 to 72 can optionally further include processing the second input signal to derive a second plurality of kernel signals from the second input signal, each of the second plurality of kernel signals approximating a non-linear component of a leakage path of the second amplifier, and wherein applying the second kernel dimension filter to the second input signal to estimate the second kernel dimension interference signal includes applying the second kernel dimension filter to the second plurality of kernel signals.

In Example 74, the subject matter of Example 73 can optionally include wherein each of the second plurality of kernel signals is composed of a second plurality of delay taps, wherein each weight of the second kernel dimension filter corresponds to a respective one of the second plurality of kernel signals and each weight of the joint delay tap dimension filter corresponds to a respective one of the second plurality of delay taps.

In Example 75, the subject matter of Example 74 can optionally include wherein the second kernel dimension filter is configured to approximate the leakage path of the second amplifier over the second plurality of kernel signals and the joint delay tap dimension filter is configured to approximate the leakage path of the second amplifier over the second plurality of delay taps.

The method of any one of Examples 62 to 75, wherein the first kernel dimension filter, the second kernel dimension filter, and the joint delay tap dimension filter are vectors.

In Example 77, the subject matter of any one of Examples 63 to 76 can optionally include wherein the kernel update phase and the delay tap update phase include updating the first kernel dimension filter, the second kernel dimension filter, and the joint delay tap dimension filter based on the first input signal, the second input signal, and the clean signal.

In Example 78, the subject matter of any one of Examples 63 to 77 can optionally include wherein the delay tap update phase includes updating the joint delay tap dimension filter by comparing the combination of the first kernel dimension interference signal and the second kernel dimension interference signal to the clean signal to identify at least one weight of the joint delay tap dimension filter to update.

In Example 79, the subject matter of Example 78 can optionally include wherein comparing the combination of the first kernel dimension interference signal and the second kernel dimension interference signal to the clean signal to identify the at least one weight of the joint delay tap dimension filter to update includes determining a cross-correlation vector between the combination of the first kernel dimension interference signal and the second kernel dimension interference signal and the clean signal, and identifying a first weight of the joint delay tap dimension filter to update based on the cross-correlation vector.

In Example 80, the subject matter of Example 79 can optionally include wherein identifying the first weight of the joint delay tap dimension filter to update based on the cross-correlation vector includes updating exclusively the first weight of the joint delay tap dimension filter.

In Example 81, the subject matter of Example 79 can optionally include wherein identifying the first weight of the joint delay tap dimension filter to update based on the cross-correlation vector includes updating the first weight of the joint delay tap dimension filter according to a recursive least squares (RLS) optimization scheme.

In Example 82, the subject matter of Example 81 can optionally include wherein identifying the first weight of the joint delay tap dimension filter to update based on the cross-correlation vector includes updating exclusively a single bit of the first weight of the joint delay tap dimension filter according to recursive least squares (RLS) dichotomous coordinate descent (DCD) optimization scheme.

In Example 83, the subject matter of any one of Examples 63 to 82 can optionally include wherein the kernel update phase includes applying the joint delay tap dimension filter to the first input signal to obtain a first filtered input signal, comparing the first filtered input signal to the clean signal to identify at least one weight of the first kernel dimension filter to update, applying the joint delay tap dimension filter to the second input signal to obtain a second filtered input signal, and comparing the second filtered input signal to the clean signal to identify at least one weight of the second kernel dimension filter to update.

In Example 84, the subject matter of Example 83 can optionally include wherein comparing the first filtered input signal to the clean signal to identify the at least one weight of the first kernel dimension filter to update includes determining a cross-correlation vector between the first filtered input signal and the clean signal, identifying a first weight of the first kernel dimension filter to update based on the cross-correlation vector.

In Example 85, the subject matter of Example 84 can optionally include wherein identifying the first weight of the first kernel dimension filter to update based on the cross-correlation vector includes updating exclusively the first weight of the first kernel dimension filter.

In Example 86, the subject matter of Example 84 can optionally include wherein identifying the first weight of the first kernel dimension filter to update based on the cross-correlation vector includes updating the first weight of the first kernel dimension filter according to a recursive least squares (RLS) optimization scheme.

In Example 87, the subject matter of Example 84 can optionally include wherein identifying the first weight of the first kernel dimension filter to update based on the cross-correlation vector includes updating exclusively a single bit of the first weight of the first kernel dimension filter according to a recursive least squares (RLS) dichotomous coordinate descent (DCD) optimization scheme.

Example 88 is a method of performing interference cancelation including estimating a first interference signal produced by a first amplifier with a first kernel dimension filter and a first delay tap dimension filter, estimating a second interference signal produced by a second amplifier with a second kernel dimension filter and a second delay tap dimension filter, subtracting a combination of the first interference signal and the second interference signal from a received signal to obtain a clean signal, and alternating between a kernel update phase including updating the first kernel dimension filter and the second kernel dimension filter and a delay tap update phase including updating the first delay tap dimension filter and the second delay tap dimension filter.

In Example 89, the subject matter of Example 88 can optionally further include amplifying a first input signal with the first amplifier, amplifying a second input signal with the second amplifier, and wirelessly transmitting the amplified first input signal and the amplified second input signal.

In Example 90, the subject matter of Example 89 can optionally further include receiving the received signal at a receive chain, wherein the combination of the first interference signal and the second interference signal includes approximation of leakage from the first power amplifier and the second power amplifier to the receive chain.

In Example 91, the subject matter of Example 89 can optionally include wherein the first input signal and the second input signal are transmit layers of a Multiple Input Multiple Output (MIMO) communication scheme.

In Example 92, the subject matter of any one of Examples 88 to 91 can optionally include wherein the first kernel dimension filter and the first delay tap dimension filter are configured to approximate a leakage path from the first amplifier and the second kernel dimension filter and the second delay tap dimension filter are configured to approximate a leakage path from the second amplifier.

In Example 93, the subject matter of any one of Examples 88 to 92 can optionally include wherein the kernel update phase and the delay tap update phase include updating the first kernel dimension filter, the second kernel dimension filter, the first delay tap dimension filter, and the second delay tap dimension filter in real-time.

In Example 94, the subject matter of any one of Examples 88 to 92 can optionally include wherein the first kernel dimension filter, the second kernel dimension filter, the first delay tap dimension filter, and the second delay tap dimension filter are vectors.

In Example 95, the subject matter of any one of Examples 88 to 94 can optionally include wherein estimating the first interference signal produced by the first amplifier with the first kernel dimension filter and the first delay tap dimension filter includes applying the first kernel dimension filter and the first delay tap dimension filter to a first input signal for the first amplifier to obtain the first interference signal, and wherein estimating the second interference signal produced by the second amplifier with the second kernel dimension filter and the second kernel dimension filter includes applying the first kernel dimension filter and the second kernel dimension filter to a second input signal for the second amplifier to obtain the second interference signal.

In Example 96, the subject matter of Example 95 can optionally include wherein the kernel update phase and the delay tap update phase include updating the first kernel dimension filter, the first delay tap dimension filter, the second kernel dimension filter, and the second delay tap dimension filter by iteratively updating the first kernel dimension filter, the first delay tap dimension filter, the second kernel dimension filter, and the second delay tap dimension filter over each of a plurality of samples of the first input signal and the second input signal.

In Example 97, the subject matter of any one of Examples, further including can optionally include the first input signal to derive a first plurality of kernel signals from the first input signal, each of the first plurality of kernel signals approximating a non-linear component of a leakage path of the first amplifier, and wherein applying the first kernel dimension filter and the first delay tap dimension filter to the first input signal for the first amplifier to obtain the first interference signal includes applying the first kernel dimension filter to the first plurality of kernel signals.

In Example 98, the subject matter of Example 97 can optionally include wherein each of the first plurality of kernel signals is composed of a first plurality of delay taps, wherein each weight of the first kernel dimension filter corresponds to a respective one of the first plurality of kernel signals and each weight of the first delay tap dimension filter corresponds to a respective one of the first plurality of delay taps.

In Example 99, the subject matter of Example 98 can optionally include wherein the first kernel dimension filter is configured to approximate the leakage path of the first amplifier over the first plurality of kernel signals and the first delay tap dimension filter is configured to approximate the leakage path of the first amplifier over the first plurality of delay taps.

In Example 100, the subject matter of any one of Examples 95 to 99 can optionally further include processing the second input signal to derive a second plurality of kernel signals from the second input signal, each of the second plurality of kernel signals approximating a non-linear component of a leakage path of the second amplifier, and wherein applying the second kernel dimension filter and the second delay tap dimension filter to the second input signal for the second amplifier to obtain the second interference signal includes applying the second kernel dimension filter to the second plurality of kernel signals.

In Example 101, the subject matter of Example 100 can optionally include wherein each of the second plurality of kernel signals is composed of a second plurality of delay taps, wherein each weight of the second kernel dimension filter corresponds to a respective one of the second plurality of kernel signals and each weight of the second delay tap dimension filter corresponds to a respective one of the second plurality of delay taps.

In Example 102, the subject matter of Example 98 can optionally include wherein the second kernel dimension filter is configured to approximate the leakage path of the second amplifier over the second plurality of kernel signals and the second delay tap dimension filter is configured to approximate the leakage path of the first amplifier over the second plurality of delay taps.

In Example 103, the subject matter of any one of Examples 95 to 102 can optionally include wherein the kernel update phase and the delay tap update phase include updating the first kernel dimension filter and the first delay tap dimension filter based on the first input signal and the clean signal and updating the second kernel dimension filter and the second kernel dimension filter based on the second input signal and the clean signal.

In Example 104, the subject matter of any one of Examples 95 to 103 can optionally include wherein the delay tap update phase includes applying the first kernel dimension filter to the first input signal to obtain a first filtered input signal, comparing the first filtered input signal to the clean signal to identify at least one weight of the first delay tap dimension filter to update, applying the second kernel dimension filter to the second input signal to obtain a second filtered input signal, and comparing the second filtered input signal to the clean signal to identify at least one weight of the second delay tap dimension filter to update.

In Example 105, the subject matter of Example 104 can optionally include wherein comparing the first filtered input signal to the clean signal to identify the at least one weight of the first delay tap dimension filter to update includes determining a cross-correlation vector between the first filtered input signal and the clean signal, identifying a first weight of the first delay tap dimension filter to update based on the cross-correlation vector.

In Example 106, the subject matter of Example 105 can optionally include wherein identifying the first weight of the first delay tap dimension filter to update based on the cross-correlation vector includes updating exclusively the first weight of the first delay tap dimension filter.

In Example 107, the subject matter of Example 105 or 106 can optionally include wherein identifying the first weight of the first delay tap dimension filter to update based on the cross-correlation vector includes updating the first weight of the first delay tap dimension filter according to a recursive least squares (RLS) optimization scheme.

In Example 108, the subject matter of Example 105 or 106 can optionally include wherein identifying the first weight of the first delay tap dimension filter to update based on the cross-correlation vector includes updating the first weight of the first delay tap dimension filter according to a recursive least square (RLS) dichotomous coordinate descent (DCD) optimization scheme.

In Example 109, the subject matter of any one of Examples 95 to 108 can optionally include wherein the kernel update phase includes applying the first delay tap dimension filter to the first input signal to obtain a first filtered input signal, comparing the first filtered input signal to the clean signal to identify at least one weight of the first kernel dimension filter to update, applying the second delay dimension filter to the second input signal to obtain a second filtered input signal, and comparing the second filtered input signal to the clean signal to identify at least one weight of the second kernel dimension filter to update.

In Example 110, the subject matter of Example 109 can optionally include wherein comparing the first filtered input signal to the clean signal to identify the at least one weight of the first kernel dimension filter to update includes determining a cross-correlation vector between the first filtered input signal and the clean signal, identifying a first weight of the first kernel dimension filter to update based on the cross-correlation vector.

In Example 111, the subject matter of Example 110 can optionally include wherein identifying the first weight of the first kernel dimension filter to update based on the cross-correlation vector includes updating exclusively the first weight of the first kernel dimension filter.

In Example 112, the subject matter of Example 110 or 111 can optionally include wherein identifying the first weight of the first kernel dimension filter to update based on the cross-correlation vector includes updating the first weight of the first kernel dimension filter according to a recursive least squares (RLS) optimization scheme.

In Example 113, the subject matter of Example 110 or 111 can optionally include wherein identifying the first weight of the first kernel dimension filter to update based on the cross-correlation vector includes updating the first weight of the first kernel dimension filter according to a recursive least square (RLS) dichotomous coordinate descent (DCD) optimization scheme.

Example 114 is a method of performing interference cancelation including separately applying a kernel dimension filter and a delay tap dimension filter to an input signal for an amplifier to obtain an estimated interference signal, subtracting the estimated interference signal from a received signal to obtain a clean signal, and alternating between updating the kernel dimension filter and updating the delay tap dimension filter using the clean signal.

In Example 115, the subject matter of Example 114 can optionally include wherein alternating between updating the kernel dimension filter and updating the delay tap dimension filter using the clean signal includes updating the kernel dimension filter in real-time over a first plurality of digital time samples of the input signal and updating the delay tap dimension filter in real-time over a second plurality of digital time samples of the input signal.

In Example 116, the subject matter of Example 114 can optionally include wherein the input signal includes a plurality of digital time samples, and wherein alternating between updating the kernel dimension filter and updating the delay tap dimension filter using the clean signal includes updating the kernel dimension filter or the delay tap dimension filter over each of the plurality of digital time samples.

In Example 117, the subject matter of Example 114 can optionally include wherein separately applying the kernel dimension filter and the delay tap dimension filter to the input signal for the amplifier to obtain the estimated interference signal includes processing the input signal to derive a plurality of kernel signals from the input signal, wherein each of the plurality of kernel signals approximates a non-linear component of a response of the amplifier, and separately applying the kernel dimension filter and the delay tap dimension filter to the plurality of kernel signals to obtain the estimated interference signal.

In Example 118, the subject matter of Example 117 can optionally include wherein each of the plurality of kernel signals is composed of a plurality of delay taps, wherein each weight of the kernel dimension filter corresponds to a respective one of the plurality of kernel signals and each weight of the delay tap dimension filter corresponds to a respective one of the plurality of delay taps.

In Example 119, the subject matter of Example 118 can optionally include wherein the number of plurality of kernel signals is configurable or the number of plurality of delay taps is configurable.

In Example 120, the subject matter of Example 118 can optionally include wherein the kernel dimension filter approximates the response of the amplifier over the plurality of kernel signals and the delay tap dimension filter approximates the response of the amplifier over the plurality of delay taps.

In Example 121, the subject matter of any one of Examples 114 to 120 can optionally include wherein the kernel dimension filter and the delay tap dimension filter are vectors.

In Example 122, the subject matter of any one of Examples 114 to 120 can optionally further include amplifying the input signal with the amplifier and transmitting the amplified input signal with a radio antenna.

In Example 123, the subject matter of Example 120 can optionally further include receiving the received signal with the radio antenna, wherein the estimated interference signal approximates leakage from the amplified input signal that is contained in the received signal.

In Example 124, the subject matter of any one of Examples 114 to 123 can optionally include wherein alternating between updating the kernel dimension filter and updating the delay tap dimension filter includes updating the kernel dimension filter and the delay tap dimension filter based on the plurality of kernel signals and the clean signal.

In Example 125, the subject matter of any one of Examples 117 to 123 can optionally include wherein alternating between updating the kernel dimension filter and updating the delay tap dimension filter includes selecting between the kernel dimension filter and the delay tap dimension filter to identify a current filter to update and a fixed filter to hold constant, applying the fixed filter to the plurality of kernel signals to obtain a decoupled input signal, and comparing the decoupled input signal to the clean signal to identify at least one weight of the current filter to update.

In Example 126, the subject matter of Example 125 can optionally include wherein comparing the decoupled input signal to the clean signal to identify the at least one weight of the current filter to update includes determining a cross-correlation vector between the decoupled input signal and the clean signal, identifying a first weight of the current filter to update based on the cross-correlation vector, and exclusively updating the first weight of the current filter.

In Example 127, the subject matter of Example 126 can optionally include wherein identifying the first weight of the current filter to update based on the cross-correlation vector includes identifying a maximum-valued element of the cross-correlation vector, and identifying the weight of the current filter with a corresponding element index to the maximum-valued element of the cross-correlation vector as the first weight.

In Example 128, the subject matter of Example 127 can optionally include wherein identifying the maximum-valued element of the cross-correlation vector includes identifying the element of the cross-correlation vector with the largest real component or the largest imaginary component as the maximum-valued element.

In Example 129, the subject matter of Example 125 can optionally include wherein comparing the decoupled input signal to the clean signal to identify the at least one weight of the current filter to update includes determining a cross-correlation vector between the decoupled input signal and the clean signal, and updating the at least one weight of the current filter to reduce a magnitude of the cross-correlation vector.

In Example 130, the subject matter of Example 129 can optionally include wherein updating the at least one weight of the current filter to reduce the magnitude of the cross-correlation vector includes updating the at least one weight of the current filter to reduce the magnitude of the cross-correlation vector according to a coordinate descent optimization scheme.

In Example 131, the subject matter of Example 129 can optionally include wherein updating the at least one weight of the current filter to reduce the magnitude of the cross-correlation vector includes updating the at least one weight of the current filter to reduce the magnitude of the cross-correlation vector according to a recursive least squares optimization scheme.

In Example 132, the subject matter of Example 129 can optionally include wherein updating the at least one weight of the current filter to reduce the magnitude of the cross-correlation vector includes updating the at least one weight of the current filter to reduce the magnitude of the cross-correlation vector according to a recursive least squares (RLS) dichotomous coordinate descent (DCD) optimization scheme.

In Example 133, the subject matter of Example 129 can optionally include wherein updating the at least one weight of the current filter to reduce the magnitude of the cross-correlation vector includes exclusively inverting a single bit of the first weight to reduce the magnitude of the cross-correlation vector.

In Example 134, the subject matter of Example 133 can optionally include wherein updating the at least one weight of the current filter to reduce the magnitude of the cross-correlation vector further includes evaluating one or more candidate bit inversions of the first weight to identify which of the one or more candidate bit inversions is closest to a predefined numerical difference, and identifying the single bit according to which of the one or more candidate bit inversions is closest to the predefined numerical difference.

In Example 135, the subject matter of Example 133 can optionally include wherein exclusively inverting the single bit of the first weight to reduce the magnitude of the cross-correlation vector includes inverting the single bit of the first weight according to a dichotomous coordinate descent optimization scheme.

In Example 136, the subject matter of Example 125 can optionally include wherein selecting between the kernel dimension filter and the delay tap dimension filter to identify the current filter to update and the fixed filter to hold constant includes selecting the kernel dimension filter as the current filter and the delay tap dimension filter as the fixed filter, and wherein applying the fixed filter to the plurality of kernel signals to obtain the decoupled input signal includes applying previous delay taps of the delay tap dimension filter to previous delay taps of the plurality of kernel signals during a preprocessing stage that occurs before receiving a most recent delay tap of the plurality of kernel signals, and after receiving the most recent delay tap of the plurality of kernel signals, applying a most recent delay tap of the delay tap dimension filter to the most recent delay tap of the plurality of kernel signals.

In Example 137, the subject matter of Example 136 can optionally further include performing the preprocessing stage during hidden clock cycles that occur before the most recent delay tap of the plurality of kernel signals is obtained.

In Example 138, the subject matter of Example 125 can optionally include wherein selecting between the kernel dimension filter and the delay tap dimension filter to identify the current filter to update and the fixed filter to hold constant includes selecting the delay tap dimension filter as the current filter and the kernel dimension filter as the fixed filter, and wherein applying the fixed filter to the plurality of kernel signals to obtain the decoupled input signal includes exclusively applying the kernel dimension filter to samples of the plurality of kernel signals corresponding to a single delay tap to obtain a first element of the decoupled input signal.

In Example 139, the subject matter of Example 138 can optionally include wherein the remaining elements of the decoupled input signal are time-delayed weighted versions of the first element of the decoupled input signal.

In Example 140, the subject matter of any one of Examples 117 to 135 can optionally include wherein alternating between updating the kernel dimension filter and updating the delay tap dimension filter includes selecting between the kernel dimension filter and the delay tap dimension filter to identify a current filter to update and a fixed filter to hold constant, applying the fixed filter to the plurality of kernel signals to obtain a decoupled input signal, determining a cross-correlation vector between the decoupled input signal and the clean signal and determining a correlation matrix of the decoupled input signal, and updating at least one weight of the current filter based on the cross-correlation vector and the correlation matrix.

In Example 141, the subject matter of Example 140 can optionally include wherein determining the cross-correlation vector between the decoupled input signal and the clean signal includes determining some elements of the cross-correlation vector during a first clock cycle with first calculation circuitry and determining other elements of the cross-correlation vector during a second clock cycle with the same first calculation circuitry, or determining some elements of the correlation matrix during a third clock cycle with second calculation circuitry and determining other elements of the correlation matrix during a second clock cycle with the same second calculation circuitry.

In Example 142, the subject matter of Example 140 can optionally include wherein selecting between the kernel dimension filter and the delay tap dimension filter to identify the current filter to update and the fixed filter to hold constant includes selecting the kernel dimension filter as the current filter and the delay tap dimension filter as the fixed filter, and wherein determining the cross-correlation vector between the decoupled input signal and the clean signal and determining the correlation matrix of the decoupled input signal includes exclusively determining the upper-triangle elements of the correlation matrix.

In Example 43, the subject matter of Example 142 can optionally include wherein the correlation matrix is a Hermitian matrix.

In Example 144, the subject matter of Example 140 can optionally include wherein selecting between the kernel dimension filter and the delay tap dimension filter to identify the current filter to update and the fixed filter to hold constant includes selecting the delay tap dimension filter as the current filter and the kernel dimension filter as the fixed filter, and wherein determining the cross-correlation vector between the decoupled input signal and the clean signal and determining the correlation matrix of the decoupled input signal includes exclusively determining a single row of the correlation matrix.

In Example 145, the subject matter of Example 144 can optionally include wherein a plurality of rows including the single row of the correlation matrix are statistically similar.

In Example 146, the subject matter of any one of Examples 114 to 139 can optionally include wherein alternating between updating the kernel dimension filter and updating the delay tap dimension filter includes using shared circuitry to update the kernel dimension filter and re-using the same shared circuitry to update the delay tap dimension filter.

In Example 147, the subject matter of any one of Examples 114 to 139 can optionally include wherein alternating between updating the kernel dimension filter and updating the delay tap dimension filter includes using shared circuitry to update the kernel dimension filter and re-using the same shared circuitry to update the delay tap dimension filter according to a pipeline clock schedule.

In Example 148, the subject matter of Example 147 can optionally include wherein alternating between updating the kernel dimension filter and updating the delay tap dimension filter includes updating the kernel dimension filter at one or more first times and updating the delay tap dimension at one or more different second times.

Example 149 is a communication circuitry arrangement configured to perform the method of any one of Examples 114 to 148.

In Example 150, the subject matter of Example 149 can optionally be configured as a radio communication device.

Example 151 is a non-transitory computer readable medium storing instructions that when executed by a controller of a radio communication device direct the radio communication device to perform the method of any one of Examples 114 to 148.

Example 152 is a method of performing interference cancelation including obtaining one or more subsignals derived from an input signal for an amplifier, each of the one or more subsignals representing a non-linear component of an amplifier response and composed of a plurality of delay taps, separately applying a first filter and a second filter to the one or more subsignals to obtain an estimated interference signal, wherein the first filter approximates the amplifier response over the one or more subsignals and the second filter approximates the amplifier response over the plurality of delay taps, subtracting the estimated interference signal from a received signal to obtain a clean signal, and alternating between updating the first filter and updating the second filter using the clean signal.

In Example 153, the subject matter of Example 152 can optionally include wherein alternating between updating the first filter and updating the second filter using the clean signal includes updating the first filter in real-time over a first plurality of digital time samples of the input signal and updating second first filter in real-time over a second plurality of digital time samples of the input signal.

In Example 154, the subject matter of Example 152 can optionally include wherein the input signal includes a plurality of digital time samples, and wherein alternating between updating the first filter and updating the second filter using the clean signal includes updating the first filter or the second filter over each of the plurality of digital time samples.

In Example 155, the subject matter of Example 152 can optionally include wherein each of the one or more subsignals correspond to a kernel of the amplifier.

In Example 156, the subject matter of Example 152 or 155 can optionally include wherein the first filter and the second filter are vectors.

In Example 157, the subject matter of any one of Examples 152 to 156 can optionally include wherein each weight of the first filter corresponds to a respective one of the one or more subsignals and each weight of the second filter corresponds to a respective delay tap of the plurality of delay taps.

In Example 158, the subject matter of any one of Examples 152 to 157 can optionally include wherein the number of one or more subsignals is configurable the number of the plurality of delay taps is configurable.

In Example 159, the subject matter of any one of Examples 152 to 158 can optionally further include amplifying the input signal with the amplifier and transmitting the amplified input signal with a radio antenna.

In Example 160, the subject matter of Example 159 can optionally further include receiving the received signal with the radio antenna, wherein the estimated interference signal approximates leakage from the amplified input signal that is contains in the received signal.

In Example 161, the subject matter of any one of Examples 152 to 160 can optionally include wherein alternating between updating the first filter and updating the second filter includes updating the first filter and the second filter based on the one or more subsignals and the clean signal.

In Example 162, the subject matter of any one of Examples 152 to 160 can optionally include wherein alternating between updating the first filter and updating the second filter includes selecting between the first filter and the second filter to identify a current filter to update and a fixed filter to hold constant, applying the fixed filter to the one or more subsignals to obtain a decoupled input signal, and comparing the decoupled input signal to the clean signal to identify at least one weight of the current filter to update.

In Example 163, the subject matter of Example 162 can optionally include wherein comparing the decoupled input signal to the clean signal to identify the at least one weight of the current filter to update includes determining a cross-correlation vector between the decoupled input signal and the clean signal, identifying a first weight of the current filter to update based on the cross-correlation vector, and exclusively updating the first weight of the current filter.

In Example 164, the subject matter of Example 163 can optionally include wherein identifying the first weight of the current filter to update based on the cross-correlation vector includes identifying a maximum-valued element of the cross-correlation vector, and identifying the weight of the current filter with a corresponding element index to the maximum-valued element of the cross-correlation vector as the first weight.

In Example 165, the subject matter of Example 164 can optionally include wherein identifying the maximum-valued element of the cross-correlation vector includes identifying the element of the cross-correlation vector with the largest real component or the largest imaginary component as the maximum-valued element.

In Example 166, the subject matter of Example 162 can optionally include wherein comparing the decoupled input signal to the clean signal to identify the at least one weight of the current filter to update includes determining a cross-correlation vector between the decoupled input signal and the clean signal, and updating the at least one weight of the current filter to reduce a magnitude of the cross-correlation vector.

In Example 167, the subject matter of Example 166 can optionally include wherein updating the at least one weight of the current filter to reduce a magnitude of the cross-correlation vector includes updating the at least one weight of the current filter to reduce a magnitude of the cross-correlation vector according to a coordinate descent optimization scheme.

In Example 168, the subject matter of Example 166 can optionally include wherein updating the at least one weight of the current filter to reduce a magnitude of the cross-correlation vector includes updating the at least one weight of the current filter to reduce a magnitude of the cross-correlation vector according to a recursive least squares optimization scheme.

In Example 169, the subject matter of Example 166 can optionally include wherein updating the at least one weight of the current filter to reduce a magnitude of the cross-correlation vector includes updating the at least one weight of the current filter to reduce a magnitude of the cross-correlation vector according to a recursive least squares (RLS) dichotomous coordinate descent (DCD) optimization scheme.

In Example 170, the subject matter of Example 166 or 169 can optionally include wherein updating the at least one weight of the current filter to reduce a magnitude of the cross-correlation vector includes exclusively inverting a single bit of the first weight to reduce a magnitude of the cross-correlation vector.

In Example 171, the subject matter of Example 170 can optionally include wherein updating the at least one weight of the current filter to reduce a magnitude of the cross-correlation vector further includes evaluating one or more candidate bit inversions of the first weight to identify which of the one or more candidate bit inversions is closest to a predefined numerical difference, and identifying the single bit according to which of the one or more candidate bit inversions is closest to the predefined numerical difference.

In Example 172, the subject matter of Example 170 can optionally include wherein exclusively inverting the single bit of the first weight to reduce a magnitude of the cross-correlation vector includes inverting the single bit of the first weight according to a dichotomous coordinate descent optimization scheme.

In Example 173, the subject matter of Example 162 can optionally include wherein selecting between the first filter and the second filter to identify the current filter to update and the fixed filter to hold constant includes selecting the first filter as the current filter and the second filter as the fixed filter, and wherein applying the fixed filter to the one or more subsignals to obtain the decoupled input signal includes applying previous delay taps of the second filter to previous delay taps of the one or more subsignals during a preprocessing stage that occurs before receiving a most recent delay tap of the one or more subsignals, and after receiving the most recent delay tap of the one or more subsignals, applying a most recent delay tap of the second filter to the most recent delay tap of the one or more subsignals.

In Example 174, the subject matter of Example 173 can optionally further include performing the preprocessing stage during hidden clock cycles that occur before the most recent delay tap of the one or more subsignals is obtained.

In Example 175, the subject matter of Example 162 can optionally include wherein selecting between the first filter and the second filter to identify the current filter to update and the fixed filter to hold constant includes selecting the second filter as the current filter and the first filter as the fixed filter, and wherein applying the fixed filter to the one or more subsignals to obtain the decoupled input signal includes exclusively applying the first filter to samples of the one or more subsignals corresponding to a single delay tap of the one or more subsignals to obtain a first element of the decoupled input signal.

In Example 176, the subject matter of Example 175 can optionally include wherein the remaining elements of the decoupled input signal are time-delayed weighted versions of the first element of the decoupled input signal.

In Example 177, the subject matter of any one of Examples 152 to 172 can optionally include wherein alternating between updating the first filter and updating the second filter includes selecting between the first filter and the second filter to identify a current filter to update and a fixed filter to hold constant, applying the fixed filter to the one or more subsignals to obtain a decoupled input signal, determining a cross-correlation vector between the decoupled input signal and the clean signal and determining a correlation matrix of the decoupled input signal, and updating at least one weight of the current filter based on the cross-correlation vector and the correlation matrix.

In Example 178, the subject matter of Example 177 can optionally include wherein determining the cross-correlation vector between the decoupled input signal and the clean signal includes determining some elements of the cross-correlation vector during a first clock cycle with first calculation circuitry and determining other elements of the cross-correlation vector during a second clock cycle with the same first calculation circuitry, or determining some elements of the correlation matrix during a third clock cycle with second calculation circuitry and determining other elements of the correlation matrix during a second clock cycle with the same second calculation circuitry.

In Example 179, the subject matter of Example 177 can optionally include wherein selecting between the first filter and the second filter to identify a current filter to update and a fixed filter to hold constant includes selecting the first filter as the current filter and the second filter as the fixed filter, and wherein determining the cross-correlation vector between the decoupled input signal and the clean signal and determining the correlation matrix of the decoupled input signal includes exclusively determining the upper-triangle elements of the correlation matrix.

In Example 180, the subject matter of Example 179 can optionally include wherein the correlation matrix is Hermitian matrix.

In Example 181, the subject matter of Example 177 can optionally include wherein selecting between the first filter and the second filter to identify the current filter to update and the fixed filter to hold constant includes selecting the second filter as the current filter and the first filter as the fixed filter, and wherein determining the cross-correlation vector between the decoupled input signal and the clean signal and determining the correlation matrix of the decoupled input signal includes exclusively determining the a single row of the correlation matrix.

In Example 182, the subject matter of Example 181 can optionally include wherein a plurality of rows including the single row of the correlation matrix are statistically similar.

In Example 183, the subject matter of any one of Examples 152 to 182 can optionally include wherein alternating between updating the first filter and updating the second filter includes using shared circuitry to update the first filter and re-using the same shared circuitry to update the second filter.

In Example 184, the subject matter of any one of Examples 152 to 182 can optionally include wherein alternating between updating the first filter and updating the second filter includes using shared circuitry to update the first filter and re-using the same shared circuitry to update the second filter according to a pipeline clock schedule.

In Example 185, the subject matter of any one of Examples 152 to 182 can optionally include wherein alternating between updating the first filter and updating the second filter includes updating the first filter at one or more first times and updating the delay tap dimension filter at one or more different second times.

Example 186 is a communication circuitry arrangement configured to perform the method of any one of Examples 152 to 185.

In Example 187, the subject matter of Example 186 can optionally be configured as a radio communication device.

Example 188 is a non-transitory computer readable medium storing instructions that when executed by a controller of a radio communication device direct the radio communication device to perform the method of any one of Examples 152 to 185.

Example 189 is a communication circuit arrangement including a signal path circuit configured to separately apply a kernel dimension filter and a delay tap dimension filter to an input signal for an amplifier to obtain an estimated interference signal, a cancelation circuit configured to subtract the estimated interference signal from a received signal to obtain a clean signal, and a filter update circuit configured to alternate between updating the kernel dimension filter and the delay tap dimension filter using the clean signal.

In Example 190, the subject matter of Example 189 can optionally be configured as a radio communication device and further including a receive chain, a radio antenna, and a transmit chain including the amplifier.

In Example 191, the subject matter of Example 190 can optionally include wherein the amplifier is configured to amplify the input signal and the radio antenna is configured to transmit the amplified input signal.

In Example 192, the subject matter of Example 190 or 191 can optionally include wherein the receive chain is configured to receive the received signal via the radio antenna, wherein the estimated interference signal approximates leakage from the transmit chain to the receive chain.

In Example 193, the subject matter of Example 189 can optionally include wherein the filter update circuit is configured to alternate between updating the kernel dimension filter and updating the delay tap dimension filter using the clean signal by updating the kernel dimension filter in real-time over a first plurality of digital time samples of the input signal and updating the delay tap dimension filter in real-time over a second plurality of digital time samples of the input signal.

In Example 194, the subject matter of Example 189 can optionally include wherein the input signal includes a plurality of digital time samples, and wherein alternating between updating the kernel dimension filter and updating the delay tap dimension filter using the clean signal includes updating the kernel dimension filter or the delay tap dimension filter over each of the plurality of digital time samples.

In Example 195, the subject matter of any one of Examples 189 to 194 can optionally further include a kernel generation circuit configured to process the input signal to derive a plurality of kernel signals from the input signal, each of the plurality of kernel signals approximating a non-linear component of a response of the amplifier wherein the signal path circuit is configured to separately apply the kernel dimension filter and the delay dimension filter to the input signal by separately applying the kernel dimension filter and the delay tap dimension filter to the plurality of kernel signals to obtain the estimated interference signal.

In Example 196, the subject matter of Example 195 can optionally include wherein each of the plurality of kernel signals is composed of a plurality of delay taps, wherein each weight of the kernel dimension filter corresponds to a respective one of the plurality of kernel signals and each weight of the delay tap dimension filter corresponds to a respective one of the plurality of delay taps.

In Example 197, the subject matter of Example 196 can optionally include wherein the signal path circuit and the filter update circuit are configured to support an adjustable number of kernel signals or an adjustable number of delay taps.

In Example 198, the subject matter of Example 196 can optionally include wherein the kernel dimension filter approximates the response of the amplifier over the plurality of kernel signals and the delay tap dimension filter approximates the response of the amplifier over the plurality of delay taps.

In Example 199, the subject matter of any one of Examples 189 to 198 can optionally include wherein the kernel dimension filter and the delay tap dimension filter are vectors.

In Example 200, the subject matter of any one of Examples 189 to 199 can optionally include wherein the filter update circuit is configured to alternate between updating the kernel dimension filter and updating the delay tap dimension filter by updating the kernel dimension filter and the delay tap dimension filter based on the input signal and the clean signal.

In Example 201, the subject matter of any one of Examples 195 to 200 can optionally include wherein the filter update circuit is configured to alternate between updating the kernel dimension filter and the delay tap dimension filter by selecting between the kernel dimension filter and the delay tap dimension filter to identify a current filter to update and a fixed filter to hold constant, applying the fixed filter to the plurality of kernel signals to obtain a decoupled input signal, and comparing the decoupled input signal to the clean signal to identify at least one weight of the current filter to update.

In Example 202, the subject matter of Example 201 can optionally include wherein the filter update circuit is configured to compare the decoupled input signal to identify the at least one weight of the current filter to update by determining a cross-correlation vector between the decoupled input signal and the clean signal, identifying a first weight of the current filter to update based on the cross-correlation vector, and exclusively updating the first weight of the current filter.

In Example 203, the subject matter of Example 202 can optionally include wherein the filter update circuit is configured to identify the first weight of the current filter to update based on the cross-correlation vector by identifying a maximum-valued element of the cross-correlation vector, and identifying the weight of the current filter with a corresponding element index to the maximum-valued element of the cross-correlation vector as the first weight.

In Example 204, the subject matter of Example 203 can optionally include wherein the filter update circuit is configured to identify the maximum-valued element of the cross-correlation vector by identifying an element of the cross-correlation vector with the largest real component or the largest imaginary component as the maximum-valued element.

In Example 205, the subject matter of Example 201 can optionally include wherein the filter update circuit is configured to compare the decoupled input signal to the clean signal to identify the at least one weight of the current filter to update by determining a cross-correlation vector between the decoupled input signal and the clean signal, and updating the at least one weight of the current filter to reduce a magnitude of the cross-correlation vector.

In Example 206, the subject matter of Example 205 can optionally include wherein the filter update circuit is configured to update the at least one weight of the current filter to reduce a magnitude of the cross-correlation vector by updating the at least one weight of the current filter to reduce a magnitude of the cross-correlation vector according to a recursive least squares optimization scheme.

In Example 207, the subject matter of Example 205 can optionally include wherein the filter update circuit is configured to update the at least one weight of the current filter to reduce a magnitude of the cross-correlation vector by updating the at least one weight of the current filter to reduce a magnitude of the cross-correlation vector according to a recursive least squares (RLS) dichotomous coordinate descent (DCD) optimization scheme.

In Example 208, the subject matter of Example 205 can optionally include wherein the filter update circuit is configured to update the at least one weight of the current filter to reduce a magnitude of the cross-correlation vector by updating the at least one weight of the current filter to reduce a magnitude of the cross-correlation vector according to a coordinate descent optimization scheme.

In Example 209, the subject matter of Example 205 can optionally include wherein the filter update circuit is configured to update the at least one weight of the current filter to reduce a magnitude of the cross-correlation vector by exclusively inverting a single bit of the first weight to reduce a magnitude of the cross-correlation vector.

In Example 210, the subject matter of Example 209 can optionally include wherein the filter update circuit is further configured to update the at least one weight of the current filter to reduce the cross-correlation vector by evaluating one or more candidate bit inversions of the first weight to identify which of the one or more candidate bit inversions is closest to a predefined numerical difference, and identifying the single bit according to which of the one or more candidate bit inversions is closest to the predefined numerical difference.

In Example 211, the subject matter of Example 209 can optionally include wherein the filter update circuit is configured to exclusively invert the single bit of the first weight to reduce the magnitude of the cross-correlation vector by inverting the single bit of the first weight according to a dichotomous coordinate descent optimization scheme.

In Example 212, the subject matter of Example 201 can optionally include wherein the filter update circuit is configured to select between the kernel dimension filter and the delay tap dimension filter to identify the current filter to update and the fixed filter to hold constant by selecting the kernel dimension filter as the current filter and the delay tap dimension filter as the fixed filter, and wherein the filter update circuit is configured to apply the fixed filter to the plurality of kernel signals to obtain the decoupled input signal by applying previous delay taps of the delay tap dimension filter to previous delay taps of the plurality of kernel signals during a preprocessing stage that occurs before receiving a most recent delay tap of the plurality of kernel signals, and after receiving the most recent delay tap of the plurality of kernel signals, applying a most recent delay tap of the delay tap dimension filter to the most recent delay tap of the plurality of kernel signals.

In Example 213, the subject matter of Example 212 can optionally include wherein the filter update circuit is configured to perform the preprocessing stage during hidden clock cycles that occur before the most recent delay tap of the plurality of kernel signals is obtained.

In Example 214, the subject matter of Example 201 can optionally include wherein the filter update circuit is configured to select between the kernel dimension filter and the delay tap dimension filter to identify the current filter to update and the fixed filter to hold constant by selecting the delay tap dimension filter as the current filter and the kernel dimension filter as the fixed filter, and wherein the filter update circuit is configured to apply the fixed filter to the plurality of kernel signals to obtain the decoupled input signal by exclusively applying the kernel dimension filter to samples of the plurality of kernel signals corresponding to a single delay tap to obtain a first element of the decoupled input signal.

In Example 215, the subject matter of Example 214 can optionally include wherein the remaining elements of the decoupled input signal are time-delayed weighted versions of the first element of the decoupled input signal.

In Example 216, the subject matter of any one of Examples 192 to 215 can optionally include wherein the filter update circuit is configured to alternate between updating the kernel dimension filter and updating the delay tap dimension filter by selecting between the kernel dimension filter and the delay tap dimension filter to identify a current filter to update and a fixed filter to hold constant, applying the fixed filter to the plurality of kernel signals to obtain a decoupled input signal, determining a cross-correlation vector between the decoupled input signal and the clean signal and determining a correlation matrix of the decoupled input signal, and updating at least one weight of the current filter based on the cross-correlation vector and the correlation matrix.

In Example 217, the subject matter of Example 216 can optionally include wherein the filter update circuit is configured to determine the cross-correlation vector between the decoupled input signal and the clean signal by determining some elements of the cross-correlation vector during a first clock cycle with first calculation circuitry and determining other elements of the cross-correlation vector during a second clock cycle with the same first calculation circuitry, or determining some elements of the correlation matrix during a third clock cycle with second calculation circuitry and determining other elements of the correlation matrix during a second clock cycle with the same second calculation circuitry.

In Example 218, the subject matter of Example 216 can optionally include wherein the filter update circuit is configured to select between the kernel dimension filter and the delay tap dimension filter to identify the current filter to update and the fixed filter to hold constant by selecting the kernel dimension filter as the current filter and the delay tap dimension filter as the fixed filter, and wherein the filter update circuit is configured to determine the cross-correlation vector between the decoupled input signal and the clean signal and determining the correlation matrix of the decoupled input signal by exclusively determining the upper-triangle elements of the correlation matrix.

In Example 219, the subject matter of Example 218 can optionally include wherein the correlation matrix is a Hermitian matrix.

In Example 220, the subject matter of Example 216 can optionally include wherein the filter update circuit is configured to select between the kernel dimension filter and the delay tap dimension filter to identify the current filter to update and the fixed filter to hold constant by selecting the delay tap dimension filter as the current filter and the kernel dimension filter as the fixed filter, and wherein the filter update circuit is configured to determine the cross-correlation vector between the decoupled input signal and the clean signal and determining the correlation matrix of the decoupled input signal by exclusively determining a single row of the correlation matrix.

In Example 221, the subject matter of Example 220 can optionally include wherein a plurality of rows including the single row of the correlation matrix are statistically similar.

In Example 222, the subject matter of any one of Examples 189 to 221 can optionally include wherein the filter update circuit is configured to alternate between updating the kernel dimension filter and updating the delay tap dimension filter by using shared circuitry to update the kernel dimension filter and re-using the same shared circuitry to update the delay tap dimension filter.

In Example 223, the subject matter of any one of Examples 189 to 221 can optionally include wherein the filter update circuit is configured to alternate between updating the kernel dimension filter and updating the delay tap dimension filter by using shared circuitry to update the kernel dimension filter and re-using the same shared circuitry to update the delay tap dimension filter according to a pipeline clock schedule.

In Example 224, the subject matter of Example 223 can optionally include wherein the filter update circuit is configured to alternate between updating the kernel dimension filter and updating the delay tap dimension filter by updating the kernel dimension filter at one or more first times and updating the delay tap dimension at one or more different second times.

Example 225 is a communication circuit arrangement including a subsignal generation circuit configured to obtain one or more subsignals from an input signal for an amplifier, each of the one or more subsignals representing a non-linear component of an amplifier response and composed of a plurality of delay taps, a signal path circuit configured to separately apply a first filter and a second filter to the one or more subsignals to obtain an estimated interference signal, wherein the first filter approximates the amplifier response over the one or more subsignals and the second filter approximates the amplifier response over the plurality of delay taps, a cancelation circuit configured to subtract the estimated interference signal from the received signal to obtain a clean signal, and a filter update circuit configured to alternate between updating the first filter and alternating the second filter using the clean signal.

In Example 226, the subject matter of Example 225 can optionally be configured as a radio communication device and further including a receive chain, a radio antenna, and a transmit chain including the amplifier.

In Example 227, the subject matter of Example 226 can optionally include wherein the amplifier is configured to amplify the input signal and the radio antenna is configured to transmit the amplified input signal.

In Example 228, the subject matter of Example 226 or 227 can optionally include wherein the receive chain is configured to receive the received signal via the radio antenna, wherein the estimated interference signal approximates leakage from the transmit chain to the receive chain.

In Example 229, the subject matter of any one of Examples 225 to 228 can optionally include wherein the filter update circuit is configured to alternate between updating the first filter and the second filter by updating the first filter in real-time over a first plurality of digital time samples of the input signal and updating the second filter in real-time over a second plurality of digital time samples of the input signal In Example 230, the subject matter of any one of Examples 225 to 228 can optionally include wherein the input signal includes a plurality of digital time samples, and wherein alternating between updating the first filter and updating the second filter using the clean signal includes updating the first filter or the second filter over each of the plurality of digital time samples.

In Example 231, the subject matter of any one of Examples 225 to 228 can optionally include wherein each of the one or more subsignals correspond to a kernel of the amplifier.

In Example 232, the subject matter of any one of Examples 225 to 231 can optionally include wherein the first filter and the second filter are vectors.

In Example 233, the subject matter of any one of Examples 225 to 232 can optionally include wherein each of weight of the first filter corresponds to a respective one of the one or more subsignals and each weight of the second filter corresponds to a respective delay tap of the plurality of delay taps.

In Example 234, the subject matter of any one of Examples 225 to 233 can optionally include wherein the signal path circuit and the filter update circuit are configured to support an adjustable number of subsignals or an adjustable number of delay taps.

In Example 235, the subject matter of any one of Examples 225 to 234 can optionally include wherein the filter update circuit is configured to alternate between updating the first filter and updating the second filter by updating the first filter and the second filter based on the one or more subsignals and the clean signal.

In Example 236, the subject matter of any one of Examples 225 to 234 can optionally include wherein the filter update circuit is configured to alternate between updating the first filter and updating the second filter by selecting between the first filter and the second filter to identify a current filter to update and a fixed filter to hold constant, applying the fixed filter to the one or more subsignals to obtain a decoupled input signal, and comparing the decoupled input signal to the clean signal to identify at least one weight of the current filter to update.

In Example 237, the subject matter of Example 236 can optionally include wherein the filter update circuit is configured to compare the decoupled input signal to the clean signal to identify the at least one weight of the current filter to update by determining a cross-correlation vector between the decoupled input signal and the clean signal, identifying a first weight of the current filter to update based on the cross-correlation vector, and exclusively updating the first weight of the current filter.

In Example 238, the subject matter of Example 237 can optionally include wherein the filter update circuit is configured to identify the first weight of the current filter to update based on the cross-correlation vector by identifying a maximum-valued element of the cross-correlation vector, and identifying the weight of the current filter with a corresponding element index to the maximum-valued element of the cross-correlation vector as the first weight.

In Example 239, the subject matter of Example 238 can optionally include wherein the filter update circuit is configured to identify the maximum-valued element of the cross-correlation vector by identifying the element of the cross-correlation vector with the largest real component or the largest imaginary component as the maximum-valued element.

In Example 240, the subject matter of Example 236 can optionally include wherein the filter update circuit is configured to compare the decoupled input signal to the clean signal to identify the at least one weight of the current filter to update by determining a cross-correlation vector between the decoupled input signal and the clean signal, and updating the at least one weight of the current filter to reduce a magnitude of the cross-correlation vector.

In Example 241, the subject matter of Example 240 can optionally include wherein the filter update circuit is configured to update the at least one weight of the current filter to reduce a magnitude of the cross-correlation vector by updating the at least one weight of the current filter to reduce a magnitude of the cross-correlation vector according to a coordinate descent optimization scheme.

In Example 242, the subject matter of Example 240 can optionally include wherein the filter update circuit is configured to update the at least one weight of the current filter to reduce a magnitude of the cross-correlation vector by updating the at least one weight of the current filter to reduce a magnitude of the cross-correlation vector according to a recursive least squares optimization scheme.

In Example 243, the subject matter of Example 240 can optionally include wherein the filter update circuit is configured to update the at least one weight of the current filter to reduce a magnitude of the cross-correlation vector by updating the at least one weight of the current filter to reduce a magnitude of the cross-correlation vector according to a recursive least squares (RLS) dichotomous coordinate descent (DCD) optimization scheme.

In Example 244, the subject matter of Example 240 can optionally include wherein the filter update circuit is configured to update the at least one weight of the current filter to reduce a magnitude of the cross-correlation vector by exclusively inverting a single bit of the first weight to reduce a magnitude of the cross-correlation vector.

In Example 245, the subject matter of Example 244 can optionally include wherein the filter update circuit is configured to update the at least one weight of the current filter to reduce a magnitude of the cross-correlation vector further by evaluating one or more candidate bit inversions of the first weight to identify which of the one or more candidate bit inversions is closest to a predefined numerical difference, and identifying the single bit according to which of the one or more candidate bit inversions is closest to the predefined numerical difference.

In Example 246, the subject matter of Example 244 can optionally include wherein the filter update circuit is configured to exclusively invert the single bit of the first weight to reduce a magnitude of the cross-correlation vector by inverting the single bit of the first weight according to a dichotomous coordinate descent optimization scheme.

In Example 247, the subject matter of Example 236 can optionally include wherein the filter update circuit is configured to select between the first filter and the second filter to identify the current filter to update and the fixed filter to hold constant by selecting the first filter as the current filter and the second filter as the fixed filter, and wherein the filter update circuit is configured to apply the fixed filter to the one or more subsignals to obtain the decoupled input signal by applying previous delay taps of the second filter to previous delay taps of the one or more subsignals during a preprocessing stage that occurs before receiving a most recent delay tap of the one or more subsignals, and after receiving the most recent delay tap of the one or more subsignals, applying a most recent delay tap of the second filter to the most recent delay tap of the one or more subsignals.

In Example 248, the subject matter of Example 247 can optionally include wherein the filter update circuit is configured to perform the preprocessing stage during hidden clock cycles that occur before the most recent delay tap of the one or more subsignals is obtained.

In Example 249, the subject matter of Example 236 can optionally include wherein the filter update circuit is configured to select between the first filter and the second filter to identify the current filter to update and the fixed filter to hold constant by selecting the second filter as the current filter and the first filter as the fixed filter, and wherein applying the fixed filter to the one or more subsignals to obtain the decoupled input signal by exclusively applying the first filter to samples of the one or more subsignals corresponding to a single delay tap of the one or more subsignals to obtain a first element of the decoupled input signal.

In Example 250, the subject matter of Example 249 can optionally include wherein the remaining elements of the decoupled input signal are time-delayed weighted versions of the first element of the decoupled input signal.

In Example 251, the subject matter of any one of Examples 225 to 246 can optionally include wherein the filter update circuit is configured to alternate between updating the first filter and updating the second filter by selecting between the first filter and the second filter to identify a current filter to update and a fixed filter to hold constant, applying the fixed filter to the one or more subsignals to obtain a decoupled input signal, determining a cross-correlation vector between the decoupled input signal and the clean signal and determining a correlation matrix of the decoupled input signal, and updating at least one weight of the current filter based on the cross-correlation vector and the correlation matrix.

In Example 252, the subject matter of Example 251 can optionally include wherein the filter update circuit is configured to determine the cross-correlation vector between the decoupled input signal and the clean signal by determining some elements of the cross-correlation vector during a first clock cycle with first calculation circuitry and determining other elements of the cross-correlation vector during a second clock cycle with the same first calculation circuitry, or determining some elements of the correlation matrix during a third clock cycle with second calculation circuitry and determining other elements of the correlation matrix during a second clock cycle with the same second calculation circuitry.

In Example 253, the subject matter of Example 251 can optionally include wherein the filter update circuit is configured to select between the first filter and the second filter to identify a current filter to update and a fixed filter to hold constant by selecting the first filter as the current filter and the second filter as the fixed filter, and wherein the filter update circuit is configured to determine the cross-correlation vector between the decoupled input signal and the clean signal and determining the correlation matrix of the decoupled input signal by exclusively determining the upper-triangle elements of the correlation matrix.

In Example 254, the subject matter of Example 253 can optionally include wherein the correlation matrix is Hermitian matrix.

In Example 255, the subject matter of Example 251 can optionally include wherein the filter update circuit is configured to select between the first filter and the second filter to identify the current filter to update and the fixed filter to hold constant by selecting the second filter as the current filter and the first filter as the fixed filter, and wherein the filter update circuit is configured to determine the cross-correlation vector between the decoupled input signal and the clean signal and determining the correlation matrix of the decoupled input signal by exclusively determining the a single row of the correlation matrix.

In Example 256, the subject matter of Example 255 can optionally include wherein a plurality of rows including the single row of the correlation matrix are statistically similar.

In Example 257, the subject matter of any one of Examples 225 to 256 can optionally include wherein the filter update circuit is configured to alternate between updating the first filter and updating the second filter by using shared circuitry to update the first filter and re-using the same shared circuitry to update the second filter.

In Example 258, the subject matter of any one of Examples 225 to 256 can optionally include wherein the filter update circuit is configured to alternate between updating the first filter and updating the second filter by using shared circuitry to update the first filter and re-using the same shared circuitry to update the second filter according to a pipeline clock schedule.

In Example 259, the subject matter of any one of Examples 225 to 256 can optionally include wherein the filter update circuit is configured to alternate between updating the first filter and updating the second filter by updating the first filter at one or more first times and updating the delay tap dimension filter at one or more different second times.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication circuit arrangement comprising:
a first kernel dimension filter circuit configured to apply a first kernel dimension filter to a first input signal to estimate a first kernel dimension interference signal from a first amplifier;
a second kernel dimension filter circuit configured to apply a second kernel dimension filter to a second input signal to estimate a second kernel dimension interference signal from a second amplifier;
a joint delay tap dimension filter configured to apply a joint delay tap dimension filter to a combination of the first kernel dimension interference signal and the second kernel dimension interference signal to obtain an estimated joint interference signal; and
a cancelation circuit configured to remove the estimated joint interference signal from a received signal to obtain a clean signal.

2. The communication circuit arrangement of claim 1, further comprising:
one or more filter adaptation circuits configured to alternate between a kernel update phase during which the one or more filter adaptation circuits update the first kernel dimension filter and second kernel dimension filter and a delay tap update phase during which the one or more filter adaptation circuits update the joint delay tap dimension filter.

3. The communication circuit arrangement of claim 2, wherein the one or more filter adaptation circuits are configured to alternate between the kernel update phase and the delay tap update phase by:
comparing the combination of the first kernel dimension interference signal and the second kernel dimension interference signal to the clean signal to identify at least one weight of the joint delay tap dimension filter to update during the delay tap update phase.

4. The communication circuit arrangement of claim 3, wherein the one or more filter adaptation circuits are configured to compare the combination of the first kernel dimension interference signal and the second kernel dimension interference signal to the clean signal to identify at least one weight of the joint delay tap dimension filter to update by:
determining a cross-correlation vector between the combination of the first kernel dimension interference signal and the second kernel dimension interference signal and the clean signal; and
identifying a first weight of the joint delay tap dimension filter to update based on the cross-correlation vector.

5. The communication circuit arrangement of claim 2, wherein the one or more filter adaptation circuits are configured to alternate between the kernel update phase and the delay tap update phase by:
first applying the joint delay tap dimension filter to the first input signal to obtain a first filtered input signal;
first comparing the first filtered input signal to the clean signal to identify at least one weight of the first kernel dimension filter to update;
second applying the joint delay tap dimension filter to the second input signal to obtain a second filtered input signal; and
second comparing the second filtered input signal to the clean signal to identify at least one weight of the second kernel dimension filter to update, wherein the first applying, first comparing, second applying, and second comparing are performed during the kernel update phase.

6. The communication circuit arrangement of claim 2, wherein the one or more filter adaptation circuits comprise a first kernel dimension filter adaptation circuit configured to perform the updates to the first kernel dimension filter and further comprise a different second kernel dimension adaptation circuit configured to perform the updates to the second kernel dimension filter.

7. The communication circuit arrangement of claim 2, wherein the one or more filter adaptation circuits comprise a shared kernel dimension update filter compared to alternate between updating the first kernel dimension filter and the second kernel dimension filter.

8. The communication circuit arrangement of claim 1, configured as a radio communication device and further comprising one or more receive chains, a first transmit chain comprising the first amplifier, a second transmit chain comprising the second amplifier, and one or more antennas coupled to the one or more receive chains and the first transmit chain.

9. The communication circuit arrangement of claim 8, wherein the first amplifier is configured to amplify the first input signal to form a first amplified signal and the second amplifier is configured to amplify the second input signal to form a second amplified signal and wherein the one or more antennas are configured to transmit the first amplified signal and the second amplified signal.

10. The communication circuit arrangement of claim 8, wherein a first receive chain of the one or more receive chains is configured to receive the received signal via the one or more antennas, wherein the estimated joint interference signal comprises approximation of leakage from the first transmit chain and the second transmit chain to the first receive chain.

11. The communication circuit arrangement of claim 10, wherein the joint delay tap dimension filter is configured to estimate a delay tap response of one or more filters that are common to a leakage path from the first transmit chain and the second transmit chain to the first receive chain.

12. The communication circuit arrangement of claim 8, wherein the first input signal and the second input signal are transmit layers of a Multiple Input Multiple Output (MIMO) communication scheme.

13. The communication circuit arrangement of claim 8, wherein the one or more filter adaptation circuits are configured to update the first kernel dimension filter, the second kernel dimension filter, and the joint delay tap dimension filter in real-time.

14. The communication circuit arrangement of claim 8, wherein the one or more filter adaptation circuits are configured to update the first kernel dimension filter, the second kernel dimension filter, and the joint delay tap dimension filter by iteratively updating the first kernel dimension filter, the second kernel dimension filter, and the joint delay tap dimension filter over each of a plurality of samples of the first input signal and the second input signal.

15. The communication circuit arrangement of claim 1, further comprising a first kernel generation circuit configured to process the first input signal to derive a first plurality of kernel signals from the first input signal, each of the first plurality of kernel signals approximating a non-linear component of a leakage path of the first amplifier, wherein the first kernel dimension filter circuit is configured to apply the first kernel dimension filter to the first input signal by applying the first kernel dimension filter to the first plurality of kernel signals.

16. The communication circuit arrangement of claim 15, wherein each of the first plurality of kernel signals is composed of a first plurality of delay taps, wherein each weight of the first kernel dimension filter corresponds to a respective one of the first plurality of kernel signals and each weight of the joint delay tap dimension filter corresponds to a respective one of the first plurality of delay taps.

17. A method of performing interference cancelation comprising:
applying a first kernel dimension filter to a first input signal to estimate a first kernel dimension interference signal derived from a first amplifier;
applying a second kernel dimension filter to a second input signal to estimate a second kernel dimension interference signal derived from a second amplifier;
applying a joint delay tap dimension filter to a combination of the first kernel dimension interference signal and the second kernel dimension interference signal to obtain an estimated joint interference signal; and
removing the estimated joint interference signal from a received signal to obtain a clean signal.

18. The method of claim 17, further comprising:
alternating between a kernel update phase comprising updating the first kernel dimension filter and the second kernel dimension filter and a delay tap update phase comprising updating the joint delay tap dimension filter.

19. The method of claim 17, further comprising:
amplifying the first input signal with the first amplifier to form a first amplified signal;
amplifying the second input signal with the second amplifier to form a second amplified signal; and
wirelessly transmitting the first amplified signal and the second amplified signal.

20. The method of claim 19, further comprising receiving the received signal at a receive chain, where the estimated joint interference signal comprises approximation of leakage from the first amplifier and the second amplifier to the receive chain.

21. The method of claim 20, wherein the joint delay tap estimation filter estimates a delay tap response of one or more filters that are common to a leakage path from both the first amplifier and the second amplifier to the receive chain.

22. A radio communication device, comprising:
one or more receive chains;
a first transmit chain comprising a first amplifier;
a second transmit chain comprising a second amplifier;
one or more antennas coupled to the one or more receive chains and the first transmit chain; and
a plurality of circuits configured to cause the radio communication device to:
apply a first kernel dimension filter to a first input signal to estimate a first kernel dimension interference signal from a first amplifier;
apply a second kernel dimension filter to a second input signal to estimate a second kernel dimension interference signal from a second amplifier;
apply a joint delay tap dimension filter to a combination of the first kernel dimension interference signal and the second kernel dimension interference signal to obtain an estimated joint interference signal; and
remove the estimated joint interference signal from a received signal to obtain a clean signal.

23. The radio communication device of claim 22,
wherein the first amplifier is configured to amplify the first input signal to form a first amplified signal;
wherein the second amplifier is configured to amplify the second input signal to form a second amplified signal; and
wherein the one or more antennas are configured to transmit the first amplified signal and the second amplified signal.

24. The radio communication device of claim 22,
wherein a first receive chain of the one or more receive chains is configured to receive the received signal via the one or more antennas, and wherein the estimated joint interference signal comprises approximation of leakage from the first transmit chain and the second transmit chain to the first receive chain; and
wherein the joint delay tap dimension filter is configured to estimate a delay tap response of one or more filters that are common to a leakage path from the first transmit chain and the second transmit chain to the first receive chain.

25. The radio communication device of claim 22, wherein the first input signal and the second input signal are transmit layers of a Multiple Input Multiple Output (MIMO) communication scheme.

* * * * *